US008018993B2

(12) United States Patent
Yamanashi et al.

(10) Patent No.: US 8,018,993 B2
(45) Date of Patent: Sep. 13, 2011

(54) RELAY DEVICE AND SIGNAL DECODING DEVICE

(75) Inventors: Tomofumi Yamanashi, Tokyo (JP); Kaoru Sato, Kanagawa (JP); Toshiyuki Morii, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1165 days.

(21) Appl. No.: 11/658,494

(22) PCT Filed: Jul. 25, 2005

(86) PCT No.: PCT/JP2005/013567
§ 371 (c)(1), (2), (4) Date: Jan. 25, 2007

(87) PCT Pub. No.: WO2006/011444
PCT Pub. Date: Feb. 2, 2006

(65) Prior Publication Data
US 2008/0298457 A1 Dec. 4, 2008

(30) Foreign Application Priority Data
Jul. 28, 2004 (JP) ................................ 2004-220867
Jan. 11, 2005 (JP) ................................ 2005-004540

(51) Int. Cl.
*H04B 1/66* (2006.01)
(52) U.S. Cl. ................................ 375/240; 375/E7.027
(58) Field of Classification Search .................. 375/240, 375/E7.027
See application file for complete search history.

(56) References Cited

U.S. PATENT DOCUMENTS

| | | | | |
|---|---|---|---|---|
| 6,853,650 | B1 * | 2/2005 | Hutzelmann et al. | 370/469 |
| 7,319,881 | B2 * | 1/2008 | Endo | 455/466 |
| 7,411,522 | B2 * | 8/2008 | Yamanashi et al. | 341/50 |
| 2003/0195009 | A1 | 10/2003 | Endo | |
| 2005/0163323 | A1 * | 7/2005 | Oshikiri | 381/22 |

FOREIGN PATENT DOCUMENTS

| | | |
|---|---|---|
| JP | 10097295 | 4/1998 |
| JP | 2000324488 | 11/2000 |
| JP | 2003304336 | 10/2003 |
| JP | 2004102186 | 4/2004 |
| JP | 2005151176 | 6/2005 |
| JP | 2005222014 | 8/2005 |
| WO | WO 03091989 A1 * | 11/2003 |
| WO | WO 2005066937 A1 * | 7/2005 |

OTHER PUBLICATIONS

International Search Report dated Oct. 11, 2005.

* cited by examiner

*Primary Examiner* — Dac Ha
*Assistant Examiner* — Nader Bolourchi
(74) *Attorney, Agent, or Firm* — Dickinson Wright PLLC

(57) ABSTRACT

There is provided a relay device capable of simultaneously transmitting various additional information such as audio information, character information, and image information while suppressing the communication cost and the line use ratio without increasing the calculation cost in the decoding process. The relay device includes an encoded information analysis unit (602) which outputs transmission mode information and an additional information flag to an additional processing unit (603) and outputs an information source code of each layer to the additional processing unit (603) according to the transmission mode information. According to the combination of the transmission mode information and the additional mode information, the additional processing unit (603) performs additional processing of the additional information for the information source code of each layer. An encoded information integration unit (604) integrates the transmission mode information, the additional mode information, the additional information flag, and various information source codes inputted from the additional processing unit (603).

8 Claims, 27 Drawing Sheets

FIG.8A (PATTERN 1)

FIG.8B (PATTERN 2)

FIG.8C (PATTERN 3)

FIG.8D (PATTERN 4)

FIG.8E (PATTERN 5)

FIG.8F (PATTERN 6)

FIG.8G (PATTERN 7)

FIG.8H (PATTERN 8)

FIG.8I (PATTERN 9)

FIG.18A (PATTERN 1a)
FIG.18B (PATTERN 1b)
FIG.18C (PATTERN 2)
FIG.18D (PATTERN 3)
FIG.18E (PATTERN 4)
FIG.18F (PATTERN 5a)
FIG.18G (PATTERN 5b)
FIG.18H (PATTERN 6)
FIG.18I (PATTERN 7)
FIG.18J (PATTERN 8)
FIG.18K (PATTERN 9a)
FIG.18L (PATTERN 9b)

RELAY DEVICE AND SIGNAL DECODING DEVICE

TECHNICAL FIELD

The present invention relates to a relay apparatus and a signal decoding apparatus used in a communication system that codes and transmits signals.

BACKGROUND ART

In the field of packet communication systems typified by Internet communication and the field of mobile communication systems that transmit speech and audio signals, technology that transmits additional speech and audio information, text information, and/or image information such as that related to news at the same time as the speech and audio signals is desired.

Yet, simply multiplexing coded additional information with speech and audio signals coded by a coding apparatus using a relay apparatus (distributing apparatus) significantly increases the volume of information to be transmitted as well as communication costs and line usage rates, requiring a more innovative approach.

As prior art in this field, methods have been disclosed whereby a relay apparatus (distributing apparatus) at the time of speech signal transmission between mobile terminals decodes the speech and audio signals to be transmitted between the communication terminals, superimposes (combines) the decoded data on (with) additional information, codes the superimposed signals once again, and then transmits these coded signals to the other communication terminal (for example, Patent Document 1).

In recent years, scalable coding technologies have been developed that are capable of decoding speech and audio signals from just a portion of coded information to suppress sound quality deterioration even under conditions in which packet loss occurs (for example, Patent Document 2).

One representative example of this scalable coding technology is the method of repeatedly coding input signals in coding section of layer 1, obtaining that coded information, coding in the coding section of upper layer (where i is an integer greater than or equal to 2) the difference between the input signal of coding section of layer (i−1) and the decoded signal of the coded information of layer (i−1), i.e., the residual signal, as the input signal of layer i, and obtaining the coded information.

Patent Document 1: Japanese Patent Application Laid-Open No. 2003-304336

Patent Document 2: Japanese Patent Application Laid-Open No. H10-97295

DISCLOSURE OF INVENTION

Problem to be Solved by the Invention

Nevertheless, in the method of the above Patent Document 1, the coded signals must be decoded once again in the relay apparatus (distributing apparatus), thereby requiring a substantial amount of calculation cost for the decoding process. In addition, because the method of Patent Document 1 superimposes the additional information on the speech and audio signals, the additional information must be speech and audio signals. Other additional information such as text information or image information cannot be handled.

In addition, while combining a method that involves scalable coding in a coding apparatus such as that described in the above Patent Document 2 with the method of superimposing the additional information using a relay apparatus is conceivable, such technology has not been developed in concrete form to date.

An object of the present invention is to provide a relay apparatus and a signal decoding apparatus capable of reducing communication costs and line usage rates, and transmitting various additional information such as speech information, text information, and image information without increasing the calculation cost in the decoding process.

Means for Solving the Problem

A relay apparatus of the present invention adopts a configuration including a receiving section that receives coded information constructed in a plurality of layers by scalable coding, an addition processing section that, when additional information is input, adds the additional information to the coded information by replacing the coded information of at least one of the layers with the additional information, and a transmission section that transmits the coded information after the addition processing.

A signal decoding apparatus of the present invention that decodes coded information constructed in a plurality of layers adopts a configuration including an additional information detecting section that detects as to whether or not additional information is added to the coded information, a plurality of first decoding sections that decode the coded information of the layers, an addition section that adds signals decoded at first decoding sections and generates a first decoded signal, and a second decoding section that, when the additional information is included in the coded information, decodes the additional information and generates a second decoded signal.

ADVANTAGEOUS EFFECT OF THE INVENTION

According to the present invention, it is possible to reduce communication costs and line usage rates, and transmit various information such as speech information, text information and image information without increasing the calculation cost in the decoding process, by assigning layers of an appropriate information volume in accordance with the type of additional information input to the relay apparatus, and integrating the coded additional information using that information volume with the coded information of the speech and audio signals.

BEST MODE FOR CARRYING OUT THE INVENTION

Referring to provided figures, embodiments of the present invention will be described in detail. Each of the following embodiments is described based on the case where Code Excited Linear Prediction (CELP) type speech coding and decoding are performed based on a hierarchical signal coding/decoding method comprising three layers. This hierarchical signal coding method refers to a method in which a signal coding process that codes the differential signal of the lower layer input signal and output signal and outputs the coded information exists in multiple in the upper layer in a hierarchical structure. In addition, the following descriptions refer to the lowest layer (layer 1) as the "base layer" and any layer that exists above the base layer as an "enhancement layer".

Embodiment 1

Embodiment 1 of the present invention describes the case where the target additional information is speech information requiring immediacy (such as regional emergency disaster information). The additional information is therefore prioritized over the speech and audio signals to be transmitted.

Figure 1:
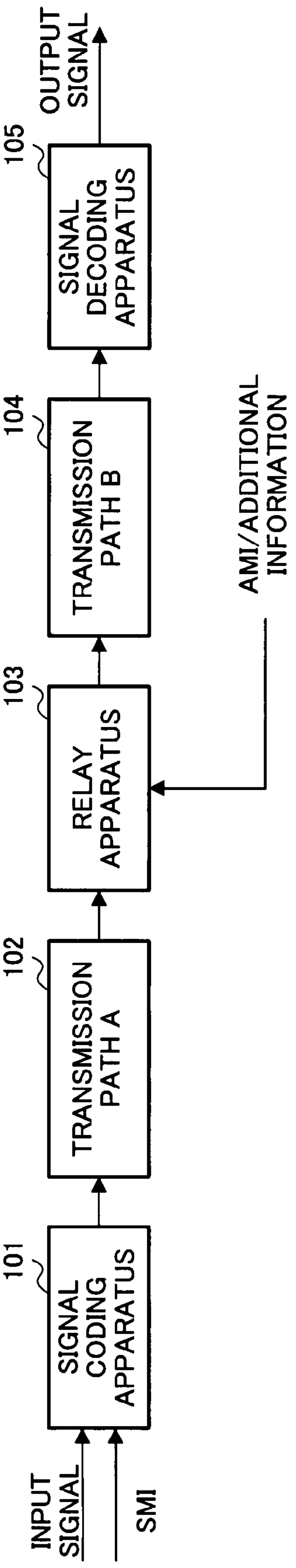
FIG. 1 is a block diagram showing the configuration of the communication system according to Embodiment 1 of the present invention.

FIG. 1 shows the system configuration including the signal decoding apparatus according to the present embodiment. Signal coding apparatus 101 codes the input signal in accordance with the send mode information (SMI) using a CELP type speech coding method, and transmits the coded information obtained from coding to relay apparatus 103 via transmission path A 102.

When additional mode information (AMI) and additional information are input, relay apparatus 103 performs processing that adds the additional information to the coded information to be transmitted via transmission path A 102, and transmits the coded information after the addition processing (hereinafter "coded information after conversion") to transmission path B 104. When additional mode information and additional information are not input, relay apparatus 103 outputs the coded information to be transmitted via transmission path A 102 to transmission path B 104.

Signal decoding apparatus 105 decodes the coded information or the coded information after conversion received via transmission path B 104 using a CELP type speech decoding method, and outputs the decoded signal obtained from decoding as an output signal.

Next, the configuration of signal coding apparatus 101 of FIG. 1 will be described using the block diagram of FIG. 2. Signal coding apparatus 101 separates the input signals every N samples (where N is a natural number) and, given N samples in a single frame, codes the input signals on a frame-by-frame basis.

Signal coding apparatus 101 mainly comprises transmission bit rate control section 201, control switches 202 to 205, base layer coding section 206, base layer decoding section 208, addition sections 207 and 211, first enhancement layer coding section 209, first enhancement layer decoding section 210, second enhancement layer coding section 212, and coded information integration section 213.

Send mode information is input to transmission bit rate control section 201. Here, the send mode information indicates the transmission bit rate when input signals are coded and transmitted; one transmission bit rate is selected from two or more predetermined transmission bit rates as the send mode information. In the present embodiment, the send mode information may assume the values of the four predetermined transmission bit rates bitrate0, bitrate1, bitrate2, and bitrate3

(where bitrate0=0, bitrate3<bitrate2<bitrate1). Note, however, that bitrate0 can be set for relay apparatus 103 only. The send mode information at the moment of input to transmission bit rate control section 201 is one of the three transmission bit rates bitrate1, bitrate2, or bitrate3.

Transmission bit rate control section 201 controls the ON/OFF settings of control switches 202 to 205 in accordance with the input send mode information. Specifically, when the send mode information is bitrate1, transmission bit rate control section 201 sets all control switches 202 to 205 to ON. When the send mode information is bitrate2, transmission bit rate control section 201 sets control switches 202 and 203 to ON and control switches 204 and 205 to OFF. When the send mode information is bitrate3, transmission bit rate control section 201 sets all control switches 202 to 205 to OFF. Further, transmission bit rate control section 201 outputs the send mode information to coded information integration section 213. In this manner, transmission bit rate control section 201 controls the ON/OFF settings of the control switches in accordance with the send mode information, thereby determining the combinations of coding sections used for coding input signals.

The input signal is input to control switch 202 and base layer coding section 206.

Base layer coding section 206 codes the input signal using a CELP type speech coding method and outputs the information source code obtained from coding (hereinafter "base layer information source code" (DDCL)) to coded information integration section 213 and control switch 203. The internal configuration of base layer coding section 206 will be described hereinafter.

When control switch 203 is ON, base layer decoding section 208 decodes the base layer information source code output from base layer coding section 206 using a CELP type speech decoding method, and outputs the decoded signal obtained from decoding (hereinafter "base layer decoded signal") to addition section 207. When control switch 203 is OFF, base layer decoding section 208 does not perform any operation. The internal configuration of base layer decoding section 208 will be described later.

When control switches 202 and 203 are ON, addition section 207 adds the signal that inverted the polarity of the base layer decoded signal to the input signal, and outputs the first differential signal which is the addition result to first enhancement layer coding section 209 and control switch 204. When control switches 202 and 203 are OFF, addition section 207 does not perform any operation.

When control switches 202 and 203 are ON, first enhancement layer coding section 209 codes the first differential signal obtained from addition section 207 using a CELP type speech coding method, and outputs the information source code from coding (hereinafter "first enhancement layer information source code (CDFEL)") to control switch 205 and coded information integration section 213. When control switches 202 and 203 are OFF, first enhancement layer coding section 209 does not perform any operation.

When control switch 205 is ON, first enhancement layer decoding section 210 decodes the first enhancement layer information source code output from first enhancement layer coding section 209 using a CELP type speech decoding method, and outputs the decoded signal obtained from decoding (hereinafter "first enhancement layer decoded signal") to addition section 211. When control switch 205 is OFF, first enhancement layer decoding section 210 does not perform any operation.

When control switches 204 and 205 are ON, addition section 211 adds the signal that inverted the polarity of the first enhancement layer decoded signal to the first differential signal obtained from control switch 204, and outputs the second differential signal which is the addition result to second enhancement layer coding section 212. When control switches 204 and 205 are OFF, addition section 211 does not perform any operation.

When control switches 204 and 205 are ON, second enhancement layer coding section 212 codes the second differential signal output from addition section 211 using a CELP type speech coding method, and outputs the information source code obtained from coding (hereinafter "second enhancement layer information source code (CDSEL)") to coded information integration section 213. When control switches 204 and 205 are OFF, second enhancement layer coding section 212 does not perform any operation.

Coded information integration section 213 integrates the information source code output from base layer coding section 206, first enhancement layer coding section 209, and second enhancement layer coding section 212 with the send mode information to be output from transmission bit rate control section 201, assigns "0" to the 1-bit additional information flag (AIF) included in the coded information, and outputs the result to transmission path A 102 as coded information.

Here, the additional information flag is a 1-bit flag that assumes the value "1" when additional information was added and the value "0" when additional information was not added in relay apparatus 103, and has a default value of 0 at the moment of transmission from the coding apparatus.

This concludes the description of the configuration of signal coding apparatus 101 of FIG. 1.

Next, the data structure (bit stream) of the coded information prior to transmission will be described using FIG. 3.

Figure 3A:
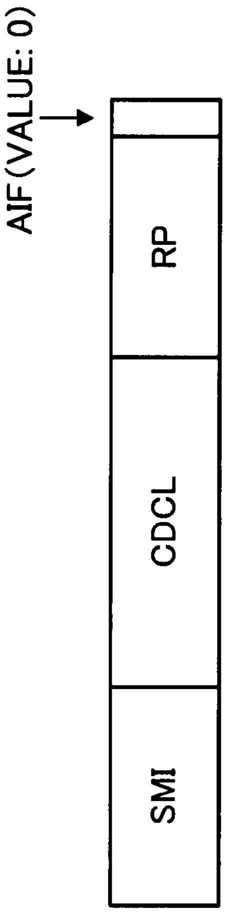
FIG. 3 is a block diagram showing the structure of the data transmitted from the signal coding apparatus according to Embodiment 1 of the present invention.

When the send mode information is bitrate3, the coded information comprises the send mode information, base layer information source code (CDCL), redundant part (RP), and additional information flag (value: 0), as shown in FIG. 3A.

Figure 3B:
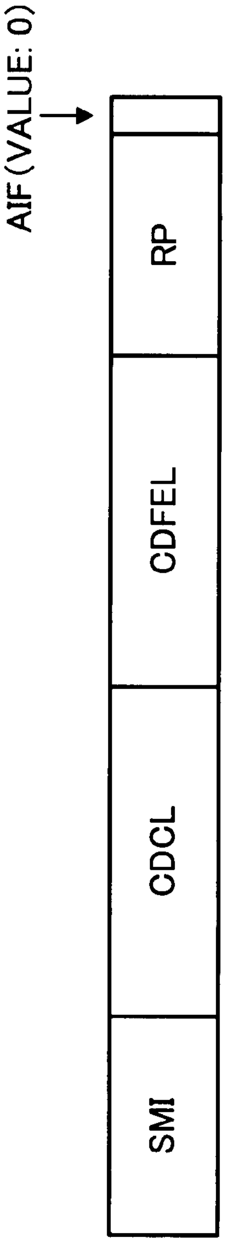

When the send mode information is bitrate2, the coded information comprises the send mode information, base layer information source code, first enhancement layer information source code, redundant part, and additional information flag (value: 0), as shown in FIG. 3B.

Figure 3C:
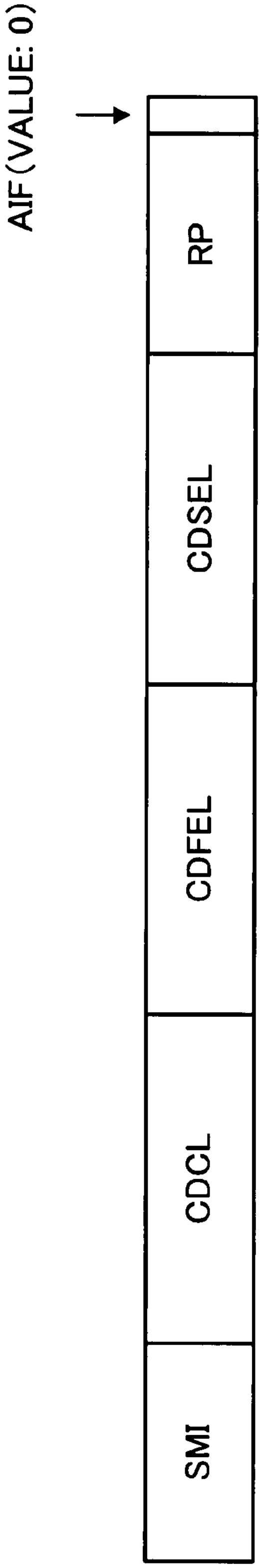

When the send mode information is bitrate1, the coded information comprises the send mode information, base layer information source code, first enhancement layer information source code, second enhancement layer information source code, redundant part, and additional information flag (value: 0), as shown in FIG. 3C.

Here, the redundant part in the data structure of FIG. 3 is a redundant data storage section prepared in the bit stream and is typically utilized for transmission error detection and correction. In the present invention, 1 bit of this is used as the additional information flag in relay apparatus 103 and signal decoding apparatus 105. A detailed explanation will be provided hereinafter.

Figure 4:
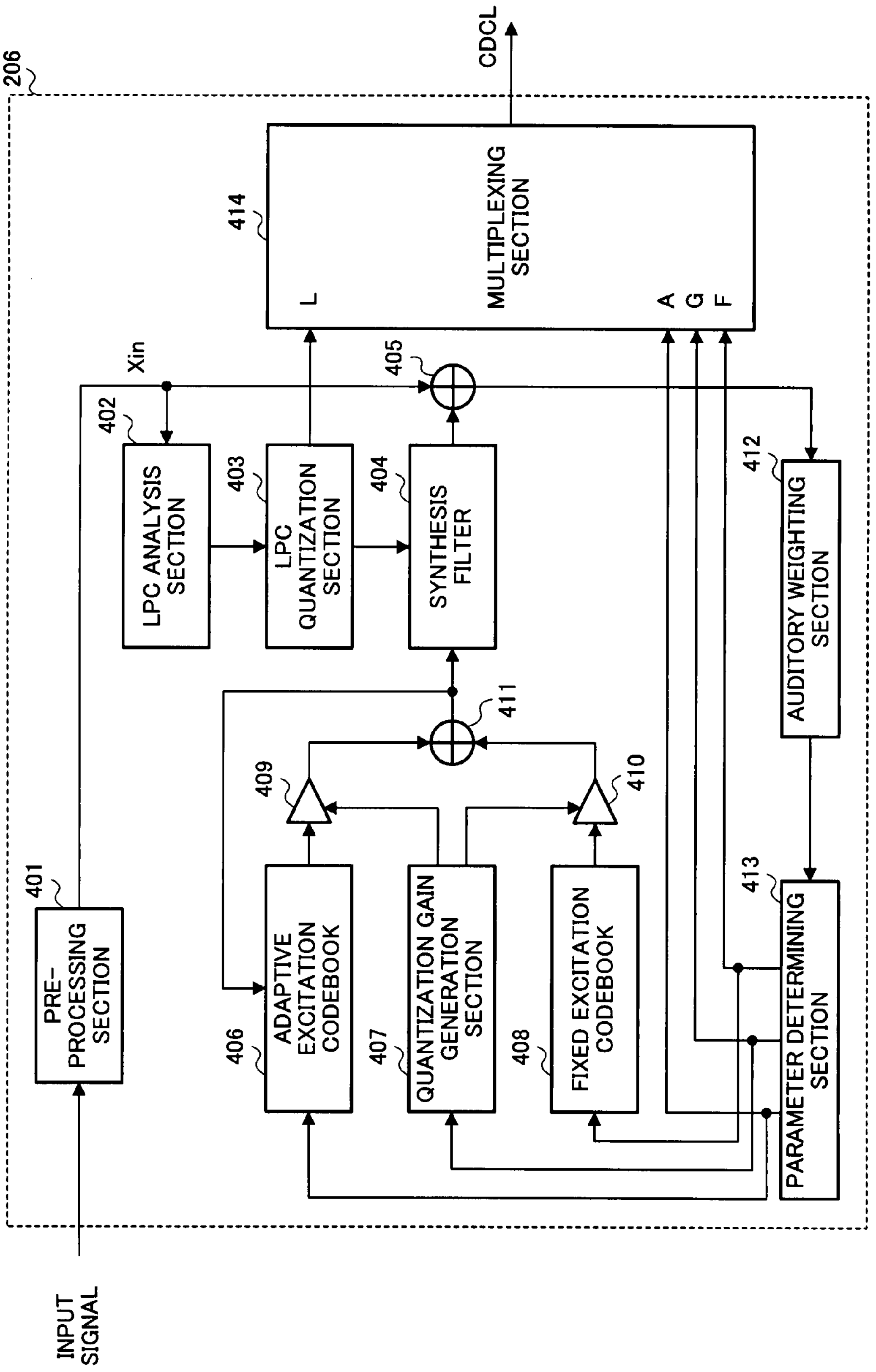
FIG. 4 is a block diagram showing the internal configuration of the base layer coding section of the signal coding apparatus according to Embodiment 1 of the present invention.

Next, the internal configuration of base layer coding section 206 of FIG. 2 will be described using FIG. 4. This explanation describes the case where CELP type speech decoding is performed in base layer coding section 206.

Pre-processing section 401 processes input signals by performing highpass filter processing that removes DC components, waveform shaping processing that leads to improvements in the performance of subsequent coding processing, and preemphasis processing, and outputs a signal (Xin) after this processing to LPC analysis section 402 and addition section 405.

LPC analysis section 402 performs linear predictive analysis using Xin, and outputs the analysis result (linear predictive coefficient) to LPC quantization section 403. LPC quantization section 403 performs the quantization processing of the linear predictive coefficient (LPC) output from LPC analysis section 402 and outputs the quantized LPC to synthesis filter 404 and the code (L) representing the quantized LPC to multiplexing section 414.

Synthesis filter 404 generates a synthesis signal by performing filter synthesis against the excitation to be output from addition section 411 described hereinafter using the filter coefficient based on the quantized LPC, and outputs the synthesis signal to addition section 405.

Addition section 405 calculates the error signal by inverting the polarity of the synthesis signal and adding the result to Xin, and outputs the error signal to auditory weighting section 412.

Adaptive excitation codebook 406 stores in a buffer the excitation output in the past by addition section 411, cuts out as an adaptive excitation vector one frame of samples from past excitation specified by a signal output from parameter determining section 413, and outputs the result to multiplication section 409.

Quantization gain generation section 407 outputs the quantization adaptive excitation gain and quantization fixed excitation gain specified by the signal output from parameter determining section 413 to multiplication section 409 and multiplication section 410, respectively.

Fixed excitation codebook 408 outputs to multiplication section 410 the fixed excitation vector obtained by multiplying the diffusion vector by the pulse excitation vector that has the waveform specified by the signal output from parameter determining section 413.

Multiplication section 409 multiplies the quantization adaptive excitation gain output from quantization gain generation section 407 by the adaptive excitation vector output from adaptive excitation codebook 406, and outputs the result to addition section 411. Multiplication section 410 multiplies the quantization fixed excitation gain output from quantization gain generation section 407 by the fixed excitation vector output from fixed excitation codebook 408, and outputs the result to addition section 411.

Addition section 411 inputs the adaptive excitation vector and fixed excitation vector after gain multiplication from multiplication section 409 and multiplication section 410, respectively, adds these vectors, and outputs the excitation which is the addition result to synthesis filter 404 and adaptive excitation codebook 406. Further, the excitation input to adaptive excitation codebook 406 is stored in a buffer.

Auditory weighting section 412 assigns auditory weight to the error signal output from addition section 405 and outputs the result to parameter determining section 413 as coding distortion.

Parameter determining section 413 selects from adaptive excitation codebook 406, fixed excitation codebook 408, and quantization gain generation section 407 the adaptive excitation vector, fixed excitation vector, and quantization gain, respectively, that minimize the coding distortion output from auditory weighting section 412, and outputs the adaptive excitation vector code (A), fixed excitation vector code (F), and excitation gain code (G) indicating the selection results to multiplexing section 414.

Multiplexing section 414 inputs the code (L) representing the quantized LPC from LPC quantization section 403, and the code (A) representing the adaptive excitation vector, and the code (F) representing the fixed excitation vector, and the code (G) representing the quantization gain from parameter determining section 413, and multiplexes and outputs these information as base layer information source code.

Figure 2:
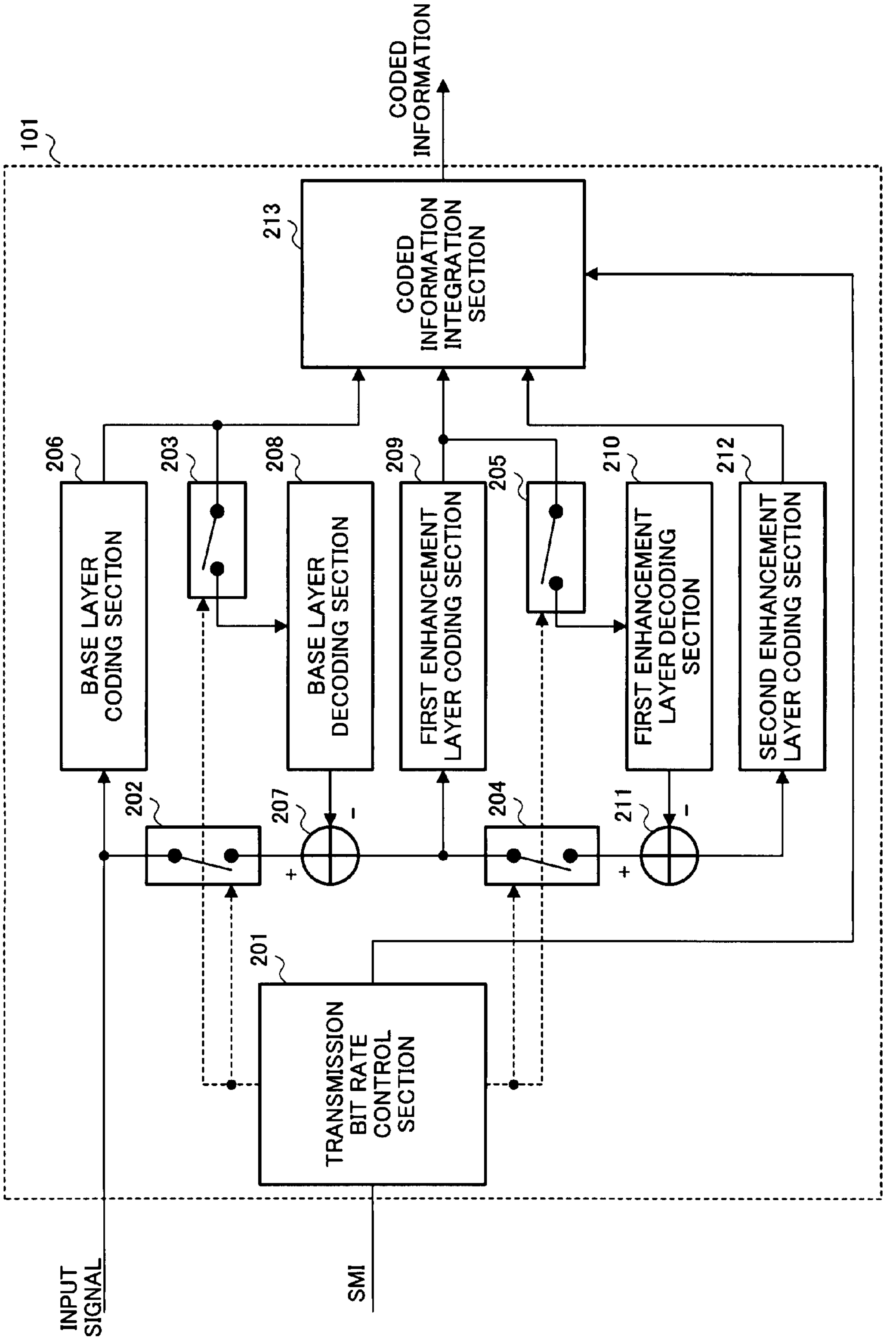
FIG. 2 is a block diagram showing the internal configuration of the signal coding apparatus according to Embodiment 1 of the present invention.

This concludes the description of the internal configuration of base layer coding section 206 of FIG. 2.

The internal configurations of first enhancement layer coding section 209 and second enhancement layer coding section 212 of FIG. 2 are the same as that of base layer coding section 206 only with a different signal type input and information source code type output, and a detailed description thereof will be omitted.

Next, the internal configuration of base layer decoding section 208 of FIG. 2 will be described using FIG. 5. This explanation describes the case where CELP type speech decoding is performed in base layer decoding section 208.

Figure 5:
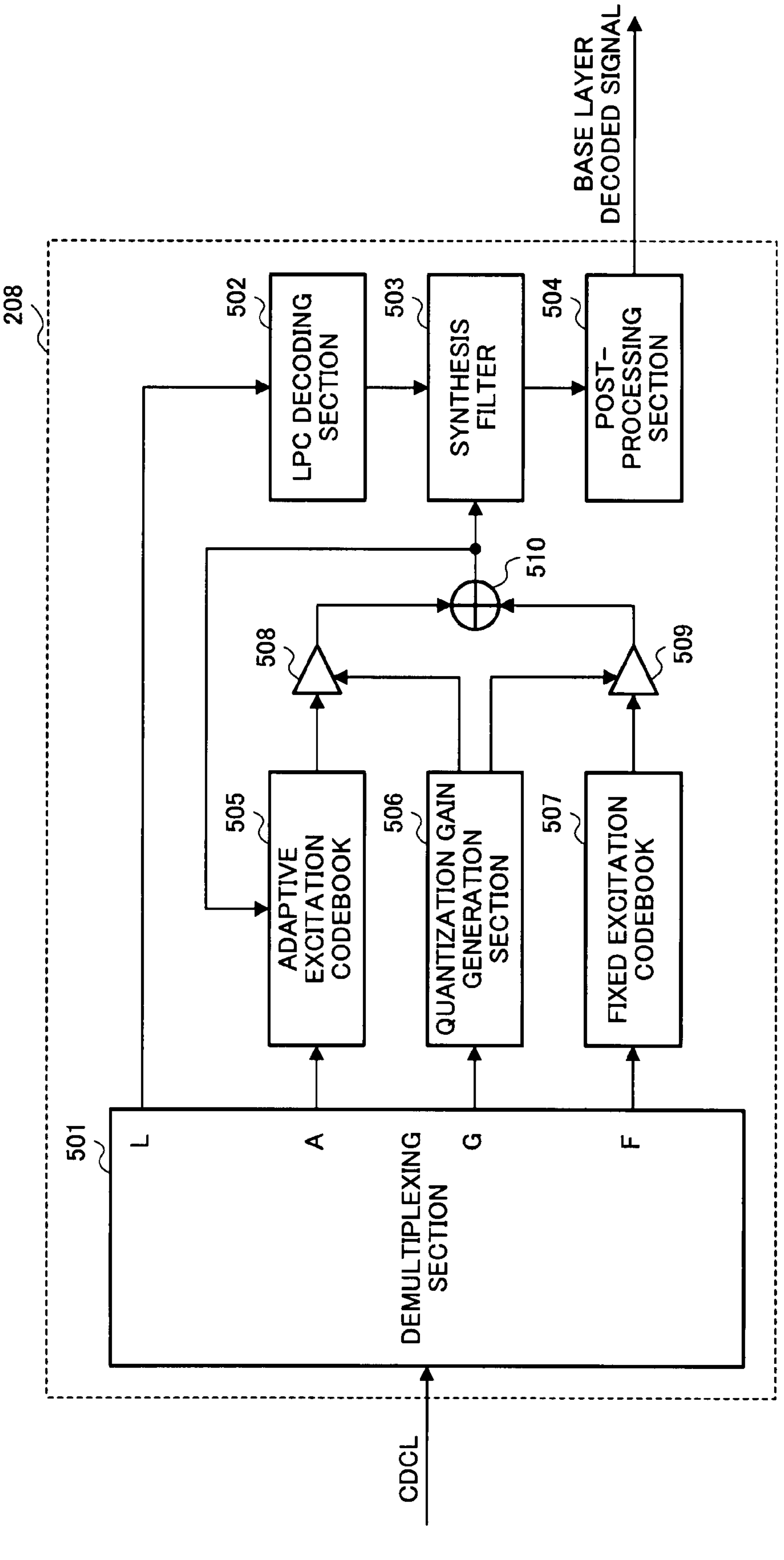
FIG. 5 is a block diagram showing the internal configuration of the base layer decoding section of the signal coding apparatus according to Embodiment 1 of the present invention.

In FIG. 5, the base layer information source code input to base layer decoding section 208 is demultiplexed into individual codes (L, A, G, F) by demultiplexing section 501. The demultiplexed LPC code (L) is output to LPC decoding section 502, the demultiplexed adaptive excitation vector code (A) is output to adaptive excitation codebook 505, the demultiplexed excitation gain code (G) is output to quantization gain generation section 506, and the demultiplexed fixed excitation vector code (F) is output to fixed excitation codebook 507.

LPC decoding section 502 decodes the quantized LPC from the code (L) output from demultiplexing section 501, and outputs the result to synthesis filter 503.

Adaptive excitation codebook 505 removes one frame of samples from the past excitation specified by the code (A) output from demultiplexing section 501 as an excitation vector, and outputs the result to multiplication section 508.

Quantization gain generation section 506 decodes the quantization adaptive excitation gain and quantization fixed excitation gain specified by the excitation gain code (G) output from demultiplexing section 501, and outputs the result to multiplication section 508 and multiplication section 509.

Fixed excitation codebook 507 generates a fixed excitation vector specified by the code (F) output from demultiplexing section 501, and outputs the result to multiplication section 509.

Multiplication section 508 multiplies the quantization adaptive excitation gain by the adaptive excitation vector, and outputs the result to addition section 510. Multiplication section 509 multiplies the quantization fixed excitation gain by the fixed excitation vector, and outputs the result to addition section 510.

Addition section 510 adds the adaptive excitation vector and fixed excitation vector after gain multiplication output from multiplication sections 508 and 509, generates excitation, and outputs the excitation to synthesis filter 503 and adaptive excitation codebook 505.

Synthesis filter 503 performs filter synthesis on the excitation output from addition section 510 using the filter coefficient decoded by LPC decoding section 502, and outputs the synthesized signal to post-processing section 504.

Post-processing section 504 processes the signal output from synthesis filter 503 by performing processing that improves the subjective quality of the speech, such as formant enhancement and pitch enhancement, and processing that improves the subjective quality of stationary noise, and outputs the result as a base layer decoded signal.

This concludes the description of the internal configuration of base layer decoding section 208 of FIG. 2.

The internal configuration of first enhancement layer decoding section 210 of FIG. 2 is the same as that of base layer decoding section 208 only with a different information source code type input and signal type output, and a detailed description thereof will be omitted.

Next, the configuration of relay apparatus 103 of FIG. 1 will be described using FIG. 6.

Relay apparatus 103 mainly comprises additional information reception section 601, coded information analysis section 602, addition processing section 603, coded information integration section 604, and control switches 605 and 606.

The additional mode information and additional information are input to additional information reception section 601. Here, the additional mode information refers to information indicating the transmission bit rate when additional information is coded and transmitted; one transmission bit rate is selected from two or more predetermined transmission bit rates in accordance with the additional information category, etc., as the additional mode information. In the present embodiment, the additional mode information may assume the values of the three predetermined transmission bit rates bitrate1', bitrate2', and bitrate3' (where bitrate3'<bitrate2'<bitrate1'). The value of this transmission bit rate indicates the volume of information required for coding the additional information at an appropriate quality. That is, the transmission bit rate is appropriately specified in accordance with the category of additional information so that, for example, bitrate3' is selected for a clean speech (one person), bitrate2' is selected for speech with noise or a clean speech (a small number of persons), and bitrate1' is selected for audio or multiples speeches.

Additional information reception section 601 controls the ON/OFF settings of control switches 605 and 606 depending on whether additional mode information and additional information are input. Specifically, when additional mode information and additional information are input to relay apparatus 103, additional information reception section 601 connects control switch 605 to the coded information analysis section 602 side, and connects control switch 606 to the coded information integration section 604 side. When additional mode information and additional information are not input to relay apparatus 103, additional information reception section 601 connects control switch 605 to the control switch 606 side, and connects control switch 606 to the control switch 605 side. In this manner, the operation of relay apparatus 103 is determined by controlling the ON/OFF settings of control switches 605 and 606 according to whether or not additional information is input to relay apparatus 103. In addition, when additional mode information and additional information are input to relay apparatus 103, additional information reception section 601 outputs the input additional mode information and additional information to addition processing section 603. When additional mode information and additional information are not input to relay apparatus 103, additional information reception section 601 does not output anything to addition processing section 603.

When control switch 605 is connected to the coded information analysis section 602 side, coded information analysis section 602 separates the input coded information into send mode information, the information source code of each layer, and an additional information flag, outputs the send mode information and additional information flag to addition processing section 603 and, in accordance with the send mode information, outputs the information source code of each layer to addition processing section 603. Specifically, when the send mode information obtained from the coded information is bitrate1, the base layer information source code, first enhancement layer information source code, and second enhancement layer information source code are output to addition processing section 603. When the send mode information is bitrate2, the base layer information source code and first enhancement layer information source code are output to addition processing section 603. When the send mode information is bitrate3, the base layer information source code is output to addition processing section 603. Furthermore, when control switch 605 is connected to the control switch 606 side, coded information analysis section 602 does not perform any operation.

When send mode information, an additional information flag, and the information source code of each layer corresponding to the send mode information are input from coded information analysis section 602, or when additional mode information and additional information are input from additional information reception section 601, addition processing section 603 performs addition processing of the additional information to the information source code of each layer in accordance with the combinations of send mode information and additional mode information, and outputs the obtained information source code, send mode information, additional mode information, and additional information flag to coded information integration section 604. When send mode information, an additional information flag, and the information source code of each layer corresponding to the send mode information are not input from coded information analysis section 602, or additional mode information and additional information are not input from additional information reception section 601, addition processing section 603 does not perform any operation.

When send mode information, additional mode information, an additional information flag, and the information source code of each layer are input from addition processing section 603, coded information integration section 604 integrates the information and outputs the result as coded information after conversion to control switch 606. When send mode information, additional mode information, an additional information flag, and the information source code of each layer are not input from addition processing section 603, coded information integration section 604 does not perform any operation.

This concludes the description of the configuration of relay apparatus 103 of FIG. 1.

Next, the configuration of addition processing section 603 of FIG. 6 will be described using FIG. 7. Addition processing section 603 mainly comprises additional information coding section 701 and additional information integration section 702.

When additional mode information and additional information are input from additional information reception section 601 and send mode information and an additional information flag are input from coded information analysis section 602, additional information coding section 701 codes the additional information using a CELP type speech coding method based on the transmission bit rate corresponding to the combinations of additional mode information and send mode information, and outputs the information source code obtained from coding (hereinafter "information source code of additional information (CDAI)"), send mode information, and additional mode information to additional information integration section 702. When additional mode information, additional information, send mode information, and an additional information flag are not input, additional information coding section 701 does not perform any operation.

The following separates the coding processing of additional information coding section 701 into nine patterns that correspond to the combinations of send mode information and additional mode information, describing each pattern in detail.

Additional information coding section 701 comprises a multi-rate coding method capable of coding input information (signals) at a plurality of transmission bit rates. In the present embodiment, the values of the six predetermined transmission bit rates bitrate1", bitrate2", bitrate3", bitrate4", bitrate5", and bitrate6" are available in accordance with the combinations of additional mode information obtained from additional information reception section 601, and the send mode information obtained from coded information analysis section 602. The value of each of the six transmission bit rates is expressed by the following equation (1) using bitrate1, bitrate2, and bitrate3.

[Equation 1]

$$\begin{cases} bitrate1'' = bitrate1 \\ bitrate2'' = bitrate2 \\ bitrate3'' = bitrate3 \\ bitrate4'' = bitrate1 - bitrate3 \\ bitrate5'' = bitrate2 - bitrate3 \\ bitrate6'' = bitrate1 - bitrate2 \end{cases} \quad (1)$$

(Pattern 1)

When the additional mode information obtained from additional information reception section 601 is bitrate3' and the send mode information obtained from coded information analysis section 602 is bitrate3, additional information coding section 701 codes the additional information based on a CELP type speech coding method using the transmission bit rate indicated by bitrate3", and outputs the obtained information source code of additional information, additional mode information, send mode information, and additional information flag to additional information integration section 702.

(Pattern 2)

When the additional mode information obtained from additional information reception section 601 is bitrate3' and the send mode information obtained from coded information analysis section 602 is bitrate2, additional information coding section 701 codes the additional information based on a CELP type speech coding method using the transmission bit rate indicated by bitrate5", and outputs the obtained information source code of additional information, additional mode information, send mode information, and additional information flag to additional information integration section 702.

(Pattern 3)

When the additional mode information obtained from additional information reception section 601 is bitrate3' and the send mode information obtained from coded information analysis section 602 is bitrate1, additional information coding section 701 codes the additional information based on a CELP type speech coding method using the transmission bit rate indicated by bitrate6", and outputs the obtained information source code of additional information, additional mode information, send mode information, and additional information flag to additional information integration section 702.

(Pattern 4)

When the additional mode information obtained from additional information reception section 601 is bitrate2' and the send mode information obtained from coded information analysis section 602 is bitrate3, additional information coding section 701 assesses that the transmission bit rate indicated by bitrate3" is not sufficient for coding the additional information and outputs the additional mode information, send mode information, and additional information flag to additional information integration section 702 without coding the additional information.

(Pattern 5)

When the additional mode information obtained from additional information reception section 601 is bitrate2' and the send mode information obtained from coded information analysis section 602 is bitrate2, additional information coding section 701 codes the additional information based on a CELP type speech coding method using the transmission bit rate indicated by bitrate2", and outputs the obtained information source code of additional information, additional mode information, send mode information, and additional information flag to additional information integration section 702.

(Pattern 6)

When the additional mode information obtained from additional information reception section 601 is bitrate2' and the send mode information obtained from coded information analysis section 602 is bitrate1, additional information coding section 701 codes the additional information based on a CELP type speech coding method using the transmission bit rate indicated by bitrate4", and outputs the obtained information source code of additional information, additional mode information, send mode information, and additional information flag to additional information integration section 702.

(Pattern 7)

When the additional mode information obtained from additional information reception section 601 is bitrate1' and the send mode information obtained from coded information analysis section 602 is bitrate3, additional information coding section 701 assesses that the transmission bit rate indicated by bitrate3" is not sufficient for coding the additional information and outputs the additional mode information, send mode information, and additional information flag to additional information integration section 702 without coding the additional information.

(Pattern 8)

When the additional mode information obtained from additional information reception section 601 is bitrate1' and the send mode information obtained from coded information analysis section 602 is bitrate2, additional information coding section 701 assesses that the transmission bit rate indicated by bitrate2" is not sufficient for coding the additional information and outputs the additional mode information, send mode information, and additional information flag to additional information integration section 702 without coding the additional information.

(Pattern 9)

When the additional mode information obtained from additional information reception section 601 is bitrate1' and the send mode information obtained from coded information analysis section 602 is bitrate1, additional information coding section 701 codes the additional information based on a CELP type speech coding method using the transmission bit rate indicated by bitrate1", and outputs the obtained information source code of additional information, additional mode information, send mode information, and additional information flag to additional information integration section 702.

This concludes the description of the coding processing of additional information coding section 701.

When additional mode information, information source code of additional information, send mode information, and an additional information flag are input from additional information coding section 701, and the information source code of each layer is input from coded information analysis section 602, additional information integration section 702 integrates the information source code of each layer and the information source code of additional information in accordance with the combinations of additional mode information and send mode information, and outputs the obtained information source code, information source code of additional information, send mode information, additional information flag, and additional mode information to coded information integration section 604. When additional mode information, information source code of additional information, send mode information, additional information flag, and the information source code of each layer are not input, additional information integration section 702 does not perform any operation.

The following separates the integration processing of additional information integration section 702 into nine patterns that correspond to the combinations of send mode information and additional mode information, describing each pattern in detail.

(Pattern 1)

When the additional mode information and the send mode information obtained from additional information coding section 701 are bitrate3' and bitrate3, respectively, additional information integration section 702 replaces the base layer information source code with the information source code of additional information, assigns bitrate0 to the send mode information, assigns bitrate3" to the additional mode information, and outputs the information source code of additional information, additional mode information, and send mode information to coded information integration section 604. In addition, at this time, additional information integration section 702 outputs the additional information flag assigned a value of 1 to coded information integration section 604.

(Pattern 2)

When the additional mode information and the send mode information obtained from additional information coding section 701 are bitrate3' and bitrate2, respectively, additional information integration section 702 replaces the first enhancement layer information source code with the information source code of additional information, assigns bitrate3 to the send mode information, assigns bitrate5" to the additional mode information, and outputs the base layer information source code, information source code of additional information, additional mode information, and send mode information to coded information integration section 604. In addition, at this time, additional information integration section 702 outputs the additional information flag assigned a value of 1 to coded information integration section 604.

(Pattern 3)

When the additional mode information and the send mode information obtained from additional information coding section 701 are bitrate3' and bitrate1, respectively, additional information integration section 702 replaces the second enhancement layer information source code with the information source code of additional information, assigns bitrate2 to the send mode information, assigns bitrate6" to the additional mode information, and outputs the base layer information source code, first enhancement layer information source code, information source code of additional information, additional mode information, and send mode information to coded information integration section 604. In addition, at this time, additional information integration section 702 outputs the additional information flag assigned a value of 1 to coded information integration section 604.

(Pattern 4)

When the additional mode information and the send mode information obtained from additional information coding section 701 are bitrate2' and bitrate3, respectively additional information integration section 702 outputs the base layer information source code and send mode information to coded information integration section 604 without performing integration processing. In addition, at this time, additional information integration section 702 outputs the additional information flag assigned a value of 0 to coded information integration section 604.

(Pattern 5)

When the additional mode information and the send mode information obtained from additional information coding section 701 are bitrate2' and bitrate2, respectively, additional information integration section 702 replaces the base layer information source code and first enhancement layer information source code with the information source code of additional information, assigns bitrate0 to the send mode information, assigns bitrate2" to the additional mode information, and outputs the information source code of additional information, additional mode information, and send mode information to coded information integration section 604. In addition, at this time, additional information integration section 702 outputs the additional information flag assigned a value of 1 to coded information integration section 604.

(Pattern 6)

When the additional mode information and the send mode information obtained from additional information coding section 701 are bitrate2' and bitrate1, respectively, additional information integration section 702 replaces the first enhancement layer information source code and second enhancement layer information source code with the information source code of additional information, assigns bitrate3 to the send mode information, assigns bitrate4" to the additional mode information, and outputs the base layer information source code, information source code of additional information, additional mode information, and send mode information to coded information integration section 604. In addition, at this time, additional information integration section 702 outputs the additional information flag assigned a value of 1 to coded information integration section 604.

(Pattern 7)

When the additional mode information and the send mode information obtained from additional information coding section 701 are bitrate1' and bitrate3, respectively, additional information integration section 702 outputs the base layer information source code and send mode information to coded information integration section 604 without performing integration processing. In addition, at this time, additional information integration section 702 outputs the additional information flag assigned a value of 0 to coded information integration section 604.

(Pattern 8)

When the additional mode information and the send mode information obtained from additional information coding section 701 are bitrate1' and bitrate2, respectively, additional information integration section 702 outputs the base layer information source code, first enhancement layer information source code, and send mode information to coded information integration section 604 without performing integration processing. In addition, at this time, additional information integration section 702 outputs the additional information flag assigned a value of 0 to coded information integration section 604.

(Pattern 9)

When the additional mode information and the send mode information obtained from additional information coding section 701 are bitrate1' and bitrate1, respectively, additional information integration section 702 replaces the base layer information source code, first enhancement layer information source code, and second enhancement layer information source code with the information source code of additional information, assigns bitrate0 to the send mode information, assigns bitrate1" to the additional mode information, and outputs the information source code of additional information, additional mode information, and send mode information to coded information integration section 604. In addition, at this time, additional information integration section 702 outputs the additional information flag assigned a value of 1 to coded information integration section 604.

This concludes the description of the integration processing of additional information integration section 702.

Figure 8:
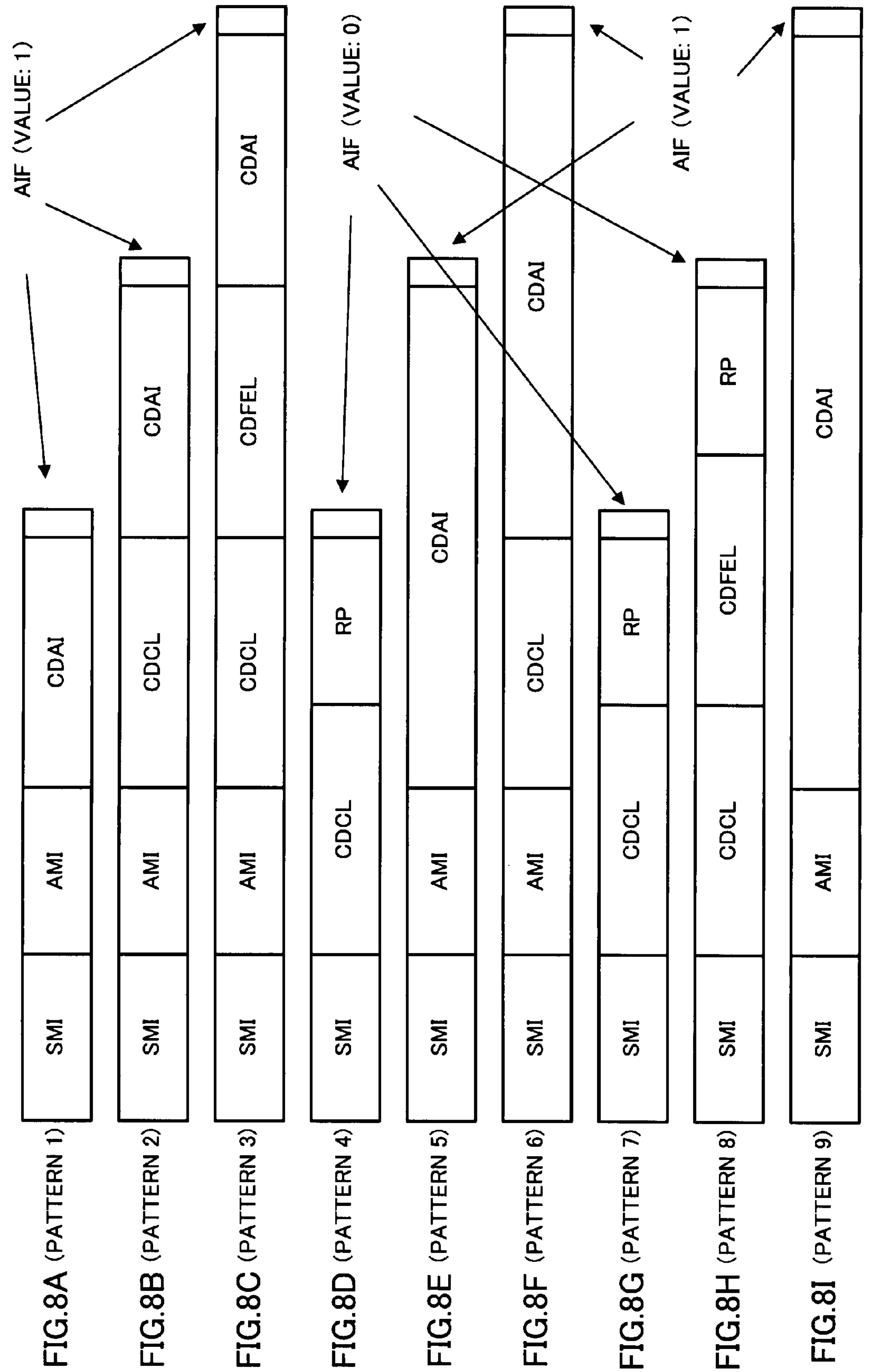
FIG. 8 is a block diagram showing the structure of the data transmitted from the relay apparatus according to Embodiment 1 of the present invention.

The data structure (bit stream) of the coded information output from coded information integration section 604 is a data structure such as (a) to (i) of FIG. 8, corresponding to (pattern 1) to (pattern 9) of additional information integration section 702, respectively.

Figure 9:
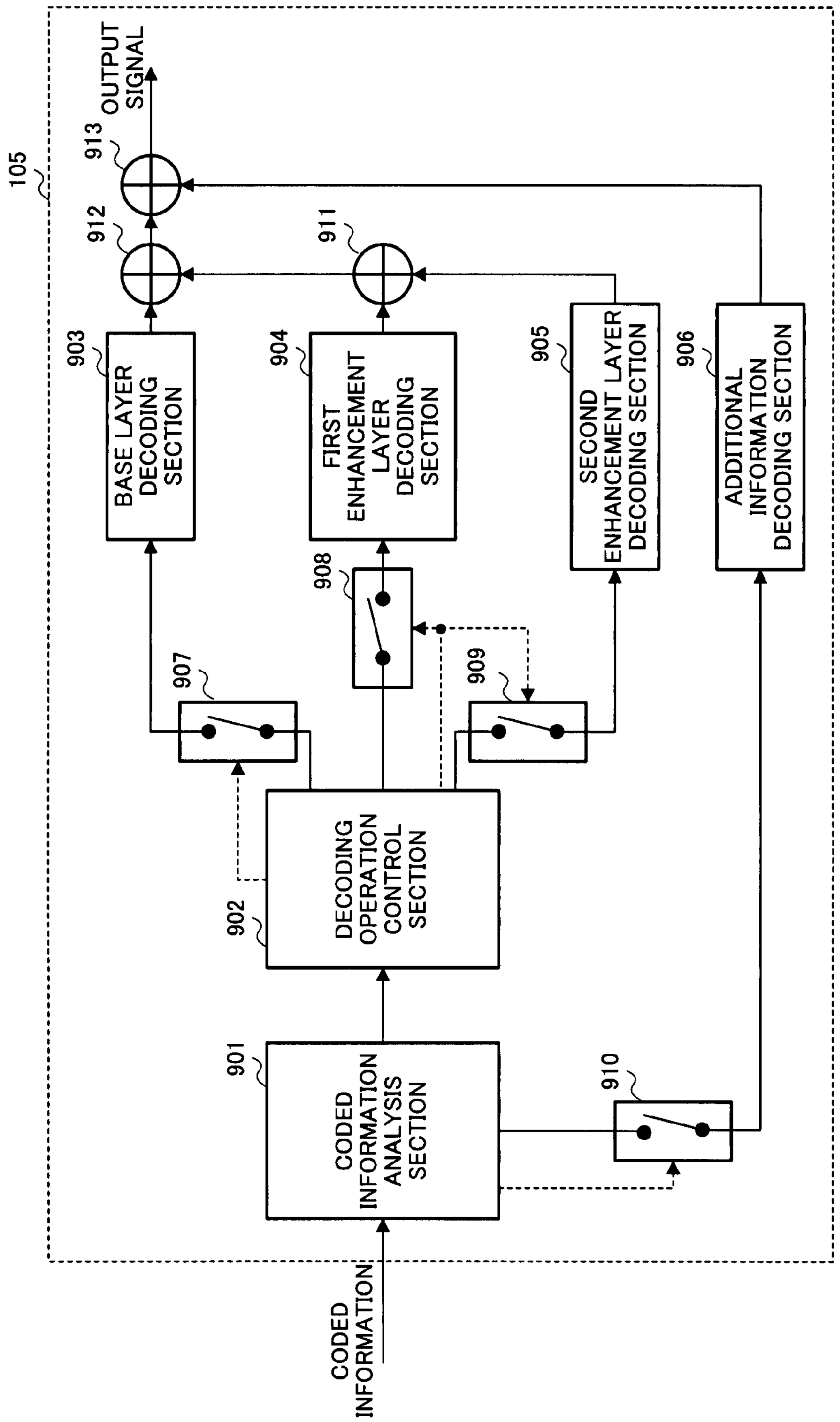
FIG. 9 is a block diagram showing the internal configuration of the signal decoding apparatus according to Embodiment 1 of the present invention.

Next, the configuration of signal decoding apparatus 105 of FIG. 1 will be described using FIG. 9. Signal decoding apparatus 105 mainly comprises coded information analysis section 901, decoding operation control section 902, base layer decoding section 903, first enhancement layer decoding section 904, second enhancement layer decoding section 905, additional information decoding section 906, control switches 907 to 910, and addition sections 911 to 913.

Coded information is input to coded information analysis section 901. When the value of the additional information flag of the input coded information is 1, coded information analysis section 901 separates the coded information into send mode information, additional mode information, information source code of each layer, and information source code of additional information, outputs the obtained additional mode information, send mode information, and information source code of each layer to decoding operation control section 902, and outputs the additional mode information and information source code of additional information to additional information decoding section 906. When the value of the additional information flag of the input coded information is 0, coded information analysis section 901 separates the coded information into send mode information and the information source code of each layer, and outputs the obtained send mode information and information source code of each layer to decoding operation control section 902. In addition, coded information analysis section 901 controls the ON/OFF setting of control switch 910 in accordance with the analysis result of the coded information. Specifically, when the value of the additional information flag of the input coded information is 0, coded information analysis section 901 sets control switch 910 to OFF, and when the value of the additional information flag of the input coded information is 1, coded information analysis section 910 sets control switch 910 to ON.

Decoding operation control section 902 controls the ON/OFF settings of control switches 907 to 909 in accordance with the send mode information obtained from coded information analysis section 901, and outputs the information source code of each layer to base layer decoding section 903, first enhancement layer decoding section 904, and second enhancement layer decoding section 905. Specifically, when the send mode information obtained from coded information analysis section 901 is bitrate3, decoding operation control section 902 sets control switch 907 to ON, sets control switches 908 and 909 to OFF, outputs the base layer information source code to base layer decoding section 903, and does not output anything to first enhancement layer decoding section 904 or second enhancement layer decoding section 905. When the send mode information obtained from coded information analysis section 901 is bitrate2, decoding operation control section 902 sets control switches 907 and 908 to ON, sets control switch 909 to OFF, outputs the base layer information source code to base layer decoding section 903, outputs the first enhancement layer information source code to first enhancement layer decoding section 904, and does not output anything to second enhancement layer decoding section 905. When the send mode information obtained from coded information analysis section 901 is bitrate1, decoding operation control section 902 sets all control switches 907 to 909 to ON, outputs the base layer information source code to base layer decoding section 903, outputs the first enhancement layer information source code to first enhancement layer decoding section 904, and outputs the second enhancement layer information source code to second enhancement layer decoding section 905. When the send mode information obtained from coded information analysis section 901 is bitrate0, decoding operation control section 902 sets all control switches 907 to 909 to OFF, and does not output anything to base layer decoding section 903, first enhancement layer decoding section 904, or second enhancement layer decoding section 905.

When control switch 907 is ON, base layer decoding section 903 decodes the base layer information source code output from decoding operation control section 902 using a CELP type speech decoding method, and outputs the decoded signal obtained from decoding (hereinafter "base layer decoded signal") to addition section 912. When control switch 907 is OFF, base layer decoding section 903 does not perform any operation.

When control switch 908 is ON, first enhancement layer decoding section 904 decodes the first enhancement layer information source code output from decoding operation control section 902 using a CELP type speech decoding method, and outputs the decoded signal obtained from decoding (hereinafter "first enhancement layer decoded signal") to addition section 911. When control switch 908 is OFF, first enhancement layer decoding section 904 does not perform any operation.

When control switch 909 is ON, second enhancement layer decoding section 905 decodes the first enhancement layer information source code output from decoding operation control section 902 using a CELP type speech decoding method, and outputs the decoded signal obtained from decoding (hereinafter "first enhancement layer decoded signal") to addition section 911. When control switch 909 is OFF, second enhancement layer decoding section 905 does not perform any operation.

Additional information decoding section 906 comprises a multi-rate decoding technique capable of decoding the input information source code at a plurality of transmission bit rates. In the present embodiment, decoding is possible using the six predetermined transmission bit rates bitrate1", bitrate2", bitrate3", bitrate4", bitrate5", and bitrate6" in accordance with the additional mode information obtained from coded information analysis section 901. The value of each of the six transmission bit rates, similar to the example of additional information coding section 701, is expressed by the above equation (1) using bitrate1, bitrate2, and bitrate3. When control switch 910 is ON, additional information decoding section 906 decodes the information source code of additional information obtained from coded information analysis section 901 based on the transmission bit rate corresponding to the additional mode information obtained from coded information analysis section 901 using a CELP type speech decoding method, and outputs the decoded signal obtained from decoding (hereinafter "additional information decoded signal") to addition section 913. When control switch 910 is OFF, additional information decoding section 906 does not perform any operation.

The internal configurations of base layer decoding section 903, first enhancement layer decoding section 904, second enhancement layer decoding section 905, and additional information decoding section 906 are the same as that of the above base layer decoding section 208 only with a different information source code type input and signal type output, and detailed descriptions thereof will be omitted.

When control switches 908 and 909 are ON, addition section 911 adds the second enhancement layer decoded signal output from second enhancement layer decoding section 905 and the first enhancement layer decoded signal output from first enhancement layer decoding section 904, and outputs the signal after the addition to addition section 912. When control switch 909 is OFF and control switch 908 is ON, addition section 911 outputs the first enhancement layer decoded signal output from first enhancement layer decoding section 904 to addition section 912. When control switches 908 and 909 are OFF, addition section 911 does not perform any operation.

When control switches 907 and 908 are ON, addition section 912 adds the base layer decoded signal output from base layer decoding section 903 and the output signal of addition section 911, and outputs the signal after the addition to addition section 913. When control switch 907 is ON and control switch 908 is OFF, addition section 912 outputs the base layer decoded signal output from base layer decoding section 903 to addition section 913. When control switches 907 and 908 are OFF, addition section 912 does not perform any operation.

When control switches 907 and 910 are ON, addition section 913 adds the output signal of addition section 912 and the additional information decoded signal obtained from additional information decoding section 906, and outputs the signal after the addition as the output signal. When control switch 907 is ON and control switch 910 is OFF, addition section 913 outputs the output signal of addition section 912. When control switch 907 is OFF and control switch 910 is ON, addition section 913 outputs the additional information decoded signal obtained from additional information decoding section 906 as the output signal. When control switches 907 and 910 are OFF, addition section 913 does not perform any operation.

This concludes the description of the internal configuration of signal decoding apparatus 105 of FIG. 1.

In this manner, according to the present embodiment, in a communication system that contains a relay apparatus that transmits speech and audio signals using scalable coding technology, layers of an appropriate information volume are assigned in accordance with the type of additional information input to the relay apparatus, and the coded information of the speech and audio signals is integrated with the coded additional information using that information volume and transmitted to the signal decoding apparatus. As a result, the calculation cost in the decoding process can be suppressed and the additional information requiring immediacy such as emergency disaster information can be transmitted at the same time as the speech and signals from the signal coding apparatus without further increasing the information volume transmitted.

Furthermore, while the present embodiment describes the case where a CELP type speech coding/decoding method is used as the coding method of the coding apparatus, the present invention is not limited thereto and can also be similarly applied to signals other than speech and audio signals such as static images and dynamic images.

In addition, the present invention is not limited in terms of layers, and can also be applied to cases where the difference between the input signal and output signal of the lower layer, i.e., the differential signal, is coded in the upper layer based on a hierarchical signal coding/decoding method configured with a plurality of layers.

Further, in the present embodiment, the additional information input to the relay apparatus is coded based on a transmission bit rate corresponding to the additional mode information similarly input to the relay apparatus in principle. Thus, it is explained that when the transmission bit rate corresponding to the input additional mode information is higher than the transmission bit rate of the speech and audio signals transmitted from the signal coding apparatus to the relay apparatus (pattern 4, pattern 7, and pattern 8 of additional information coding section 701), the additional information cannot be sent. Nevertheless, the present invention is not limited thereto and can utilize technique of coding the additional information based on a bit rate less than or equal to the transmission bit rate of the speech and audio signals transmitted from the signal coding apparatus to the relay apparatus, rather than the transmission bit rate corresponding to the additional mode information. In addition, at this time, the additional mode information input to the relay apparatus needs to be replaced with the additional mode information corresponding to the transmission bit rate utilized for coding.

Further, in the present embodiment, the additional information input to the relay apparatus is, as an example, regional disaster information, etc., with high immediacy, and the additional information is given priority over speech information when both the speech information and additional information transmitted from the coding apparatus side cannot be sent simultaneously (pattern 1, pattern 5, and pattern 9 of additional information coding section 701). Nevertheless, the present invention is not limited thereto and can also be similarly applied to cases similar to the above where the speech information is conversely transmitted to the decoding side with higher priority by replacing the information source code of additional information and the transmission bit rate assignment for the information source code of the speech and audio signals transmitted from the transmission apparatus at the time of the above patterns. At this time, a decoding method corresponding to the respective bit rate control of the coding side needs to be performed on the decoding apparatus side as well.

Figure 6:
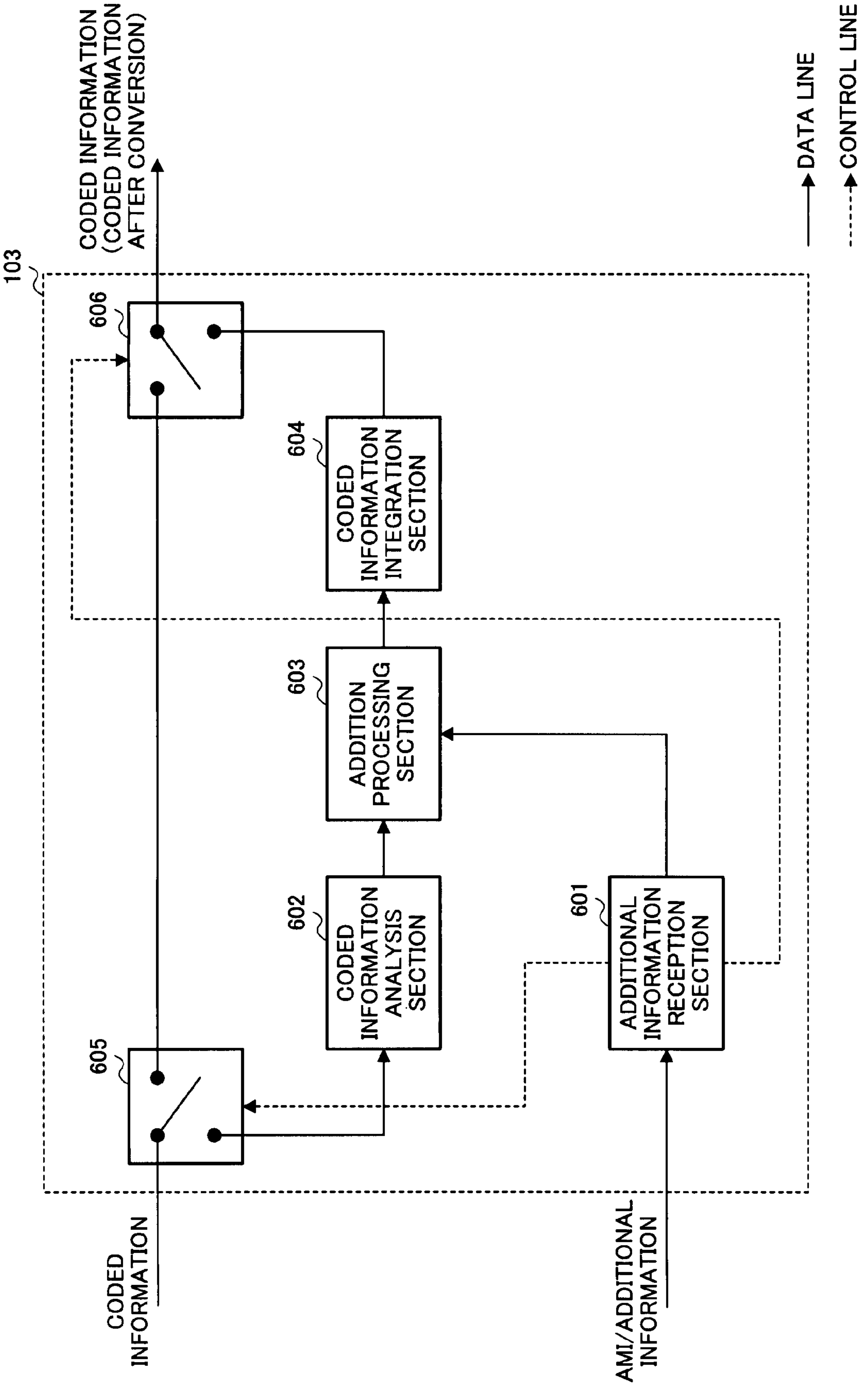
FIG. 6 is a block diagram showing the internal configuration of the relay apparatus according to Embodiment 1 of the present invention.
Figure 7:
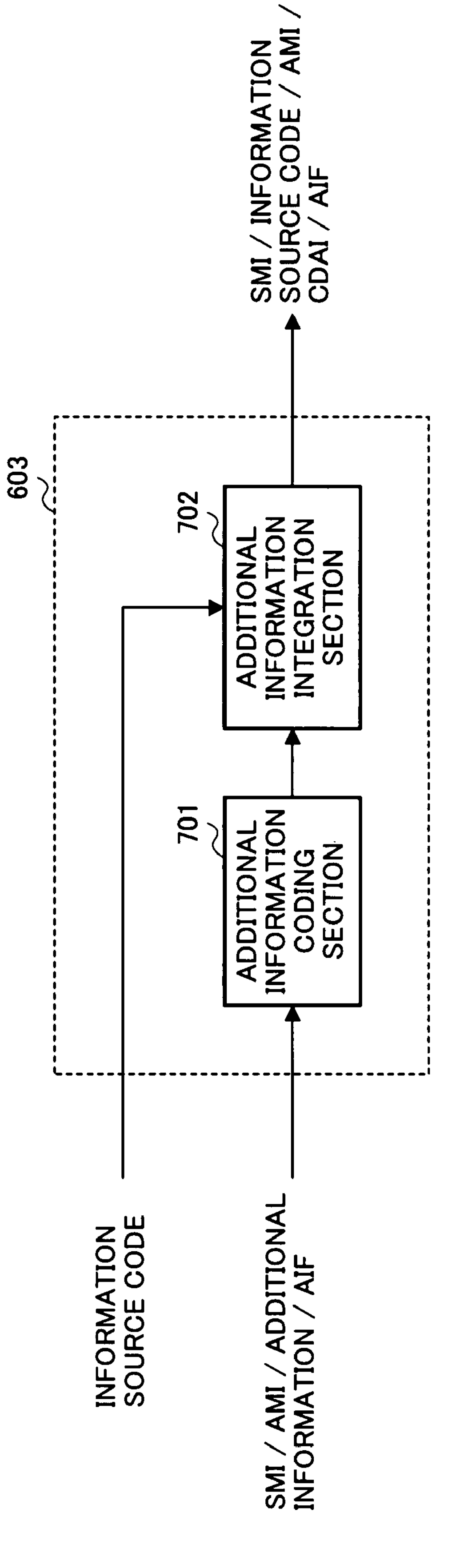
FIG. 7 is a block diagram showing the internal configuration of the addition processing section of the relay apparatus according to Embodiment 1 of the present invention.

In addition, the present invention can also be applied to cases where the configuration of the present embodiment shown in FIG. 6 records and writes on a machine-readable recording medium such as memory, disk, tape, CD, or DVD, achieving behavior and effects similar to those of the present embodiment.

Embodiment 2

While the above Embodiment 1 describes the case where the target additional information input to the relay apparatus is speech and audio information, the present invention is not limited thereto and can be similarly applied to cases where the target additional information is signals other than speech and audio information signals such as those of text information, static image information, or dynamic image information.

However, when the additional information has a comparatively high information volume such as for image information and the coding compression rate is taken into account, the information must be divided into a plurality of frames and added when the information volume of a single frame alone is insufficient. In addition, the transmission bit rate of a coding scheme with data transmitted from the sending side is low for speech and audio signals so that it is also conceivable that the information cannot be added within a single frame in the specified additional information mode.

Here, in Embodiment 2 of the present invention, the case where the additional information is divided into a plurality of frames and added in the relay apparatus and the result is transmitted to the signal decoding apparatus is explained. Further, the following describes the case where the target additional information is speech and audio signals. The case for image information and text information will be described hereinafter.

The configuration of the overall system of the present embodiment is the same as that of FIG. 1 of Embodiment 1, and the behavior of signal coding apparatus 101 is the same as that of Embodiment 1.

The behavior of relay apparatus 103 of the present embodiment will now be described. Additional mode information and additional information are input to relay apparatus 103. When additional mode information and additional information are input, relay apparatus 103 adds the additional information to the coded information transmitted via transmission path A 102, and transmits the obtained coded information after the addition processing (coded information after conversion) to transmission path B 104. When additional mode information and additional information are not input, relay apparatus 103 outputs the coded information transmitted via transmission path A 102 to transmission path B 104.

Here, the additional mode information input to relay apparatus 103 comprises the information that provides bit rate instructions at the time the above additional information is coded and transmitted (bitrate1', bitrate2', and bitrate3') and a real-time flag that indicates whether the technique of transmitting the additional information from the relay apparatus is real-time or not real-time. Here, a real-time flag value of 1 indicates that the output information of the additional information is to be transmitted in a single frame, and a real-time flag value of 0 indicates that the output information of the additional information is to be divided and transmitted in a plurality of frames.

Next, the internal configuration of relay apparatus 103 of the present embodiment will be described. Note, however, that the configuration itself of relay apparatus 103 is the same as that of FIG. 6 of Embodiment 1, and the behavior of each component other than additional information coding section 701 of addition processing section 603, additional information integration section 702, and coded information integration section 604 of relay apparatus 103 is the same as that of Embodiment 1, and detailed descriptions thereof will be omitted.

When additional mode information and additional information are input from additional information reception section 601 and send mode information and an additional information flag are input from coded information analysis section 602, additional information coding section 701 codes the additional information based on the transmission bit rate corresponding to the combination of the additional mode information and send mode information using a CELP type speech coding method, and outputs the information source code obtained from coding (hereinafter "information source code of additional information"), send mode information, additional mode information, and additional information flag to additional information integration section 702. In addition, additional information coding section 701 comprises internal memory capable of information storage.

The following separates the coding processing of additional information coding section 701 of the present embodiment into nine patterns that correspond to the combinations of send mode information and additional mode information, describing each pattern in detail. Note, however, that the processing for the patterns other than pattern 4, pattern 7, and pattern 8 is the same as that described in Embodiment 1, regardless of the real-time flag value, and detailed descriptions thereof will be omitted.

(Pattern 4)

When the additional mode information obtained from additional information reception section 601 is bitrate2' and the send mode information obtained from coded information analysis section 602 is bitrate3 and the value of the real-time flag contained in the additional mode information is 1, additional information coding section 701 assesses that the transmission bit rate indicated by bitrate3 is not sufficient for coding the additional information and outputs the additional mode information, send mode information, and additional information flag to additional information integration section 702 without coding the additional information (pattern 4a). When the additional mode information obtained from additional information reception section 601 is bitrate2' and the send mode information obtained from coded information analysis section 602 is bitrate3 and the value of the real-time flag contained in the additional mode information is 0, additional information coding section 701 codes the additional information based on the transmission bit rate indicated by bitrate2" using a CELP type speech decoding method, and outputs part of the obtained information source code of additional information corresponding to bitrate3", the send mode information, and the additional information flag to additional information integration section 702. In addition, in this case additional information coding section 701 divides the additional information into several frames, adds the information indicating the frame index (frame index information) that indicates the sequence number of the additional information in the frame to the additional mode information, and outputs this information as new additional mode information to additional information integration section 702 (pattern 4b)

(Pattern 7)

When the additional mode information obtained from additional information reception section 601 is bitrate1' and the send mode information obtained from coded information analysis section 602 is bitrate3 and the value of the real-time flag contained in the additional mode information is 1, additional information coding section 701 assesses that the transmission bit rate indicated by bitrate3" is not sufficient for coding the additional information and outputs the additional mode information, send mode information, and additional information flag to additional information integration section 702 without coding the additional information (pattern 7a). When the additional mode information obtained from additional information reception section 601 is bitrate1' and the send mode information obtained from coded information analysis section 602 is bitrate3 and the value of the real-time flag contained in the additional mode information is 0, additional information coding section 701 codes the additional information based on the transmission bit rate indicated by bitrate1", and outputs part of the obtained information source code of additional information corresponding to bitrate3", the send mode information, and the additional information flag to additional information integration section 702. In addition, in this case additional information coding section 701 divides the additional information into several frames, adds the information indicating the frame index (frame index information) that indicates the sequence number of the additional information in the frame to the additional mode information, and outputs this information as new additional mode information to additional information integration section 702 (pattern 7b).

(Pattern 8)

When the additional mode information obtained from additional information reception section 601 is bitrate1' and the send mode information obtained from coded information analysis section 602 is bitrate2 and the value of the real-time flag contained in the additional mode information is 1, additional information coding section 701 assesses that the transmission bit rate indicated by bitrate2" is not sufficient for coding the additional information and outputs the additional mode information, send mode information, and additional information flag to additional information integration section 702 without coding the additional information (pattern 8a). When the additional mode information obtained from additional information reception section 601 is bitrate1' and the send mode information obtained from coded information analysis section 602 is bitrate2 and the value of the real-time flag contained in the additional mode information is 0, additional information coding section 701 codes the additional information based on the transmission bit rate indicated by bitrate1", and outputs part of the obtained information source code of additional information corresponding to bitrate2", the send mode information, and the additional information flag to additional information integration section 702. In addition, in this case additional information coding section 701 divides the additional information into several frames, adds the information indicating the frame index (frame index information) that indicates the sequence number of the additional information in the frame to the additional mode information, and outputs this information as new additional mode information to additional information integration section 702 (pattern 8b).

Further, in patterns 4a, 4b, 7a, 7b, 8a, and 8b, the part of the information source code of additional information that was not transmitted in the frame and the additional mode information, send mode information, and additional information flag at that time are stored in the memory provided in additional information coding section 701 and, the moment new additional information is no longer input to relay apparatus 103, are sequentially output to additional information integration section 702 in the order the information was stored.

Next, the behavior of additional information integration section 702 of the present embodiment will be described. When additional mode information, information source code of additional information, send mode information, and an additional information flag are input from additional information coding section 701 and the information source code of each layer is input from coded information analysis section 602, additional information integration section 702 integrates the information source code of each layer with the information source code of additional information in accordance with the combinations of additional mode information and send mode information, and outputs the obtained information source code, information source code of additional information, send mode information, additional mode information, and additional information flag to coded information integration section 604. When additional mode information, information source code of additional information, send mode information, and an additional information flag are not input from additional information coding section 701 and the information source code of each layer is not input from coded information analysis section 602, additional information integration section 702 does not perform any operation.

The following divides the integration processing of additional information integration section 702 of the present embodiment into nine patterns that correspond to the combinations of send mode information and additional mode information, describing each pattern in detail. Note, however, that the processing for the patterns other than pattern 4, pattern 7, and pattern 8 is the same as that described in Embodiment 1, regardless of the real-time flag value, and detailed descriptions thereof will be omitted.

(Pattern 4)

When the additional mode information obtained from additional information coding section 701 is bitrate2' and the send mode information is bitrate3 and the value of the real-time flag contained in the additional mode information is 1, additional information integration section 702 outputs the base layer information source code and send mode information to coded information integration section 604 without performing any integration. In addition, at this time, additional information integration section 702 outputs the additional information flag assigned the value 0 to coded information integration section 604 (pattern 4a). When the additional mode information obtained from additional information coding section 701 is bitrate2' and the send mode information is bitrate3 and the value of the real-time flag contained in the additional mode information is 0, additional information integration section 702 replaces the base layer information source code with the information source code of additional information, assigns bitrate0 to the send mode information, assigns bitrate2" to the additional mode information, and outputs the information source code of additional information, additional mode information, and send mode information to coded information integration section 604. In addition, at this time, additional information integration section 702 outputs the additional information flag assigned the value 1 to coded information integration section 604 (pattern 4b).

(Pattern 7)

When the additional mode information obtained from additional information coding section 701 is bitrate1' and the send mode information is bitrate3 and the value of the real-time flag contained in the additional mode information is 1, additional information integration section 702 outputs the base layer information source code and send mode information to coded information integration section 604 without performing any integration. In addition, at this time, additional information integration section 702 outputs the additional information flag assigned the value 0 to coded information integration section 604 (pattern 7a). When the additional mode information obtained from additional information coding section 701 is bitrate1' and the send mode information is bitrate3 and the value of the real-time flag contained in the additional mode information is 0, additional information integration section 702 replaces the base layer information source code with the information source code of additional information, assigns bitrate0 to the send mode information, assigns bitrate1" to the additional mode information, and outputs the information source code of additional information, additional mode information, and send mode information to coded information integration section 604. In addition, at this time, additional information integration section 702 outputs the additional information flag assigned the value 1 to coded information integration section 604 (pattern 7b).

(Pattern 8)

When the additional mode information obtained from additional information coding section 701 is bitrate1' and the send mode information is bitrate2 and the value of the real-time flag contained in the additional mode information is 1, additional information integration section 702 outputs the base layer information source code, first enhancement layer information source code, and send mode information to coded information integration section 604 without performing any integration. In addition, at this time, additional information integration section 702 outputs the additional information flag assigned the value 0 to coded information integration section 604 (pattern 8a). When the additional mode information obtained from additional information coding section 701 is bitrate1' and the send mode information is bitrate2 and the value of the real-time flag contained in the additional mode information is 0, additional information integration section 702 replaces the base layer information source code and first enhancement layer information source code with the information source code of additional information, assigns bitrate0 to the send mode information, assigns bitrate1" to the additional mode information, and outputs the information source code of additional information, additional mode information, and send mode information to coded information integration section 604. In addition, at this time, additional information integration section 702 outputs the additional information flag assigned the value 1 to coded information integration section 604 (pattern 8b).

When send mode information, additional mode information, an additional information flag, and the information source code of each layer are input from additional information integration section 702, coded information integration section 604 integrates the information and outputs the result as coded information after conversion to control switch 606. When send mode information, additional mode information, an additional information flag, and the information source code of each layer are not input from additional information integration section 702, coded information integration section 604 does not perform any operation.

Next, signal decoding apparatus 105 of the present embodiment will be described. The configuration of signal decoding apparatus 105 of the present embodiment is the same as that of FIG. 9, and the behavior of the sections other than additional information decoding section 906 is the same as that in the above Embodiment 1, and detailed descriptions thereof will be omitted.

Additional information decoding section 906 has internal memory capable of storing information source code and comprises a multi-rate decoding technique capable of decoding input information source code at a plurality of transmission bit rates. In the present embodiment, decoding is possible using the six predetermined transmission bit rates bitrate1", bitrate2", bitrate3", bitrate4", bitrate5", and bitrate6" in accordance with the additional mode information obtained from coded information analysis section 901. The value of each of the six transmission bit rates, similar to the example of additional information coding section 701, is expressed by the above equation (1) using bitrate1, bitrate2, and bitrate3.

When control switch 910 is ON, additional information decoding section 906 decodes the information source code of additional information obtained from coded information analysis section 901 based on the transmission bit rate corresponding to the additional mode information obtained from coded information analysis section 901 using a CELP type speech decoding method, and outputs the decoded signal obtained from decoding (hereinafter "additional information decoded signal") to addition section 913. When control switch 910 is OFF, additional information decoding section 906 does not perform any operation.

The decoding methods corresponding to the additional mode information will now be described. When the real-time flag contained in the additional mode information obtained from coded information analysis section 901 is 1, additional information decoding section 906 decodes the information source code of additional information based on the transmission bit rate indicated by the additional mode information (bitrate1" to bitrate6"), and outputs the obtained additional information decoded signal to addition section 913. When the real-time flag contained in the additional mode information obtained from coded information analysis section 901 is 0, additional information decoding section 906 refers to the frame index information contained in the additional mode information, stores the information source code of additional information in the provided internal memory until all information source code of additional information divided into a plurality of frames is received, decodes all information source code of additional information based on the transmission bit rate indicated by the additional mode information (bitrate1" to bitrate6") the moment all the divided information source code of additional information is received, and outputs the obtained additional information decoded signal to addition section 913.

In this manner, according to the present embodiment, it is possible to compare the transmission bit rate indicated by the send mode information during transmission with the transmission bit rate at the time the additional information is decoded and, if the transmission bit rate of the additional information is higher than that of the decoded information, divide the additional information into a plurality of frames, add the additional information to the coded information, and transmit the result to signal decoding apparatus 105.

In addition, while the above explanation describes the processing for the case where the additional information is prioritized over the coded information to be transmitted and all bit rates are assigned to the additional information when the additional information is divided and transmitted, a technique of combining and transmitting the divided additional information with a part of the coded information is also possible using processing similar to that described in the above explanation.

Further, in addition to the division technique in the above explanation, a technique of fixing the transmission bit rate of the additional information to bitrate3" at all times and dividing and transmitting the additional information (applicable to pattern 1, pattern 2, and pattern 3 of additional information coding section 701) is also possible.

Figure 10:
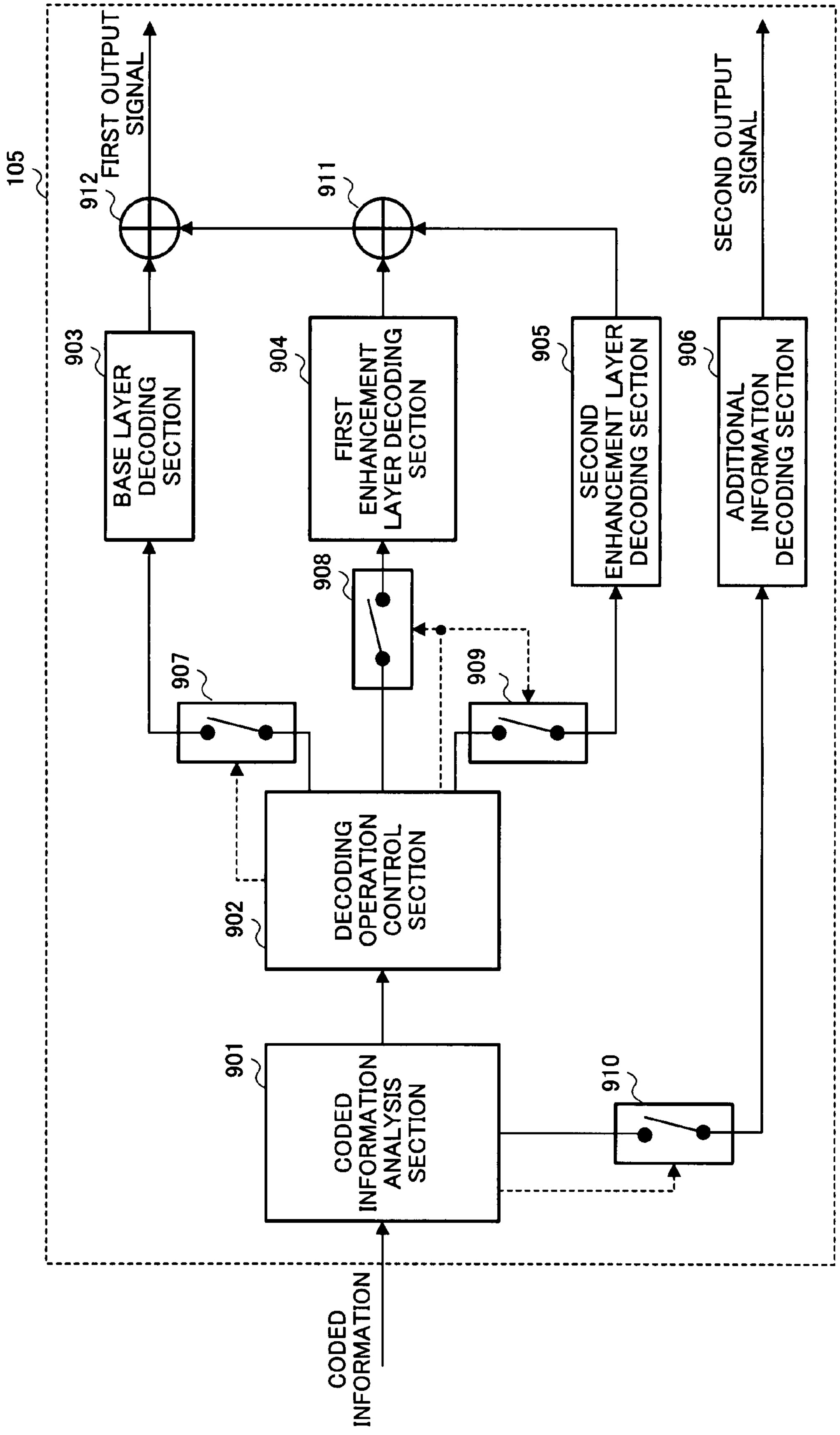
FIG. 10 is a block diagram showing the internal configuration of the signal decoding apparatus according to Embodiment 2 of the present invention.

In addition, even in cases where information such as image (dynamic image, static image) and text information are transmitted as additional information, the technique described heretofore can be similarly applied. Note, however, that when the additional information is image information and text information, a technique of decoding the respective information source code of additional information, a function for displaying the decoded additional information, or a function for notifying the user of information arrival is required in signal decoding apparatus 105. At this time, additional information decoding section 906 outputs the decoded additional information decoded signal to an apparatus that has an appropriate display function and notification function, rather than addition section 913. FIG. 10 shows a block diagram of a (image information and additional information) decoding apparatus for cases where the additional information is not a speech signal. FIG. 10, in comparison to FIG. 9, utilizes a configuration with addition section 913 removed, and the output signal of additional information decoding section 906 is output without being added to the output of addition section 912.

Embodiment 3

Embodiment 3 of the present invention describes the case of the above Embodiment 1 and Embodiment 2 that includes processing that reduces the noise that may occur along with the switching of the number of layers of coded information at the time additional information is added. The configuration of the overall system of the present embodiment is the same as that of FIG. 1 described in Embodiment 1.

Figures 11A, 11B, 11C:
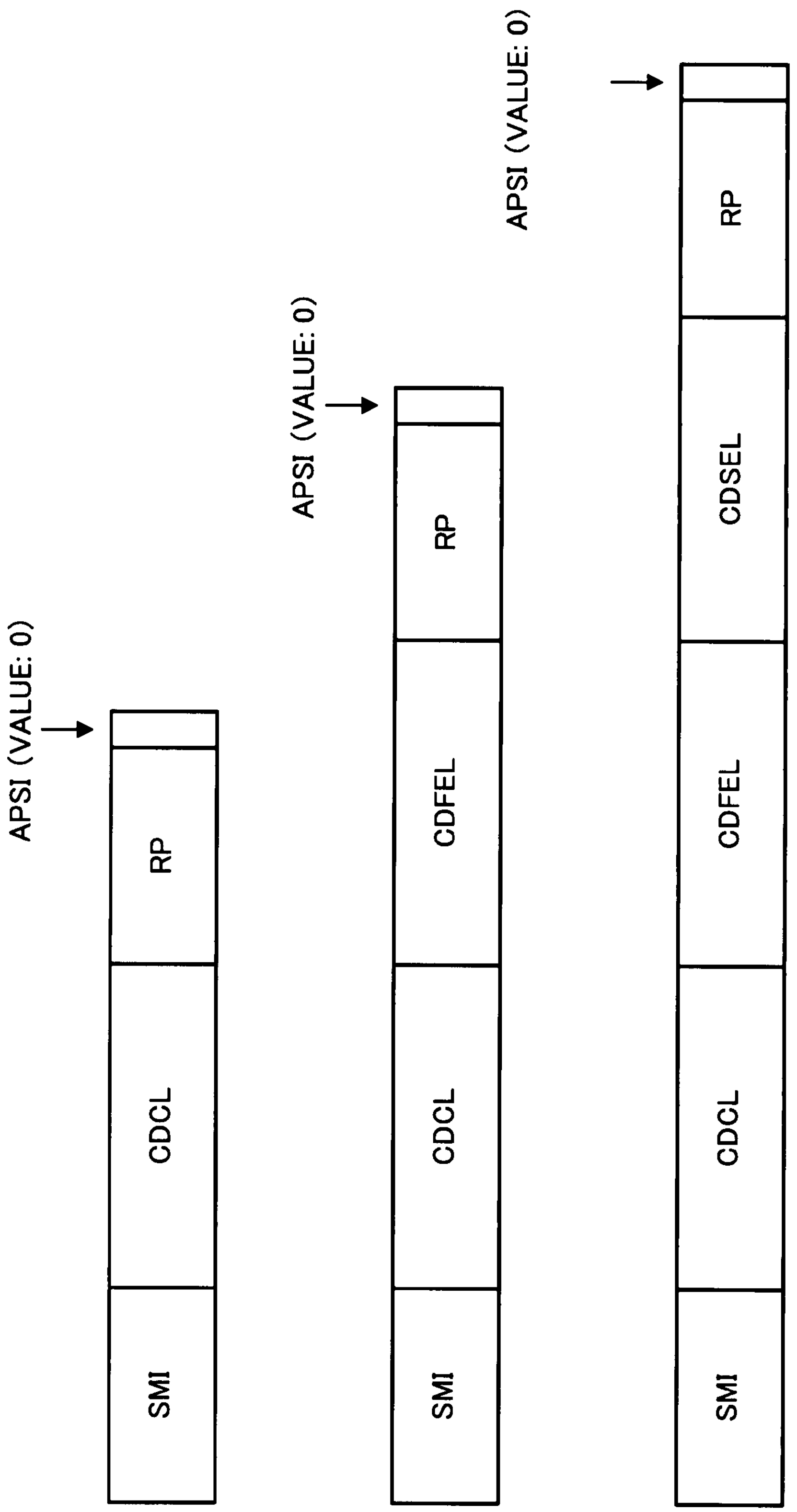
FIG. 11 is a block diagram showing the structure of the data transmitted from the signal coding apparatus according to Embodiment 3 of the present invention.

In the present embodiment, the structure of the data output from signal coding apparatus 101 is shown in FIG. 11, and the additional information flag of Embodiment 1 is enhanced and newly assigned as addition processing status information (initial value: 0). The addition processing status information (APSI) will be described hereinafter.

The behavior of relay apparatus 103 of the present embodiment will now be described. Additional mode information and additional information are input to relay apparatus 103. When additional mode information and additional information are input, relay apparatus 103 adds the additional information to the coded information transmitted via transmission path A 102, and transmits the obtained coded information after the addition processing (coded information after conversion) to transmission path B 104. When additional mode information and additional information are not input, relay apparatus 103 outputs the coded information transmitted via transmission path A 102 to transmission path B 104.

Next, the internal configuration of relay apparatus 103 of the present embodiment will be described. Note, however, that the configuration itself of relay apparatus 103 is the same as that of FIG. 6 of Embodiment 1, and the behavior of each component other than additional information reception section 601, additional information coding section 701 of addition processing section 603, additional information integration section 702, and coded information integration section 604 in relay apparatus 103 is the same as that of Embodiment 1 and detailed descriptions thereof will be omitted.

Additional information reception section 601 comprises a buffer (internal buffer) capable of internally storing additional information and additional mode information and, when additional mode information and additional information are input to relay apparatus 103, outputs the input additional mode information and the addition processing status information assigned a value of 1 to addition processing section 603 within a set period of time from the moment of input, and stores the input additional information in the internal buffer. Here, the addition processing status information is information indicating the four statuses "additional information not input (value: 0)", "within set period of time from start of additional information input (value: 1)", "after set period of time from start of additional information input (value: 2)", and "within set period of time from end of additional information input (value: 3)", and has an default value of 0. When additional mode information and additional information are input to relay apparatus 103, additional information reception section 601 outputs to addition processing section 603 the addition processing status information assigned a value of 2 along with the additional mode information and additional information stored in the internal buffer in the order stored, after a set period of time has passed from the moment of input. In addition, additional information reception section 601 outputs to addition processing section 603 the additional mode information and addition processing status information assigned a value of 3 just stored in the internal buffer, within a set period of time after all additional information stored in the internal buffer is output to addition processing section 603. When additional mode information and additional information are not input to relay apparatus 103, additional information reception section 601 does not output anything to addition processing section 603.

Further, additional information reception section 601 receives the additional mode information and additional information input to relay apparatus 103 and controls the ON/OFF settings of control switches 605 and 606 depending on whether additional mode information and additional information are input. Specifically, when within a set period of time after additional mode information and additional information are input to relay apparatus 103 (when the value of the addition processing status information is 1), or when additional information is not yet stored in the internal buffer (when the value of the addition processing status information is 2), or when within a set period of time after the internal buffer became empty (when the value of the addition processing status information is 3), additional information reception section 601 connects control switch 605 to the coded information analysis section 602 side and control switch 606 to the coded information integration section 604 side. When additional mode information and additional information are not input to relay apparatus 103, or when a set period of time has passed since the internal buffer became empty (when the value of the addition processing status information is 0), additional information reception section 601 connects control switch 605 to the control switch 606 side and control switch 606 to the control switch 605 side. In this manner, the operation of relay apparatus 103 is determined by controlling the ON/OFF settings of control switches 605 and 606 according to whether or not additional information is input to relay apparatus 103.

When send mode information and information source code of each layer corresponding to the send mode information are input from coded information analysis section 602 and additional mode information and addition processing status information are input from additional information reception section 601, addition processing section 603 performs the addition processing of the additional information to the information source code of each layer in accordance with the combinations of send mode information, the additional mode information and addition processing status information, and outputs the obtained information source code, send mode information, additional mode information, and addition processing status information to coded information integration section 604. When send mode information and the information source code of each layer corresponding to the send mode information are not input from coded information analysis section 602 and additional mode information and addition processing status information are not input from additional information reception section 601, addition processing section 603 does not perform any operation.

Figure 12:
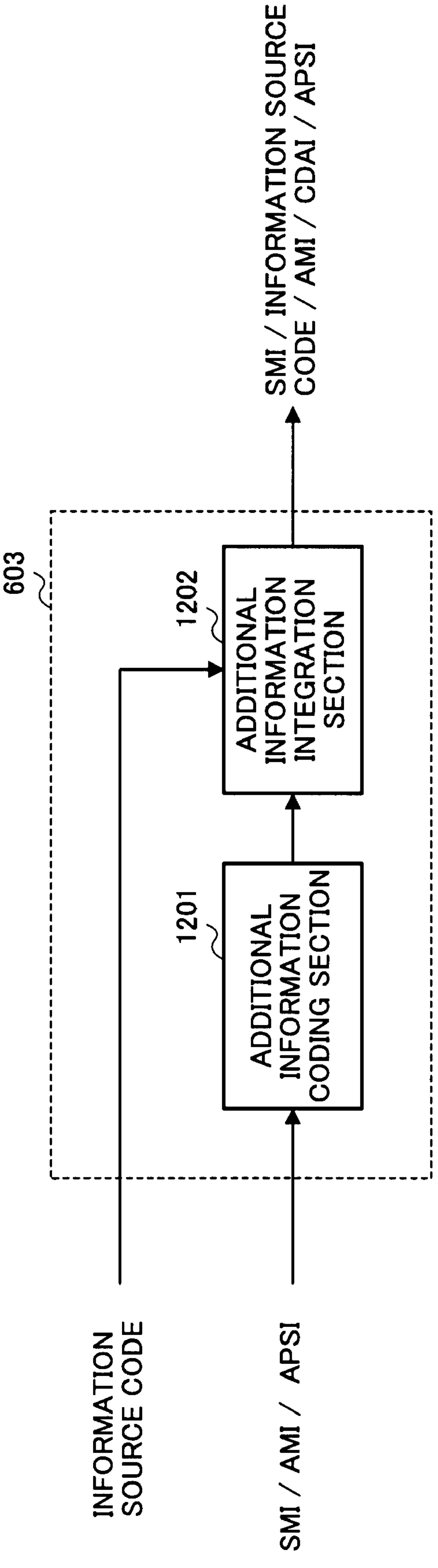
FIG. 12 is a block diagram showing the internal configuration of the addition processing section of the relay apparatus according to Embodiment 3 of the present invention.

Next, the configuration of addition processing section 603 of FIG. 6 will be described using FIG. 12. Addition processing section 603 mainly comprises additional information coding section 1201 and additional information integration section 1202.

When additional mode information and addition processing status information are input from additional information reception section 601 and send mode information is input from coded information analysis section 602, additional information coding section 1201 codes the additional information based on the transmission bit rate corresponding to the combinations of additional mode information, addition processing status information, and send mode information using a CELP type speech coding method, and outputs the information source code obtained from coding (hereinafter "information source code of additional information"), send mode information, additional mode information, and addition processing status information to additional information integration section 1202. When additional mode information, addition processing status information, and send mode information are not input, additional information coding section 1201 does not perform any operation.

Additional information coding section 1201 comprises a multi-rate coding method capable of coding input information (signals) at a plurality of transmission bit rates. In the present embodiment, the values of the six predetermined transmission bit rates bitrate1", bitrate2", bitrate3", bitrate4", bitrate5", and bitrate6" are available in accordance with the combinations of additional mode information obtained from the additional information reception section, and the send mode information obtained from coded information analysis section 602. The value of each of the six transmission bit rates is expressed by the above equation (1) using bitrate1, bitrate2, and bitrate3.

The following separates the coding processing of additional information coding section 1201 into nine patterns that correspond to the combinations of send mode information and additional mode information, describing each pattern in detail.

(Pattern 1)

When the additional mode information obtained from additional information reception section 601 is bitrate3' and the send mode information obtained from coded information analysis section 602 is bitrate3 and the value of the addition processing status information obtained from additional information reception section 601 is 2, additional information coding section 1201 codes the additional information based on a CELP type speech coding method using the transmission bit rate indicated by bitrate3", and outputs the obtained information source code of additional information, additional mode information, send mode information, and addition processing status information to additional information integration section 1202 (pattern 1a). When the additional mode information obtained from additional information reception section 601 is bitrate3' and the send mode information obtained from coded information analysis section 602 is bitrate3 and the value of the addition processing status information obtained from additional information reception section 601 is 1 or 3, additional information coding section 1201 outputs the additional mode information, send mode information, and addition processing status information to additional information integration section 1202 (pattern 1b).

(Pattern 2)

When the additional mode information obtained from additional information reception section 601 is bitrate3' and the send mode information obtained from coded information analysis section 602 is bitrate2 and the value of the addition processing status information obtained from additional information reception section 601 is 2, additional information coding section 1201 codes the additional information based on a CELP type speech coding method using the transmission bit rate indicated by bitrate5", and outputs the obtained information source code of additional information, additional mode information, send mode information, and addition processing status information to additional information integration section 1202 (pattern 2a). When the additional mode information obtained from additional information reception section 601 is bitrate3' and the send mode information obtained from coded information analysis section 602 is bitrate2 and the value of the addition processing status information obtained from additional information reception section 601 is 1 or 3, additional information coding section 1201 outputs the additional mode information, send mode information, and addition processing status information to additional information integration section 1202 (pattern 2b).

(Pattern 3)

When the additional mode information obtained from additional information reception section 601 is bitrate3' and the send mode information obtained from coded information analysis section 602 is bitrate1 and the value of the addition processing status information obtained from additional information reception section 601 is 2, additional information coding section 1201 codes the additional information based on a CELP type speech coding method using the transmission bit rate indicated by bitrate6", and outputs the obtained information source code of additional information, additional mode information, send mode information, and addition processing status information to additional information integration section 1202 (pattern 3a). When the additional mode information obtained from additional information reception section 601 is bitrate3' and the send mode information obtained from coded information analysis section 602 is bitrate1 and the value of the addition processing status information obtained from additional information reception section 601 is 1 or 3, additional information coding section 1201 outputs the additional mode information, send mode information, and addition processing status information to additional information integration section 1202 (pattern 3b).

(Pattern 4)

When the additional mode information obtained from additional information reception section 601 is bitrate2' and the send mode information obtained from coded information analysis section 602 is bitrate3, additional information coding section 1201 assesses that the transmission bit rate indicated by bitrate3" is not sufficient for coding the additional information and outputs the additional mode information, send mode information, and addition processing status information to additional information integration section 1202 without coding the additional information.

(Pattern 5)

When the additional mode information obtained from additional information reception section 601 is bitrate2' and the send mode information obtained from coded information analysis section 602 is bitrate2 and the value of the addition processing status information obtained from additional information reception section 601 is 2, additional information coding section 1201 codes the additional information based on a CELP type speech coding method using the transmission bit rate indicated by bitrate2", and outputs the obtained information source code of additional information, additional mode information, send mode information, and addition processing status information to additional information integration section 1202 (pattern 5a). When the additional mode information obtained from additional information reception section 601 is bitrate2' and the send mode information obtained from coded information analysis section 602 is bitrate2 and the value of the addition processing status information obtained from additional information reception section 601 is 1 or 3, additional information coding section 1201 outputs the additional mode information, send mode information, and addition processing status information to additional information integration section 1202 (pattern 5b).

(Pattern 6)

When the additional mode information obtained from additional information reception section 601 is bitrate2' and the send mode information obtained from coded information analysis section 602 is bitrate1 and additional information is input from additional information reception section 601, additional information coding section 1201 codes the additional information based on a CELP type speech coding method using the transmission bit rate indicated by bitrate4", and outputs the obtained information source code of additional information, additional mode information, send mode information, and addition processing status information to additional information integration section 1202 (pattern 6a). When the additional mode information obtained from additional information reception section 601 is bitrate2' and the send mode information obtained from coded information analysis section 602 is bitrate1 and the value of the addition processing status information obtained from additional information reception section 601 is 1 or 3, additional information coding section 1201 outputs the additional mode information, send mode information, and addition processing status information to additional information integration section 1202 (pattern 6b).

(Pattern 7)

When the additional mode information obtained from additional information reception section 601 is bitrate1' and the send mode information obtained from coded information analysis section 602 is bitrate3, additional information coding section 1201 assesses that the transmission bit rate indicated by bitrate3" is not sufficient for coding the additional information and outputs the additional mode information, send mode information, and addition processing status information to additional information integration section 1202 without coding the additional information.

(Pattern 8)

When the additional mode information obtained from additional information reception section 601 is bitrate1' and the send mode information obtained from coded information analysis section 602 is bitrate2, additional information coding section 1201 assesses that the transmission bit rate indicated by bitrate2" is not sufficient for coding the additional information and outputs the additional mode information, send mode information, and addition processing status information to additional information integration section 1202 without coding the additional information.

(Pattern 9)

When the additional mode information obtained from additional information reception section 601 is bitrate1' and the send mode information obtained from coded information analysis section 602 is bitrate1 and the value of the addition processing status information obtained from additional information reception section 601 is 2, additional information coding section 1201 codes the additional information based on a CELP type speech coding method using the transmission bit rate indicated by bitrate1", and outputs the obtained information source code of additional information, additional mode information, send mode information, and addition processing status information to additional information integration section 1202 (pattern 9a). When the additional mode information obtained from additional information reception section 601 is bitrate1' and the send mode information obtained from coded information analysis section 602 is bitrate1 and the value of the addition processing status information obtained from additional information reception section 601 is 1 or 3, additional information coding section 1201 outputs the additional mode information, send mode information, and addition processing status information to additional information integration section 1202 (pattern 9b).

This concludes the description of the coding processing of additional information coding section 1201.

When additional mode information, send mode information, and addition processing status information are input from additional information coding section 1201 and the information source code of each layer is input from coded information analysis section 602, additional information integration section 1202 integrates the information source code of each layer with the information source code of additional information in accordance with the combinations of additional mode information, send mode information, and addition processing status information, and outputs the obtained information source code, send mode information, additional mode information, and addition processing status information to coded information integration section 604. When additional mode information, send mode information, and addition processing status information are not input from additional information coding section 1201 and the information source code of each layer is not input from coded information analysis section 602, additional information integration section 1202 does not perform any operation.

The following separates the integration processing of additional information integration section 1202 into nine patterns that correspond to the combinations of send mode information, additional mode information, and addition processing status information, describing each pattern in detail.

(Pattern 1)

When the additional mode information, send mode information, and value of the addition processing status information obtained from additional information coding section 1201 are bitrate3', bitrate3, and 2, respectively, additional information integration section 1202 replaces the base layer information source code with the information source code of additional information, assigns bitrate0 to the send mode information, assigns bitrate3" to the additional mode information, and outputs the information source code of additional information, additional mode information, send mode information, and addition processing status information to coded information integration section 604 (pattern 1a). When the additional mode information, send mode information, and value of the addition processing status information obtained from additional information coding section 1201 are bitrate3', bitrate3, and 1 or 3, respectively, additional information integration section 1202 outputs the base layer information source code, additional mode information, send mode information, and addition processing status information to coded information integration section 604 (pattern 1b).

(Pattern 2)

When the additional mode information, send mode information, and value of the addition processing status information obtained from additional information coding section 1201 are bitrate3', bitrate2, and 2, respectively, additional information integration section 1202 replaces the first enhancement layer information source code with the information source code of additional information, assigns bitrate3 to the send mode information, assigns bitrate5" to the additional mode information, and outputs the base layer information source code, information source code of additional information, additional mode information, send mode information, and addition processing status information to coded information integration section 604 (pattern 2a). When the additional mode information, send mode information, and value of the addition processing status information obtained from additional information coding section 1201 are bitrate3', bitrate2, and 1 or 3, respectively, additional information integration section 1202 outputs the base layer information source code, first enhancement layer information source code, additional mode information, send mode information, and addition processing status information to coded information integration section 604 (pattern 2b).

(Pattern 3)

When the additional mode information, send mode information, and value of the addition processing status information obtained from additional information coding section 1201 are bitrate3', bitrate1, and 2, respectively, additional information integration section 1202 replaces the second enhancement layer information source code with the information source code of additional information, assigns bitrate2 to the send mode information, assigns bitrate6" to the additional mode information, and outputs the base layer information source code, first enhancement layer information source code, information source code of additional information, additional mode information, send mode information, and addition processing status information to coded information integration section 604 (pattern 3a). When the additional mode information, send mode information, and value of the addition processing status information obtained from additional information coding section 1201 are bitrate3, bitrate1, and 1 or 3, respectively, additional information integration section 1202 outputs the base layer information source code, first enhancement layer information source code, second enhancement layer information source code, additional mode information, send mode information, and addition processing status information to coded information integration section 604 (pattern 3b).

(Pattern 4)

When the additional mode information and send mode information obtained from additional information coding section 1201 are bitrate2' and bitrate3, respectively, additional information integration section 1202 outputs the base layer information source code, send mode information, and addition processing status information to coded information integration section 604 without performing any integration.

(Pattern 5)

When the additional mode information, send mode information, and value of the addition processing status information obtained from additional information coding section 1201 are bitrate2', bitrate2, and 2, respectively, additional information integration section 1202 replaces the base layer information source code and first enhancement layer information source code with the information source code of additional information, assigns bitrate0 to the send mode information, assigns bitrate2" to the additional mode information, and outputs the information source code of additional information, additional mode information, send mode information, and addition processing status information to coded information integration section 604 (pattern 5a). When the additional mode information, send mode information, and value of the addition processing status information obtained from additional information coding section 1201 are bitrate2', bitrate2, and 1 or 3, respectively, additional information integration section 1202 outputs the base layer information source code, first enhancement layer information source code, additional mode information, send mode information, and addition processing status information to coded information integration section 604 (pattern 5b).

(Pattern 6)

When the additional mode information, send mode information, and value of the addition processing status information obtained from additional information coding section 1201 are bitrate2', bitrate1, and 2, respectively, additional information integration section 1202 replaces the first enhancement layer information source code and second enhancement layer information source code with the information source code of additional information, assigns bitrate3 to the send mode information, assigns bitrate4" to the additional mode information, and outputs the base layer information source code, information source code of additional information, additional mode information, send mode information, and addition processing status information to coded information integration section 604 (pattern 6a). When the additional mode information, send mode information, and value of the addition processing status information obtained from additional information coding section 1201 are bitrate2', bitrate1, and 1 or 3, respectively, additional information integration section 1202 outputs the base layer information source code, first enhancement layer information source code, second enhancement layer information source code, additional mode information, send mode information, and addition processing status information to coded information integration section 604 (pattern 6b).

(Pattern 7)

When the additional mode information and send mode information obtained from additional information coding section 1201 are bitrate1' and bitrate3, respectively, additional information integration section 1202 outputs the base layer information source code, send mode information, and addition processing status information to coded information integration section 604 without performing any integration.

(Pattern 8)

When the additional mode information and send mode information obtained from additional information coding section 1201 are bitrate1' and bitrate2, respectively, additional information integration section 1202 outputs the base layer information source code, first enhancement layer information source code, send mode information, and addition processing status information to coded information integration section 604 without performing any integration.

(Pattern 9)

When the additional mode information, send mode information, and value of the addition processing status information obtained from additional information coding section 1201 are bitrate1', bitrate1, and 2, respectively, additional information integration section 1202 replaces the base layer information source code, first enhancement layer information source code, and second enhancement layer information source code with the information source code of additional information, assigns bitrate0 to the send mode information, assigns bitrate1" to the additional mode information, and outputs the information source code of additional information, additional mode information, send mode information, and addition processing status information to coded information integration section 604 (pattern 9a). When the additional mode information, send mode information, and value of the addition processing status information obtained from additional information coding section 1201 are bitrate1', bitrate1, and 1 or 3, respectively, additional information integration section 1202 outputs the base layer information source code, first enhancement layer information source code, second enhancement layer information source code, additional mode information, send mode information, and addition processing status information to coded information integration section 604 (pattern 9b).

This concludes the description of the integration processing of additional information integration section 1202.

When send mode information, additional mode information, addition processing status information, and the information source code of each layer are input from additional information integration section 1202, coded information integration section 604 integrates the information and outputs the obtained coded information as coded information after conversion to control switch 606. When send mode information, additional mode information, and the information source code of each layer are not input from additional information integration section 1202, coded information integration section 604 does not perform any operation.

Figures 13A, 13B, 13C, 13D, 13E, 13F, 13G, 13H, 13I, 13J, 13K, 13L, 13M, 13N, 13O:
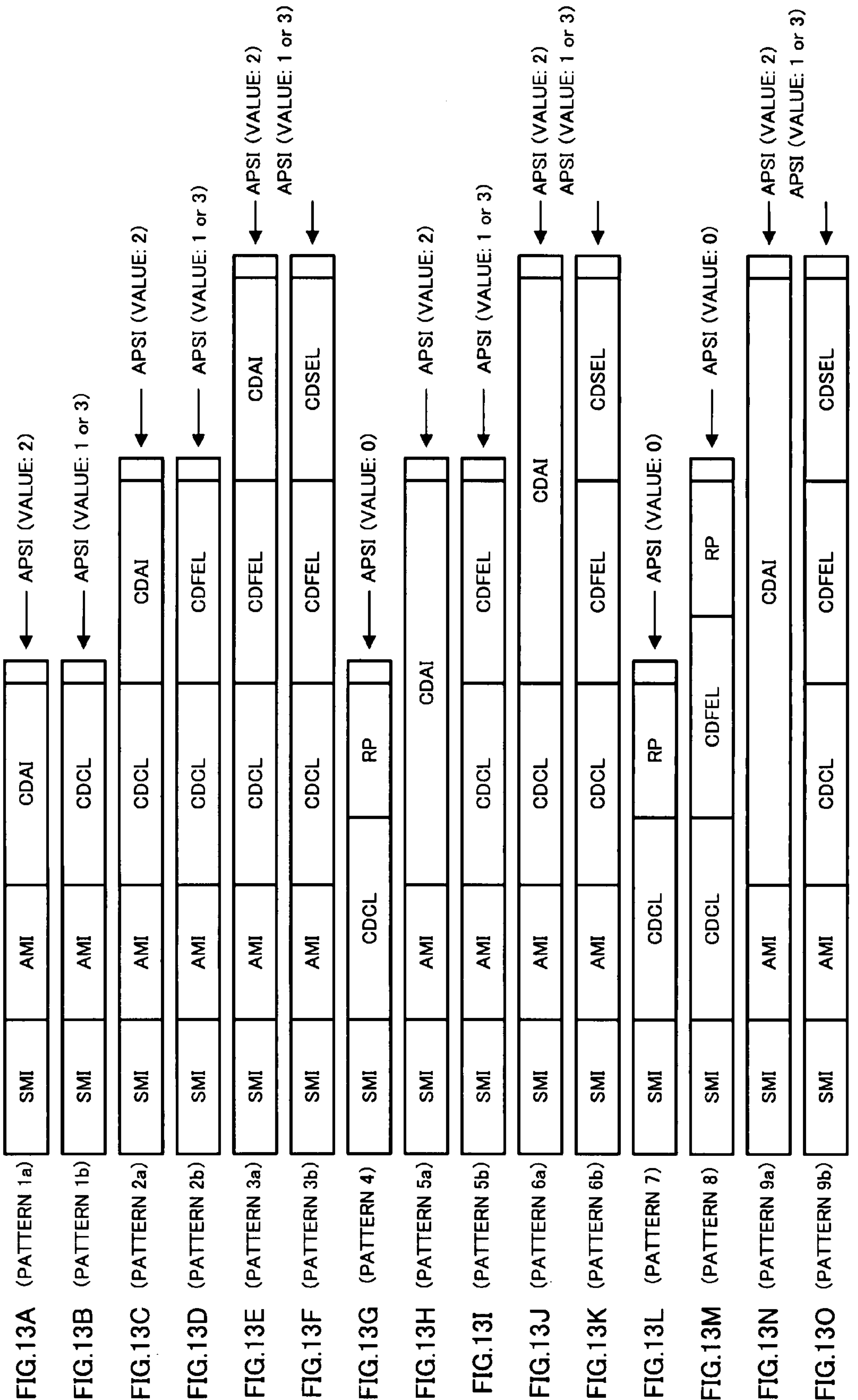
FIG. 13 is a block diagram showing the structure of the data transmitted from the relay apparatus according to Embodiment 3 of the present invention.

At this time, the data structure (bit stream) of the coded information output from coded information integration section 604 is a data structure such as (a) to (o) of FIG. 13, which correspond to (pattern 1) to (pattern 9) of additional information integration section 1202, respectively.

Figure 14:
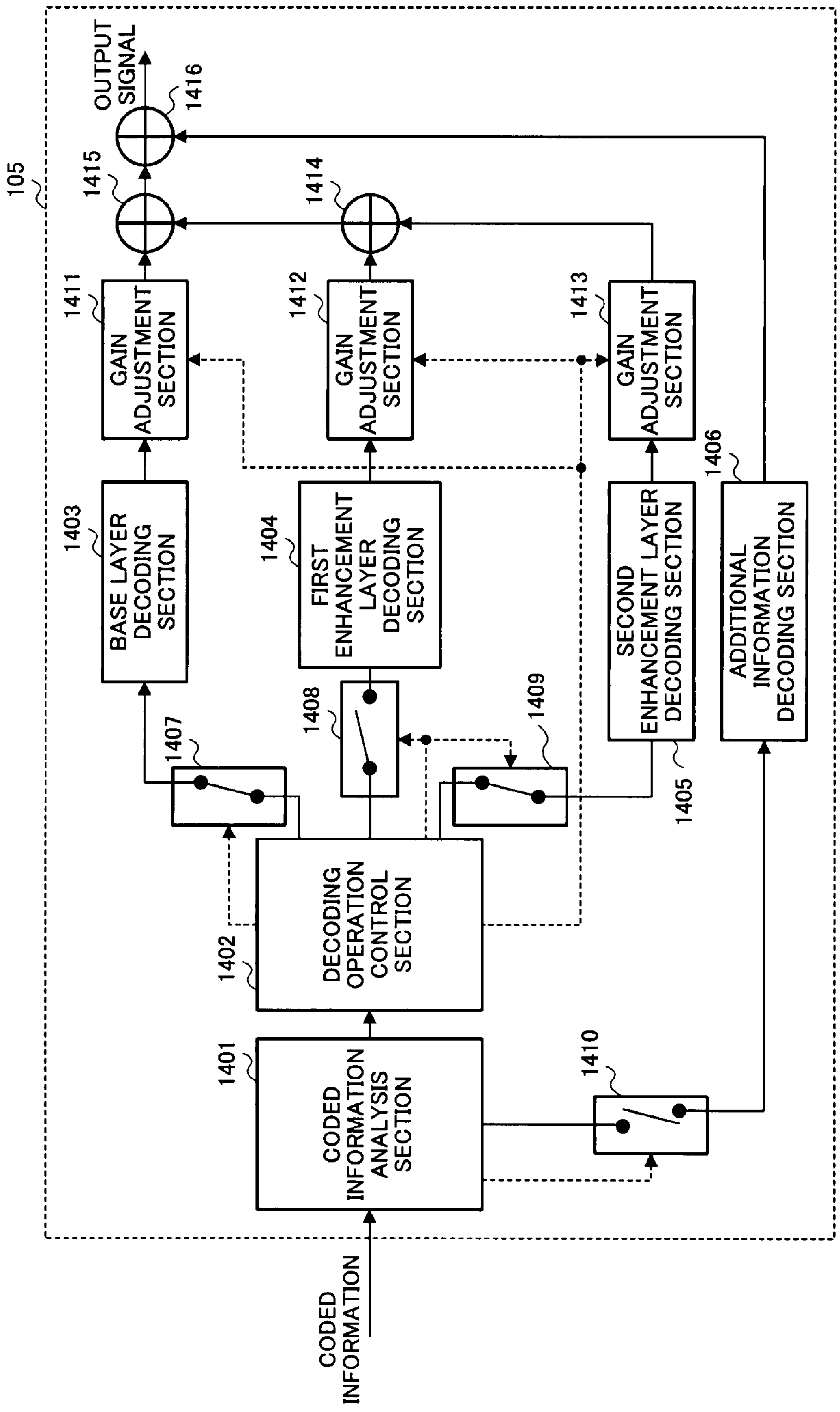
FIG. 14 is a block diagram showing the internal configuration of the signal decoding apparatus according to Embodiment 3 of the present invention.

Next, the configuration of signal decoding apparatus 105 of the present embodiment will be described using FIG. 14. Signal decoding apparatus 105 mainly comprises coded information analysis section 1401, decoding operation control section 1402, base layer decoding section 1403, first enhancement layer decoding section 1404, second enhancement layer decoding section 1405, additional information decoding section 1406, control switches 1407 to 1410, gain adjustment sections 1411 to 1413, and addition sections 1414 to 1416.

Coded information is input to coded information analysis section 1401. When the value of the addition processing status information of the input coded information is 2, coded information analysis section 1401 separates the coded information into send mode information, additional mode information, information source code of each layer, information source code of additional information, and addition processing status information, outputs the obtained send mode information, additional mode information, information source code of each layer, and addition processing status information to decoding operation control section 1402, and outputs the additional mode information and information source code of additional information to additional information decoding section 1406. When the value of the addition processing status information of the input coded information is 0, coded information analysis section 1401 separates the coded information into send mode information, information source code of each layer, and addition processing status information and outputs the obtained send mode information, information source code of each layer, and addition processing status information to decoding operation control section 1402. When the value of the addition processing status information of the input coded information is 1 or 3, coded information analysis section 1401 separates the coded information into send mode information, additional mode information, information source code of each layer, and addition processing status information and outputs the obtained send mode information, additional mode information, information source code of each layer, and addition processing status information to decoding operation control section 1402. In addition, coded information analysis section 1401 controls the ON/OFF setting of control switch 1410 in accordance with the analysis result of the coded information. Specifically, when the value of the addition processing status information of the input coded information is not 2, coded information analysis section 1401 sets control switch 1410 to OFF, and when the value of the addition processing status information of the input coded information is 2, coded information analysis section 1401 sets control switch 1410 to ON.

Decoding operation control section 1402 controls the state of control switches 1407 to 1409 and the state (fade-in, fade-out, OFF) of gain adjustment sections 1411 to 1413 in accordance with the send mode information, additional mode information, and addition processing status information obtained from coded information analysis section 1401, and outputs the information source code of each layer to base layer decoding section 1403, first enhancement layer decoding section 1404, and second enhancement layer decoding section 1405.

The processing of decoding operation control section 1402 is broadly separated into the three patterns: normal decoding processing, fade-out processing, and fade-in processing. Here each processing will be described in detail for each pattern.

(Normal Decoding Processing when the Value of the Addition Processing Status Information is 0 or 2)

When the value of the addition processing status information obtained from coded information analysis section 1401 is 0 or 2 and the send mode information obtained from coded information analysis section 1401 is bitrate0, decoding operation control section 1402 does not perform any operation.

When the value of the addition processing status information obtained from coded information analysis section 1401 is 0 or 2 and the send mode information obtained from coded information analysis section 1401 is bitrate3, decoding operation control section 1402 sets control switch 1407 to ON, control switches 1408 and 1409 to OFF, and all gain adjustment sections 1411 to 1413 to OFF, outputs the base layer information source code to base layer decoding section 1403, and does not output anything to first enhancement layer decoding section 1404 or second enhancement layer decoding section 1405.

When the value of the addition processing status information obtained from coded information analysis section 1401 is 0 or 2 and the send mode information obtained from coded information analysis section 1401 is bitrate2, decoding operation control section 1402 sets control switches 1407 and 1408 to ON, sets control switch 1409 to OFF, sets all gain adjustment sections 1411 to 1413 to OFF, outputs the base layer information source code to base layer decoding section 1403, outputs the first enhancement layer information source code to first enhancement layer decoding section 1404, and does not output anything to second enhancement layer decoding section 1405.

When the value of the addition processing status information obtained from coded information analysis section 1401 is 0 or 2 and the send mode information obtained from coded information analysis section 1401 is bitrate1, decoding operation control section 1402 sets all control switches 1407 to 1409 to ON, outputs the base layer information source code to base layer decoding section 1403, outputs the first enhancement layer information source code to first enhancement layer decoding section 1404, and outputs the second enhancement layer information source code to second enhancement layer decoding section 1405.

(Fade-Out Processing at the Start of Addition Processing and when the Value of the Addition Processing Status Information is 1)

When the value of the addition processing status information obtained from coded information analysis section 1401 is 1 and the send mode information obtained from coded information analysis section 1401 is bitrate3 and the additional mode information obtained from coded information analysis section 1401 is bitrate3", decoding operation control section 1402 sets control switch 1407 to ON, sets control switches 1408 and 1409 to OFF, sets gain adjustment section 1411 to fade-out, sets gain adjustment sections 1412 and 1413 to OFF, outputs the base layer information source code to base layer decoding section 1403, and does not output anything to first enhancement layer decoding section 1404 or second enhancement layer decoding section 1405.

When the value of the addition processing status information obtained from coded information analysis section 1401 is 1 and the send mode information obtained from coded information analysis section 1401 is bitrate2 and the additional mode information obtained from coded information analysis section 1401 is bitrate5", decoding operation control section 1402 sets control switches 1407 and 1408 to ON, sets control switch 1409 to OFF, sets gain adjustment section 1412 to fade-out, sets gain adjustment sections 1411 and 1413 to OFF, outputs the base layer information source code to base layer decoding section 1403, outputs the first enhancement layer information source code to first enhancement layer decoding section 1404, and does not output anything to second enhancement layer decoding section 1405.

When the value of the addition processing status information obtained from coded information analysis section 1401 is 1 and the send mode information obtained from coded information analysis section 1401 is bitrate2 and the additional mode information obtained from coded information analysis section 1401 is bitrate2", decoding operation control section 1402 sets control switches 1407 and 1408 to ON, sets control switch 1409 to OFF, sets gain adjustment sections 1411 and 1412 to fade-out, sets gain adjustment section 1413 to OFF, outputs the base layer information source code to base layer decoding section 1403, outputs the first enhancement layer information source code to first enhancement layer decoding section 1404, and does not output anything to second enhancement layer decoding section 1405.

When the value of the addition processing status information obtained from coded information analysis section 1401 is 1 and the send mode information obtained from coded information analysis section 1401 is bitrate1 and the additional mode information obtained from coded information analysis section 1401 is bitrate6", decoding operation control section 1402 sets control switches 1407 to 1409 to ON, sets gain adjustment section 1413 to fade-out, sets gain adjustment sections 1411 and 1412 to OFF, outputs the base layer information source code to base layer decoding section 1403, outputs the first enhancement layer information source code to first enhancement layer decoding section 1404, and outputs the second enhancement layer information source code to second enhancement layer decoding section 1405.

When the value of the addition processing status information obtained from coded information analysis section 1401 is 1 and the send mode information obtained from coded information analysis section 1401 is bitrate1 and the additional mode information obtained from coded information analysis section 1401 is bitrate4", decoding operation control section 1402 sets control switches 1407 to 1409 to ON, sets gain adjustment sections 1412 and 1413 to fade-in, sets gain adjustment section 1411 to OFF, outputs the base layer information source code to base layer decoding section 1403, outputs the first enhancement layer information source code to first enhancement layer decoding section 1404, and outputs the second enhancement layer information source code to second enhancement layer decoding section 1405.

When the value of the addition processing status information obtained from coded information analysis section 1401 is 1 and the send mode information obtained from coded information analysis section 1401 is bitrate1 and the additional mode information obtained from coded information analysis section 1401 is bitrate1", decoding operation control section 1402 sets control switches 1407 to 1409 to ON, sets gain adjustment sections 1411 to 1413 to fade-out, outputs the base layer information source code to base layer decoding section 1403, outputs the first enhancement layer information source code to first enhancement layer decoding section 1404, and outputs the second enhancement layer information source code to second enhancement layer decoding section 1405.

(Fade-in Processing at the End of Addition Processing and when the Value of the Addition Processing Status Information is 3)

When the value of the addition processing status information obtained from coded information analysis section 1401 is 3 and the send mode information obtained from coded information analysis section 1401 is bitrate3 and the additional mode information obtained from coded information analysis section 1401 is bitrate3", decoding operation control section 1402 sets control switch 1407 to ON, sets control switches 1408 and 1409 to OFF, sets gain adjustment section 1411 to fade-in, sets gain adjustment sections 1412 and 1413 to OFF, outputs the base layer information source code to base layer decoding section 1403, and does not output anything to first enhancement layer decoding section 1404 or second enhancement layer decoding section 1405.

When the value of the addition processing status information obtained from coded information analysis section 1401 is 1 and the send mode information obtained from coded information analysis section 1401 is bitrate2 and the additional mode information obtained from coded information analysis section 1401 is bitrate5", decoding operation control section 1402 sets control switches 1407 and 1408 to ON, sets control switch 1409 to OFF, sets gain adjustment section 1412 to fade-in, sets gain adjustment sections 1411 and 1413 to OFF, outputs the base layer information source code to base layer decoding section 1403, outputs the first enhancement layer information source code to first enhancement layer decoding section 1404, and does not output anything to second enhancement layer decoding section 1405.

When the value of the addition processing status information obtained from coded information analysis section 1401 is 1 and the send mode information obtained from coded information analysis section 1401 is bitrate2 and the additional mode information obtained from coded information analysis section 1401 is bitrate2", decoding operation control section 1402 sets control switches 1407 and 1408 to ON, sets control switch 1409 to OFF, sets gain adjustment sections 1411 and 1412 to fade-in, sets gain adjustment section 1413 to OFF, outputs the base layer information source code to base layer decoding section 1403, outputs the first enhancement layer information source code to first enhancement layer decoding section 1404, and does not output anything to second enhancement layer decoding section 1405.

When the value of the addition processing status information obtained from coded information analysis section 1401 is 1 and the send mode information obtained from coded information analysis section 1401 is bitrate1 and the additional mode information obtained from coded information analysis section 1401 is bitrate6", decoding operation control section 1402 sets control switches 1407 to 1409 to ON, sets gain adjustment section 1413 to fade-in, sets gain adjustment sections 1411 and 1412 to OFF, outputs the base layer information source code to base layer decoding section 1403, outputs the first enhancement layer information source code to first enhancement layer decoding section 1404, and outputs the second enhancement layer information source code to second enhancement layer decoding section 1405.

When the value of the addition processing status information obtained from coded information analysis section 1401 is 1 and the send mode information obtained from coded information analysis section 1401 is bitrate1 and the additional mode information obtained from coded information analysis section 1401 is bitrate4", decoding operation control section 1402 sets control switches 1407 to 1409 to ON, sets gain adjustment sections 1412 and 1413 to fade-in, sets gain adjustment section 1411 to OFF, outputs the base layer information source code to base layer decoding section 1403, outputs the first enhancement layer information source code to first enhancement layer decoding section 1404, and outputs the second enhancement layer information source code to second enhancement layer decoding section 1405.

When the value of the addition processing status information obtained from coded information analysis section 1401 is 1 and the send mode information obtained from coded information analysis section 1401 is bitrate1 and the additional mode information obtained from coded information analysis section 1401 is bitrate1", decoding operation control section 1402 sets control switches 1407 to 1409 to ON, sets gain adjustment sections 1411 to 1413 to fade-in, outputs the base layer information source code to base layer decoding section 1403, outputs the first enhancement layer information source code to first enhancement layer decoding section 1404, and outputs the second enhancement layer information source code to second enhancement layer decoding section 1405.

The configurations of base layer decoding section 1403, first enhancement layer decoding section 1404, and second enhancement layer decoding section 1405 are the same as those of the above base layer decoding section 903, first enhancement layer decoding section 904, and second enhancement layer decoding section 905, respectively, and detailed descriptions thereof will be omitted.

The base layer decoded signal is input from base layer decoding section 1403 to gain adjustment section 1411. In addition, the fade-out, fade-in, and OFF statuses of gain adjustment section 1411 are controlled by decoding operation control section 1402.

When controlled in an OFF state by decoding operation control section 1402, gain adjustment section 1411 outputs the base layer decoded signal obtained from base layer decoding section 1403 as is to addition section 1415. When controlled in a fade-out state by decoding operation control section 1402, gain adjustment section 1411 performs attenuation processing against the base layer decoded signal obtained from base layer decoding section 1403 in accordance with the following equation (2), and outputs the obtained signal to addition section 1415.

[Equation 2]

$$Xbase'_i = \frac{(N-1-i)}{N-1} \cdot Xbase_i \quad (i = 0, \ldots , N-1) \tag{2}$$

Here, N refers to the value determined by the number of samples in a single frame and the set time the addition processing is delayed in relay apparatus 103, $Xbase_i$ refers to the base layer decoded signal, and $Xbase'_i$ refers to the decoded signal after attenuation.

When controlled in a fade-in state by decoding operation control section 1402, gain adjustment section 1411 amplifies the base layer decoded signal obtained from base layer decoding section 1403 in accordance with the following equation (3), and outputs the obtained signal to addition section 1415.

[Equation 3]

$$Xbase''_i = \frac{i}{N-1} \cdot Xbase_i \quad (i = 0, \ldots , N-1) \tag{3}$$

Here, similar to the above equation (2), N refers to the value determined by the number of samples in a single frame and the set time the addition processing is delayed in relay apparatus 103, $Xbase_i$ refers to the base layer decoded signal, and $Xbase''_i$ refers to the decoded signal after attenuation.

Gain adjustment section 1412 has the same configuration as that of gain adjustment section 1411 except the input signal is replaced with a first enhancement layer decoded signal in gain adjustment section 1411, and a detailed description thereof will be omitted. In addition, gain adjustment section 1413 has the same configuration as that of gain adjustment section 1411 except the input signal in gain adjustment section 1411 is replaced with the second enhancement layer decoded signal, and a detailed description thereof will be omitted.

The configuration of additional information decoding section 1406 is the same as that of the above additional information decoding section 906, and a detailed description thereof will be omitted.

When control switches 1408 and 1409 are ON, addition section 1414 adds the second enhancement layer decoded signal output from gain adjustment section 1413 and the first enhancement layer decoded signal output from gain adjustment section 1412, and outputs the signal after the addition to addition section 1415. When control switch 1409 is OFF and control switch 1408 is ON, addition section 1414 outputs the first enhancement layer decoded signal output from gain adjustment section 1412 to addition section 1415. When control switches 1408 and 1409 are OFF, addition section 1414 does not perform any operation.

When control switches 1407 and 1408 are ON, addition section 1414 adds the base layer decoded signal output from gain adjustment section 1411 and output signal of addition section 1414, and outputs the signal after the addition to addition section 1416. When control switch 1407 is ON and control switch 1408 is OFF, addition section 1415 outputs the base layer decoded signal output from gain adjustment section 1411 to addition section 1416. When control switches 1407 and 1408 are OFF, addition section 1415 does not perform any operation.

When control switches 1407 and 1410 are ON, addition section 1416 adds the output signal of addition section 1415 and the additional information decoded signal obtained from additional information decoding section 1406, and outputs the signal after the addition as the output signal. When control switch 1407 is ON and control switch 1410 is OFF, addition section 1416 outputs the output signal of addition section 1415. When control switch 1407 is OFF and control switch 1410 is ON, addition section 1416 outputs the additional information decoded signal obtained from additional information decoding section 1406 as the output signal. When control switches 1407 and 1410 are OFF, addition section 1416 does not perform any operation.

This concludes the description of the internal configuration of signal decoding apparatus 105 of the present embodiment.

In this manner, according to the present embodiment, it is possible to reduce the potential noise of a decoded signal by adding additional information to speech and audio signals to be transmitted from a signal coding apparatus by performing addition processing after a delay of a set duration from the moment additional information is input to the relay apparatus, and performing attenuation and amplification processing against the decoded signal of each layer in the signal decoding apparatus.

Embodiment 4

The above Embodiment 1 has described the case where the additional information input to the relay apparatus in the example is regional disaster information, etc., with high immediacy, and when the additional information is input, and both the speech information and additional information transmitted from the coding apparatus side cannot be sent simultaneously (pattern 1, pattern 5, and pattern 9 of additional information coding section 701), the additional information is given priority. However, in cases where additional information of less urgency is to be added, rather than performing the above processing, the speech information should conversely be given higher priority Here, in Embodiment 4 of the present invention, the case is described where priority level information that indicates the priority level of the speech information and additional information is added in addition to additional information and additional mode information as relay apparatus input, and one of the speech information and additional information is selected and transmitted based on the priority level information. Further, the following describes the case where the target additional information is speech and audio signals.

Figure 15:
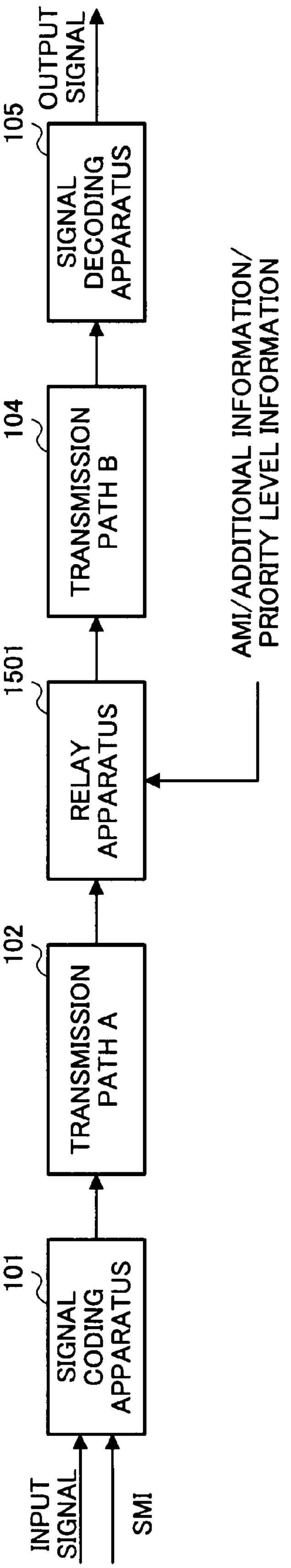
FIG. 15 is a block diagram showing the configuration of the communication system according to Embodiment 4 of the present invention.

FIG. 15 shows the configuration of the overall system of the present embodiment. When additional mode information, additional information, and priority level information are input, relay apparatus 1501 adds the additional information to the coded information transmitted via transmission path A 102, and transmits the coded information after the addition processing (hereinafter "coded information after conversion") to transmission path B 104. When additional mode information, additional information, and priority level information are not input, relay apparatus 1501 outputs the coded information transmitted via transmission path A 102 to transmission path B 104. Here, the priority level information is a number between "0.0" and "5.0" that indicates the priority level of the speech information and additional information, prioritizing speech information when the value is closer to "0.0" and prioritizing additional information when the value is closer to "5.0".

Figure 16:
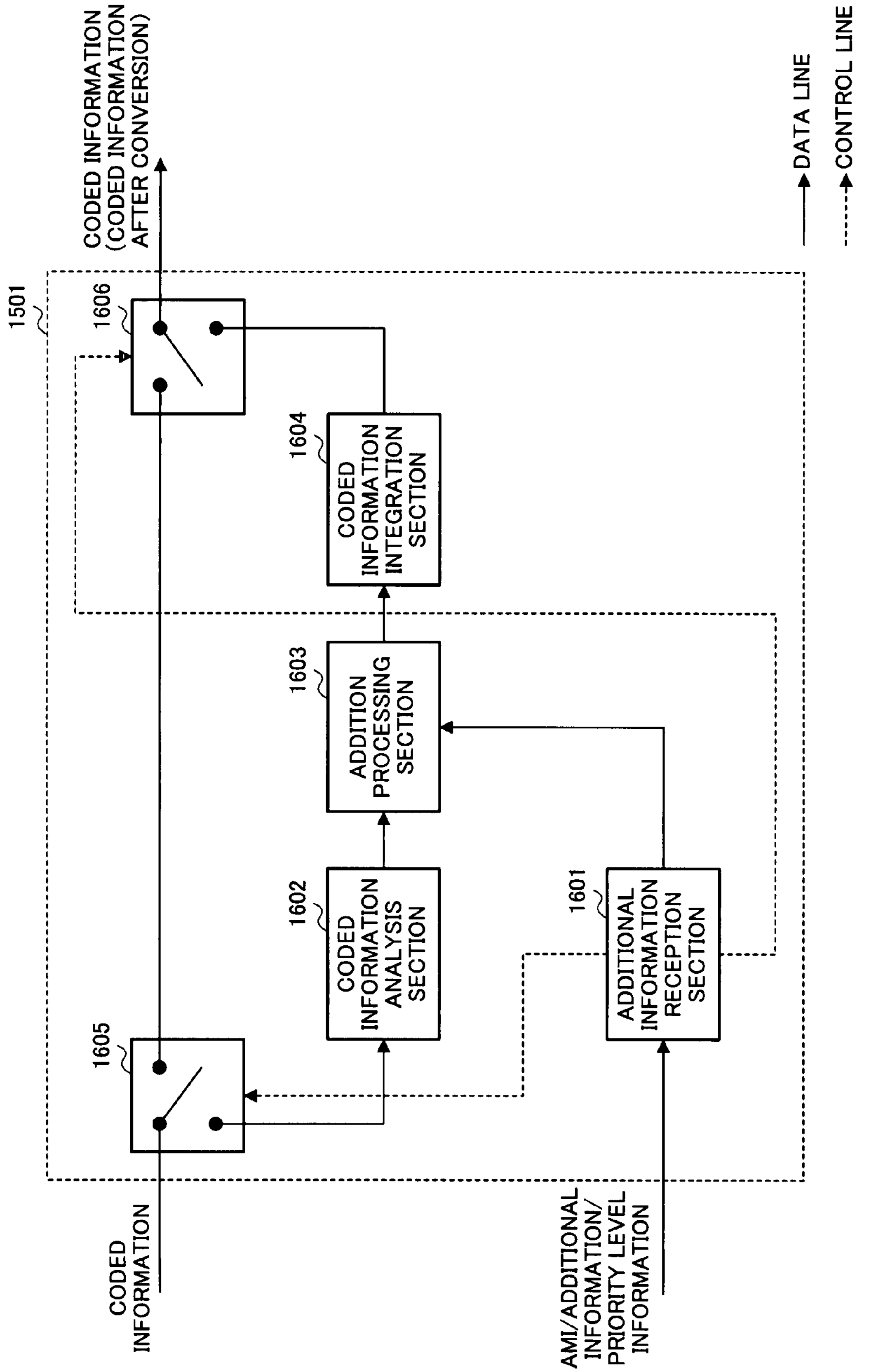
FIG. 16 is a block diagram showing the internal configuration of the relay apparatus according to Embodiment 4 of the present invention.

Next, the configuration of relay apparatus 1501 of the present embodiment will be described using FIG. 16. Further, in the present embodiment, the configurations of all devices other than relay apparatus 1501 are the same as the configurations of FIG. 1 of Embodiment 1, and detailed descriptions thereof will be omitted.

Relay apparatus 1501 mainly comprises additional information reception section 1601, coded information analysis section 1602, addition processing section 1603, coded information integration section 1604, and control switches 1605 and 1606.

The additional mode information, additional information, and priority level information are input to additional information reception section 1601.

Additional information reception section 1601 controls the ON/OFF settings of control switches 1605 and 1606 according to whether or not additional mode information, additional information, and priority level information are input. Specifically, when additional mode information, additional information, and priority level information are input to relay apparatus 1501, additional information reception section 1601 connects control switch 1605 to the coded information analysis section 1602 side, and connects control switch 1606 to the coded information integration section 1604 side. When additional mode information, additional information, and priority level information are not input to relay apparatus 1501, additional information reception section 1601 connects control switch 1605 to the control switch 1606 side, and connects control switch 1606 to the control switch 1605 side. In this manner, the operation of relay apparatus 1501 is determined by controlling the ON/OFF settings of control switches 1605 and 1606 according to whether or not additional information is input to relay apparatus 1501. In addition, when the additional mode information, additional information, and priority level information are input to relay apparatus 1501, additional information reception section 1601 outputs the input additional mode information, additional information, and priority level information to addition processing section 1603. When additional mode information, additional information, and priority level information are not input to relay apparatus 1501, additional information reception section 1601 does not output anything to addition processing section 1603.

The configuration of coded information analysis section 1602 is the same as that of coded information analysis section 602 of the above Embodiment 1, and a detailed description thereof will be omitted.

When send mode information, an additional information flag, and the information source code of each layer corresponding to the send mode information are input from coded information analysis section 1602 and additional mode information, additional information, and priority level information are input from additional information reception section 1601, addition processing section 1603 determines the priority mode information that identifies based on priority level information which one of speech information and additional information is prioritized, performs the addition processing of the additional information to the information source code of each layer in accordance with the combinations of send mode information, additional mode information, and priority mode information, and outputs the obtained information source code, send mode information, additional mode information, additional information flag, and priority mode information to coded information integration section 1604. When send mode information, an additional information flag, and the information source code of each layer corresponding to the send mode information are not input from coded information analysis section 1602 and additional mode information, additional information, and priority level information are not input from additional information reception section 1601, addition processing section 1603 does not perform any operation.

When send mode information, additional mode information, an additional information flag, and the information source code of each layer are input from addition processing section 1603, coded information integration section 1604 integrates the information and outputs the result as coded information after conversion to control switch 1606. When send mode information, additional mode information, an additional information flag, and the information source code of each layer are not input from addition processing section 1603, coded information integration section 1604 does not perform any operation.

Figure 17:
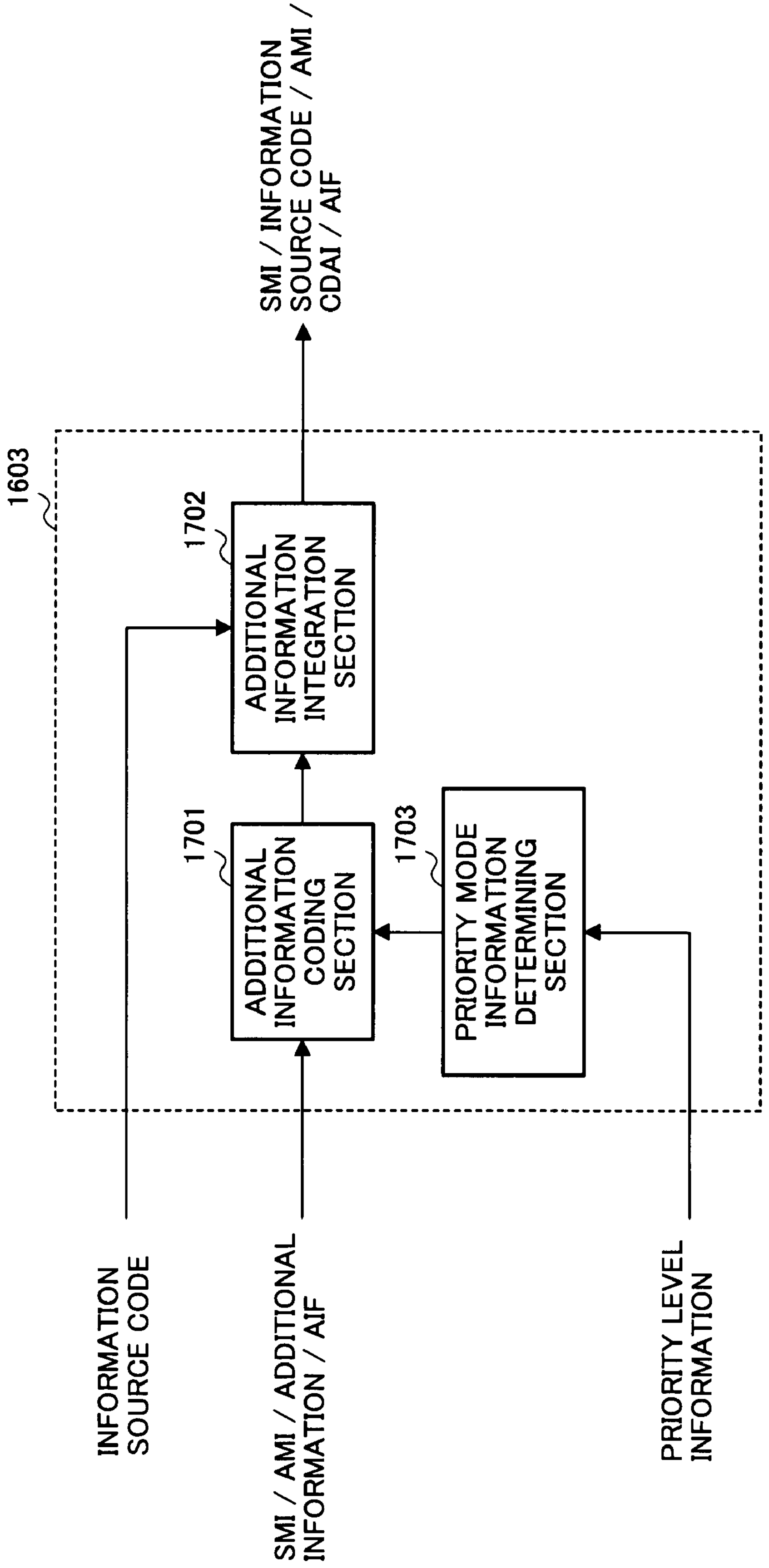
FIG. 17 is a block diagram showing the internal configuration of the addition processing section of the relay apparatus according to Embodiment 4 of the present invention.
Figure 18:
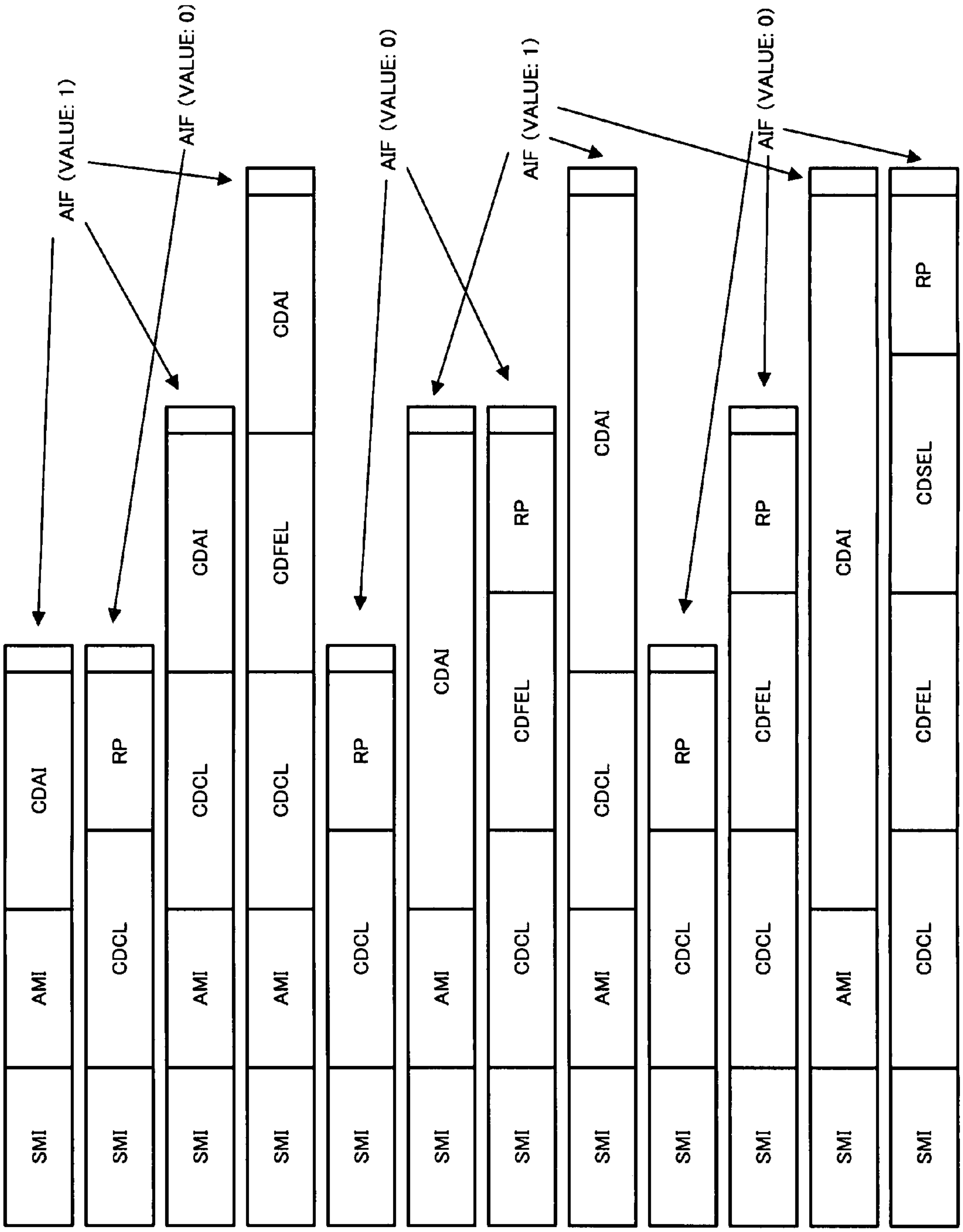
FIG. 18 is a block diagram showing the structure of the data transmitted from the relay apparatus according to Embodiment 4 of the present invention.

This concludes the description of the configuration of relay apparatus 1501 of FIG. 15. Next, the configuration of addition processing section 1603 of FIG. 16 will be described using FIG. 17. Addition processing section 1603 mainly comprises additional information coding section 1701, additional information integration section 1702, and priority mode information determining section 1703.

Priority mode information determining section 1703 receives priority level information from additional information reception section 1601, compares the priority level information P with the priority mode information determining threshold value $P_{thr}$, determines the priority mode information $P_{mode}$, and outputs the result to additional information coding section 1701. Here, the priority mode information determining threshold $P_{thr}$ is a predetermined value between 0.0 and 5.0. In addition, when the send mode information, additional mode information, additional information category, and additional information are speech signals, the priority mode information determining threshold value $P_{thr}$ changes according to the keywords included in the additional information, average gain of the additional information, rhythm characteristics, and user (transmission/reception) side instructions. Examples include a technique of decreasing the priority mode information determining threshold value $P_{thr}$ when the value of the additional mode information is high (bitrate1', etc.), indicating that the additional information is critical, and conversely for increasing the priority mode information determining threshold value $P_{thr}$ when the value of the send mode information is high. In addition, the priority mode information $P_{mode}$ assumes two values of "0" and "1", prioritizing the speech information when the priority mode information $P_{mode}$ is "0" and the additional information when the priority mode information $P_{mode}$ is "1". Further, the priority mode information $P_{mode}$ is determined by the following equation (4).

[Equation 4]

$$P_{mode} = \begin{cases} 0 & (P < P_{thr}) \\ 1 & (P \geq P_{thr}) \end{cases} \quad (4)$$

When additional mode information and additional information are input from additional information reception section 1601, send mode information and an additional information flag are input from coded information analysis section 1602, priority mode information is input from priority mode information determining section 1703, additional information coding section 1701 codes the additional information based on the transmission bit rate corresponding to the combinations of additional mode information, send mode information, and priority mode information using a CELP type speech coding method, and outputs the information source code obtained from coding (hereinafter "information source code of additional information"), send mode information, additional mode information, and priority mode information to additional information integration section 1702. When additional mode information, additional information, send mode information, an additional information flag, and priority mode information are not input, additional information coding section 1701 does not perform any operation.

The following separates the coding processing of additional information coding section 1701 into nine patterns that correspond to the combinations of send mode information and additional mode information, describing each pattern in detail. Note, however, that the patterns other than patterns 1, 5, and 9 are the same as the processing patterns of additional information coding section 701 of the above Embodiment 1, regardless of the value of the priority mode information $P_{mode}$, and detailed descriptions thereof will be omitted.

Additional information coding section 1701 comprises a multi-rate coding method capable of coding input information (signals) at a plurality of transmission bit rates. In the present embodiment, the values of the six predetermined transmission bit rates bitrate1", bitrate2", bitrate3", bitrate4", bitrate5", and bitrate6" are available in accordance with the combinations of additional mode information obtained from additional information reception section 1601, and the send mode information obtained from coded information analysis section 1602. The value of each of the six transmission bit rates is expressed by the above equation (1) using bitrate1, bitrate2, and bitrate3.

(Pattern 1)

When the additional mode information obtained from additional information reception section 1601 is bitrate3' and the send mode information obtained from coded information analysis section 1602 is bitrate3, and the value of the priority mode information $P_{mode}$ obtained from priority mode information determining section 1703 is "1", additional information coding section 1701 codes the additional information based on a CELP type speech coding method using the transmission bit rate indicated by bitrate3", and outputs the obtained information source code of additional information, additional mode information, send mode information, additional information flag, and priority mode information to additional information integration section 1702 (pattern 1a).

When the additional mode information obtained from additional information reception section 1601 is bitrate3' and the send mode information obtained from coded information analysis section 1602 is bitrate3, and the value of the priority mode information $P_{mode}$ obtained from priority mode information determining section 1703 is "0", additional information coding section 1701 outputs the additional mode information, send mode information, additional information flag, and priority mode information to additional information integration section 1702 without coding the additional information (pattern 1b).

(Pattern 5)

When the additional mode information obtained from additional information reception section 1601 is bitrate2' and the send mode information obtained from coded information analysis section 1602 is bitrate2, and the value of the priority mode information $P_{mode}$ obtained from priority mode information determining section 1703 is "1", additional information coding section 1701 codes the additional information based on a CELP type speech coding method using the transmission bit rate indicated by bitrate2", and outputs the obtained information source code of additional information, additional mode information, send mode information, additional information flag, and priority mode information to additional information integration section 1702 (pattern 5a).

When the additional mode information obtained from additional information reception section 1601 is bitrate2' and the send mode information obtained from coded information analysis section 1602 is bitrate2, and the value of the priority mode information $P_{mode}$ obtained from priority mode information determining section 1703 is "0", additional information coding section 1701 outputs the additional mode information, send mode information, additional information flag, and priority mode information to additional information integration section 1702 without coding the additional information (pattern 5b).

(Pattern 9)

When the additional mode information obtained from additional information reception section 1601 is bitrate1' and the send mode information obtained from coded information analysis section 1602 is bitrate1, and the value of the priority mode information $P_{mode}$ obtained from priority mode information determining section 1703 is "1", additional information coding section 1701 codes the additional information based on a CELP type speech coding method using the transmission bit rate indicated by bitrate1", and outputs the obtained information source code of additional information, additional mode information, send mode information, additional information flag, and priority mode information to additional information integration section 1702 (pattern 9a).

When the additional mode information obtained from additional information reception section 1601 is bitrate1' and the send mode information obtained from coded information analysis section 1602 is bitrate1, and the value of the priority mode information $P_{mode}$ obtained from priority mode information determining section 1703 is "1", additional information coding section 1701 outputs the additional mode information, send mode information, additional information flag, and priority mode information to additional information integration section 1702 without coding the additional information (pattern 9b).

This concludes the description of the coding processing of additional information coding section 1701.

When additional mode information, information source code of additional information, send mode information, an additional information flag, and priority mode information are input from additional information coding section 1701 and the information source code of each layer is input from coded information analysis section 1602, additional information integration section 1702 integrates the information source code of each layer with the information source code of additional information in accordance with the combinations of additional mode information, send mode information, and priority mode information, and outputs the obtained information source code, information source code of additional information, send mode information, additional information flag, and additional mode information to coded information integration section 1604. When additional mode information, information source code of additional information, send mode information, an additional information flag, priority mode information, and the information source code of each layer are not input, additional information integration section 1702 does not perform any operation.

The following separates the integration processing of additional information integration section 1702 into nine patterns that correspond to the combinations of send mode information, additional mode information, and priority mode information, describing each pattern in detail. Note, however, that the patterns other than patterns 1, 5, and 9 are the same as the processing patterns of additional information integration section 702 of the above Embodiment 1, regardless of the value of the priority mode information $P_{mode}$, and detailed descriptions thereof will be omitted.

(Pattern 1)

When the additional mode information, send mode information, and value of the priority mode information $P_{mode}$ obtained from additional information coding section 1701 are bitrate3', bitrate3, and "1", respectively, additional information integration section 1702 replaces the base layer information source code with the information source code of additional information, assigns bitrate0 to the send mode information, assigns bitrate3" to the additional mode information, and outputs the information source code of additional information, additional mode information, and send mode information to coded information integration section 1604. In addition, at this time, additional information integration section 1702 outputs the additional information flag assigned the value "1" to coded information integration section 1604 (pattern 1a).

When the additional mode information, send mode information, and value of the priority mode information $P_{mode}$ obtained from additional information coding section 1701 are bitrate3', bitrate3, and 0, respectively, additional information integration section 1702 outputs the base layer information source code and send mode information to coded information integration section 1604 without performing any integration. In addition, at this time, additional information integration section 1702 outputs the additional information flag assigned the value 0 to coded information integration section 1604 (pattern 1b).

(Pattern 5)

When the additional mode information, send mode information, and value of the priority mode information $P_{mode}$ obtained from additional information coding section 1701 are bitrate2', bitrate2, and "1", respectively, additional information integration section 1702 replaces the base layer information source code and first enhancement layer information source code with the information source code of additional information, assigns bitrate0 to the send mode information, assigns bitrate2" to the additional mode information, and outputs the information source code of additional information, additional mode information, and send mode information to coded information integration section 1604. In addition, at this time, additional information integration section 1702 outputs the additional information flag assigned the value "1" to coded information integration section 1604 (pattern 5a).

When the additional mode information, send mode information, and value of the priority mode information $P_{mode}$ obtained from additional information coding section 1701 are bitrate2', bitrate2, and "0", respectively, additional information integration section 1702 outputs the base layer information source code, first enhancement layer information source code, and send mode information to coded information integration section 1604 without performing any integration. In addition, at this time, additional information integration section 1702 outputs the additional information flag assigned the value "0" to coded information integration section 1604 (pattern 5b).

(Pattern 9)

When the additional mode information, send mode information, and value of the priority mode information $P_{mode}$ obtained from additional information coding section 1701 are bitrate1', bitrate1, and 1, respectively, additional information integration section 1702 replaces the base layer information source code, first enhancement layer information source code, and second enhancement layer information source code with the information source code of additional information, assigns bitrate0 to the send mode information, assigns bitrate1" to the additional mode information, and outputs the information source code of additional information, additional mode information, and send mode information to coded information integration section 1604. In addition, at this time, additional information integration section 1702 outputs the additional information flag assigned the value "1" to coded information integration section 1604 (pattern 9a).

When the additional mode information, send mode information, and value of the priority mode information $P_{mode}$ obtained from additional information coding section 1701 are bitrate1', bitrate1, and 0, respectively, additional information integration section 1702 outputs the base layer information source code, first enhancement layer information source code, second enhancement layer information source code, and send mode information to coded information integration section 1604 without performing any integration. In addition, at this time, additional information integration section 1702 outputs the additional information flag assigned the value "0" to coded information integration section 1604 (pattern 9b).

This concludes the description of the integration processing of additional information integration section 1702.

The data structure (bit stream) of the coded information output from coded information integration section 1604 is a data structure such as (a) to (1) of FIG. 8, which correspond to (pattern 1) to (pattern 9) of additional information integration section 1702, respectively.

In this manner, according to the present embodiment, which of the speech information and additional information is transmitted is determined in accordance with the priority level information that identifies whether or not the additional information is urgent, thereby achieving a more flexible transmission scheme.

Embodiment 5

Figure 19:
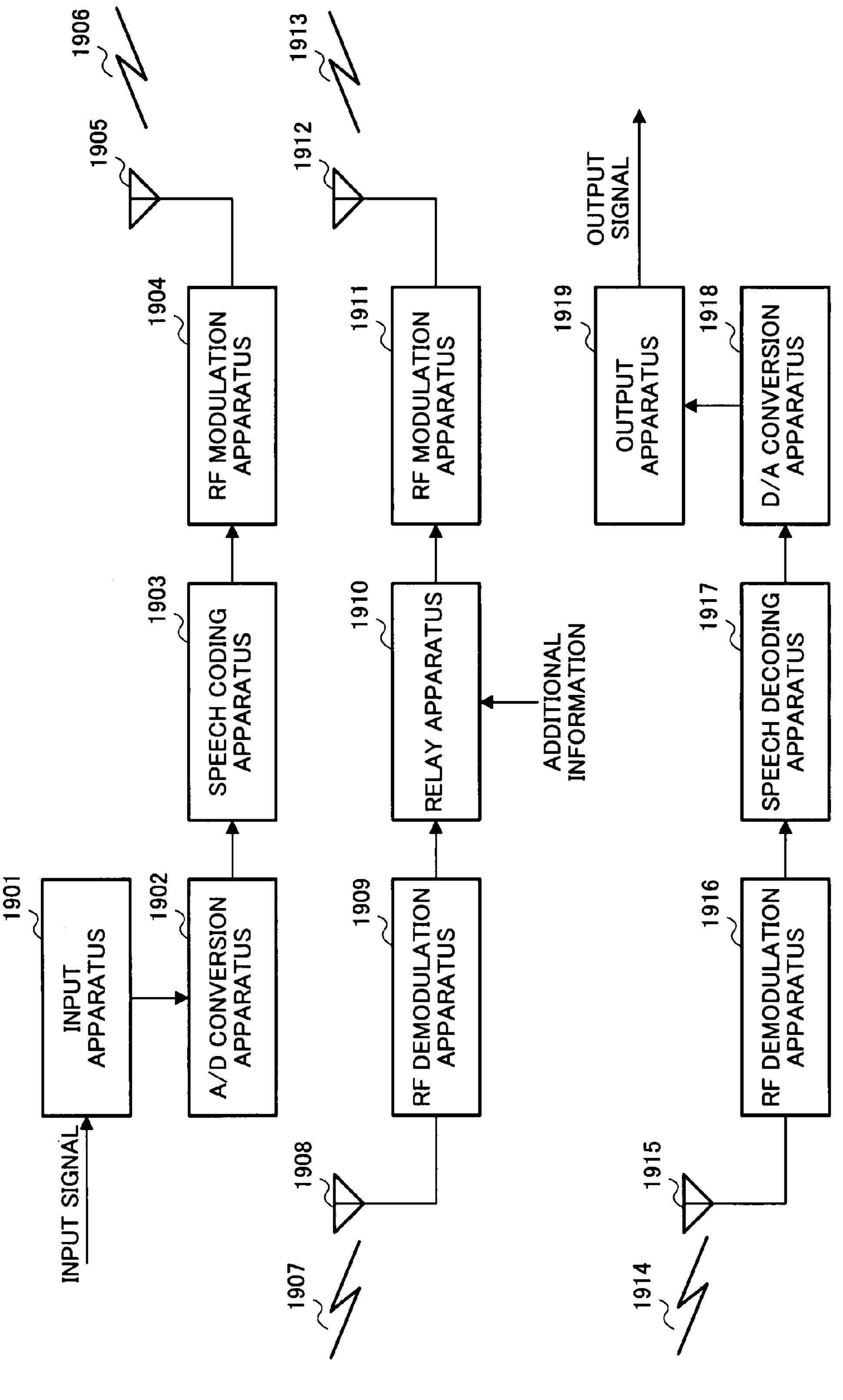
FIG. 19 is a block diagram showing the configuration of the signal transmission apparatus, relay apparatus, and signal reception apparatus according to Embodiment 5 of the present invention.

FIG. 19 shows a block diagram of the configuration of the signal transmission apparatus, relay apparatus, and signal reception apparatus that includes the signal coding apparatus, relay apparatus, and signal decoding apparatus described in the above embodiments 1 to 4. The following describes the case where speech signals are transmitted and received, using FIG. 19.

In FIG. 19, the speech signal is converted to an electrical signal by input apparatus 1901, and output to A/D conversion apparatus 1902. A/D conversion apparatus 1902 converts the (analog) signal output from input apparatus 1901 to a digital signal, and outputs the result to speech coding apparatus 1903. Speech coding apparatus 1903 utilizes signal coding apparatus 101 shown in FIG. 1, codes the digital speech signal output from A/D conversion apparatus 1902, and outputs the coded information to RF modulation apparatus 1904. RF modulation apparatus 1904 converts the coded information output from speech coding apparatus 1903 for transmission on a propagation medium such as radio waves, and outputs the result to transmission antenna 1905. Transmission antenna 1905 transmits the output signal output from RF modulation apparatus 1904 as a radio wave (RF signal). Furthermore, RF signal 1906 in the figure represents the radio wave (RF signal) transmitted from transmission antenna 1905.

RF signal 1907 is received by relay apparatus reception antenna 1908 and output to RF demodulation apparatus 1909. Furthermore, RF signal 1907 in the figure indicates the radio wave received by relay apparatus reception antenna 1908 and is exactly the same as RF signal 1906 if there is no signal attenuation or noise superimposition in the propagation path.

RF demodulation apparatus 1909 demodulates and outputs the coded information from the RF signal output from relay apparatus reception antenna 1908 to relay apparatus 1910. Relay apparatus 1910 utilizes relay apparatus 103 described in FIG. 1, adds additional information to the speech coded information in accordance with the send mode information included in the speech coded information output from RF demodulation apparatus 1909 and the additional information input to relay apparatus 1910, and outputs the coded information obtained after the addition processing (or coded information after conversion) to RF modulation apparatus 1911. RF modulation apparatus 1911 converts the coded information output from relay apparatus 1910 (or coded information after conversion) to a signal for transmission on a propagation medium such as radio waves, and outputs the result to relay apparatus transmission antenna 1912. Relay apparatus transmission antenna 1912 transmits the output signal output from RF modulation apparatus 1911 as a radio wave (RF signal). Furthermore, RF signal 1913 in the figure represents the radio wave (RF signal) transmitted from relay apparatus transmission antenna 1912.

RF signal 1914 is received by reception antenna 1915 and output to RF demodulation apparatus 1916. Furthermore, RF signal 1914 in the figure indicates the radio wave received by reception antenna 1915 and is exactly the same as RF signal 1914 if there is no signal attenuation or noise superimposition in the propagation path.

RF demodulation apparatus 1916 demodulates and outputs the coded information from the RF signal output from reception antenna 1915 to speech decoding apparatus 1917. Speech decoding apparatus 1917 utilizes signal decoding apparatus 105 shown in FIG. 1, decodes the speech signal from the speech coded information output from RF demodulation apparatus 1916, and outputs the obtained digital decoded speech signal to D/A conversion apparatus 1918. D/A conversion apparatus 1918 converts the digital speech signal output from speech decoding apparatus 1917 to an analog electrical signal, and outputs the result to output apparatus 1919.

Output apparatus 1919 converts the electrical signal to air vibrations, and outputs the result as acoustic waves so that the vibrations can be heard by the human ear.

The base station apparatus and communication terminal apparatus in the wireless communication system comprise a speech signal transmission apparatus and speech signal reception apparatus as described above, thereby achieving high quality output signals.

Furthermore, while the present embodiment describes the case where a speech signal is the target input signal, the invention can be similarly applied to signals other than speech signals as well.

Embodiment 6

While the above Embodiment 3 describes the case where noise that occurs during decoding is suppressed by attenuating and amplifying the decoded signal of each layer in the signal decoding apparatus during the addition processing in the relay apparatus, the suppression of noise that occurs during decoding by attenuation/amplification can also be applied when simply decoding signals coded in the signal coding apparatus. Embodiment 6 describes the case where the noise that occurs during decoding is suppressed by performing attenuation/amplification when decoding signals coded in the signal coding apparatus.

Figure 20:
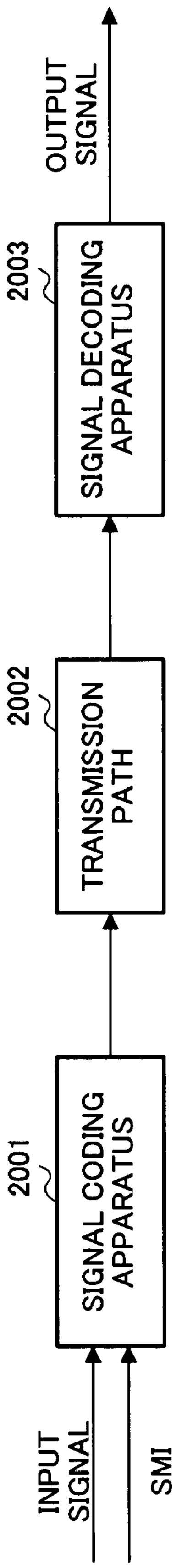
FIG. 20 is a block diagram showing the configuration of the communication system according to Embodiment 6 of the present invention.

FIG. 20 shows the system configuration including the signal decoding apparatus according to the present embodiment. Signal coding apparatus 2001 codes the input signal in accordance with the send mode information using a CELP type speech coding method, and transmits the coded information obtained from coding to signal decoding apparatus 2003 via transmission path 2002. Furthermore, transmission path 2002 is in some cases signal relay apparatus mediated.

Signal decoding apparatus 2003 decodes the coded information received via transmission path 2002 using a CELP type speech decoding method, and outputs the decoded signal obtained from decoding as an output signal.

Figure 21:
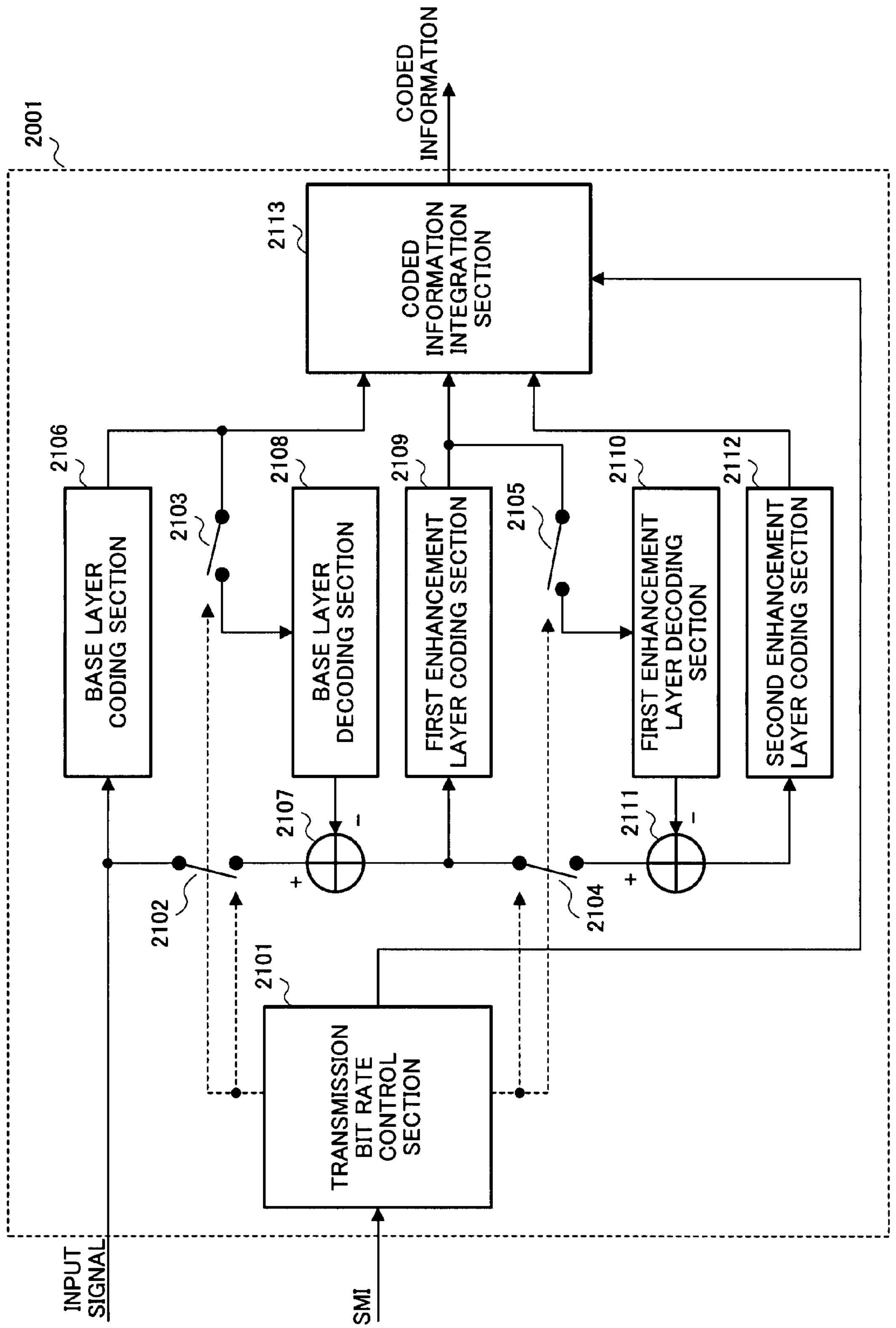
FIG. 21 is a block diagram showing the internal configuration of the signal coding apparatus according to Embodiment 6 of the present invention.

Next, the configuration of signal coding apparatus 2001 of FIG. 20 will be described using the block diagram of FIG. 21. Signal coding apparatus 2001 separates the input signals every N samples (where N is a natural number) and, given N samples in a single frame, codes the input signals on a frame-by-frame basis.

Signal coding apparatus 2001 mainly comprises transmission bit rate control section 2101, control switches 2102 to 2105, base layer coding section 2106, base layer decoding section 2108, addition sections 2107 and 2111, first enhancement layer coding section 2109, first enhancement layer decoding section 2110, second enhancement layer coding section 2112, and coded information integration section 2113.

Send mode information is input to transmission bit rate control section 2101. Here, the send mode information indicates the transmission bit rate when input signals are coded and transmitted; one transmission bit rate is selected from two or more predetermined transmission bit rates as the send mode information. Furthermore, in the present embodiment, the send mode information may assume the values of the predetermined four transmission bit rates bitrate0, bitrate1, bitrate2, and bitrate3 (where bitrate3<bitrate2<bitrate1). Note, however, that bitrate0 refers to cases where an input signal is not input to signal coding apparatus 2001. In addition, in the present embodiment, the send mode information for the next frame (hereinafter $Mode_{next}$) is simultaneously input in addition to the send mode information for the current frame (hereinafter $Mode_{cur}$).

Transmission bit rate control section 2101 controls the ON/OFF settings of control switches 2102 to 2105 in accordance with the send mode information $Mode_{cur}$ for the input current frame. Specifically, when the send mode information $Mode_{cur}$ is bitrate1, transmission bit rate control section 2101 sets all control switches 2102 to 2105 to ON. When the send mode information $Mode_{cur}$ is bitrate2, transmission bit rate control section 2101 sets control switches 2102 and 2103 to ON, and sets control switches 2104 and 2105 to OFF. When the send mode information $Mode_{cur}$ is bitrate3, transmission bit rate control section 2101 sets all control switches 2102 to 2105 to OFF. In addition, transmission bit rate control section 2101 outputs the send mode information $Mode_{cur}$ and $Mode_{next}$ to coded information integration section 2113. In this manner, transmission bit rate control section 2101 controls the ON/OFF settings of the control switches in accordance with the send mode information $Mode_{cur}$, thereby determining the combinations of coding sections used for input signal coding.

The input signal is input to control switch 2102 and base layer coding section 2106.

Base layer coding section 2106 codes the input signal using a CELP type speech coding method and outputs the information source code obtained from coding (hereinafter "base layer information source code") to coded information integration section 2113 and control switch 2103.

When control switch 2103 is ON, base layer decoding section 2108 decodes the base layer information source code output from base layer coding section 2106 using a CELP type speech decoding method, and outputs the decoded signal obtained from decoding (hereinafter "base layer decoded signal") to addition section 2107. When control switch 2103 is OFF, base layer decoding section 2108 does not perform any operation.

When control switches 2102 and 2103 are ON, addition section 2107 adds the signal that inverted the polarity of the base layer decoded signal to the input signal, and outputs the first differential signal which is the addition result to first enhancement layer coding section 2109 and control switch 2104. When control switches 2102 and 2103 are OFF, addition section 2107 does not perform any operation.

When control switches 2102 and 2103 are ON, first enhancement layer coding section 2109 codes the first differential signal obtained from addition section 2107 using a CELP type speech coding method, and outputs the information source code from coding (hereinafter "first enhancement layer information source code") to control switch 2105 and coded information integration section 2113. When control switches 2102 and 2103 are OFF, first enhancement layer coding section 2109 does not perform any operation.

When control switch 2105 is ON, first enhancement layer decoding section 2110 decodes the first enhancement layer information source code output from first enhancement layer coding section 2109 using a CELP type speech decoding method, and outputs the decoded signal obtained from decoding (hereinafter "first enhancement layer decoded signal") to addition section 2111. When control switch 2105 is OFF, first enhancement layer decoding section 2110 does not perform any operation.

When control switches 2104 and 2105 are ON, addition section 2111 adds the signal that inverted the polarity of the first enhancement layer decoded signal to the first differential signal obtained from control switch 2104, and outputs the second differential signal which is the addition result to second enhancement layer coding section 2112. When control switches 2104 and 2105 are OFF, addition section 2111 does not perform any operation.

When control switches 2104 and 2105 are ON, second enhancement layer coding section 2112 codes the second differential signal output from addition section 2111 using a CELP type speech coding method, and outputs the information source code obtained from coding (hereinafter "second enhancement layer information source code") to coded information integration section 2113. When control switches 2104 and 2105 are OFF, second enhancement layer coding section 2112 does not perform any operation.

Coded information integration section 2113 integrates the information source code output from base layer coding section 2106, first enhancement layer coding section 2109, and second enhancement layer coding section 2112, with the send mode information $Mode_{cur}$ and $Mode_{next}$ output from transmission bit rate control section 2101, and outputs the result as coded information to transmission path 2002.

This concludes the description of the configuration of signal coding apparatus 2001 of FIG. 20. The internal configuration of base layer coding section 2106 is the same as that of base layer coding section 206 shown in FIG. 4, and a detailed description thereof will be omitted. In addition, the internal configurations of first enhancement layer coding section 2109 and second enhancement layer coding section 2112 are the same as that of base layer coding section 2106 only with a different signal type input and information source code type output, and detailed descriptions thereof will be omitted.

The internal configuration of base layer decoding section 2108 is the same as that of base layer decoding section 208 shown in FIG. 5, and a detailed description thereof will be omitted. In addition, the internal configuration of first enhancement layer decoding section 2110 is the same as that of base layer decoding section 2108 only with a different information source code type input and signal type output, and a detailed description thereof will be omitted.

Figures 22A, 22B, 22C:
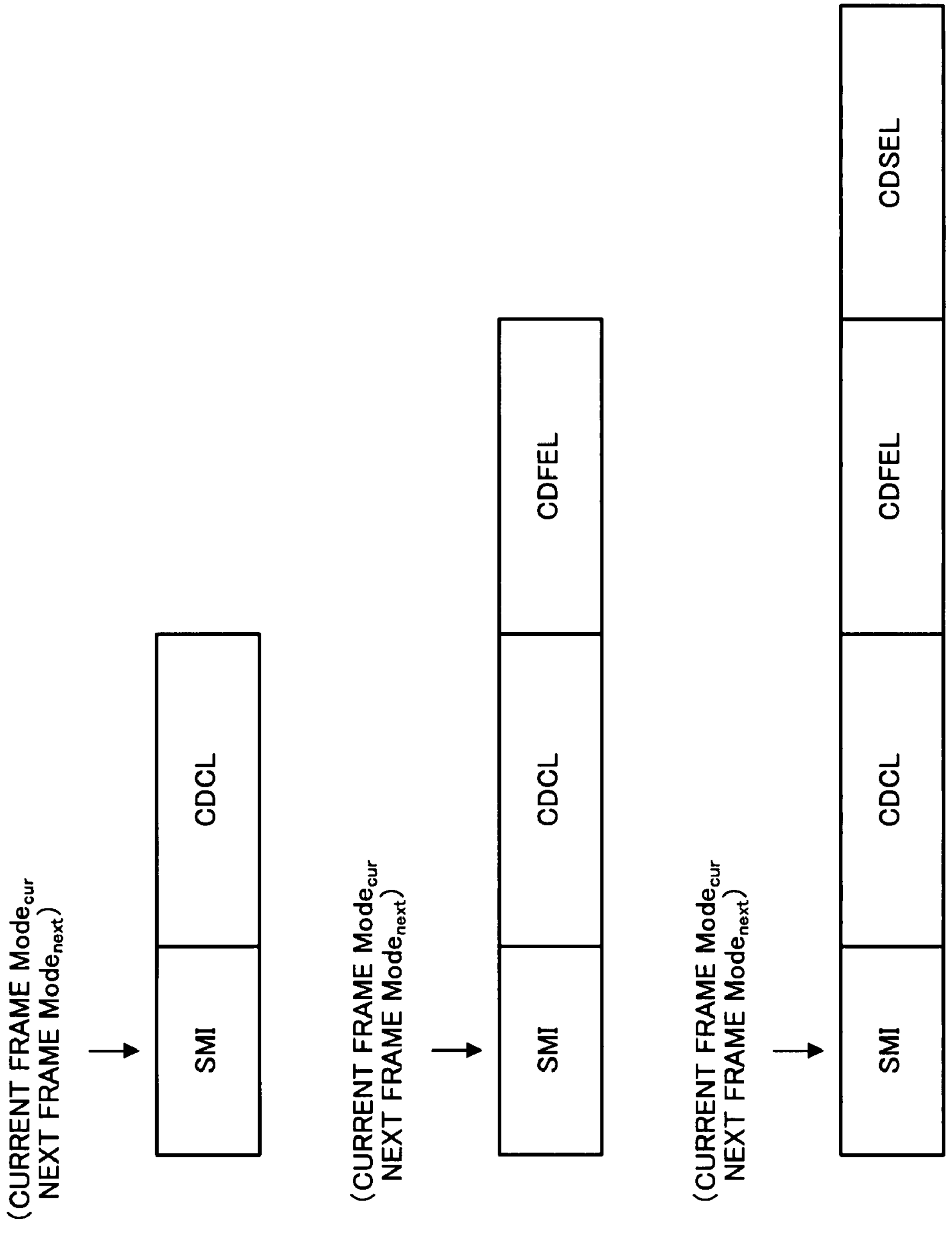
FIG. 22 is a block diagram showing the structure of the data transmitted from the signal coding apparatus according to Embodiment 6 of the present invention.

Next, the data structure (bitstream) of the coded information will be described using FIG. 22. When the send mode information $Mode_{cur}$ is bitrate3, the coded information comprises the send mode information $Mode_{cur}$ and $Mode_{next}$, and the base layer information source code, as shown in FIG. 22A. When the send mode information $Mode_{cur}$ is bitrate2, the coded information comprises the send mode information $Mode_{cur}$ and $Mode_{next}$, the base layer information source code, and the first enhancement layer information source code as shown in FIG. 22B. When the send mode information $Mode_{cur}$ is bitrate1, the coded information comprises the send mode information $Mode_{cur}$ and $Mode_{next}$, the base layer information source code, the first enhancement layer information source code, and the second enhancement layer information source code as shown in FIG. 22C.

Next, the configuration of signal decoding apparatus 2003 of FIG. 20 will be described using FIG. 23. Signal decoding apparatus 2003 mainly comprises decoding operation control section 2301, base layer decoding section 2302, first enhancement layer decoding section 2303, second enhancement layer decoding section 2304, gain adjustment sections 2308 to 2310, control switches 2305 to 2307 and addition sections 2311 and 2312.

Coded information is input to decoding operation control section 2301.

Decoding operation control section 2301 has an internal memory for storing the send mode information for the previous frame (initial value: bitrate0; hereinafter $Mode_{pre}$), separates the input coded information into send mode information $Mode_{cur}$ and $Mode_{next}$ and the information source code of each layer, and controls gain adjustment sections 2308 to 2310 and control switches 2305 to 2307 in accordance with the send mode information $Mode_{pre}$, $Mode_{cur}$, and $Mode_{next}$.

In addition, decoding operation control section 2301 outputs the information source code of each layer to base layer decoding section 2302, first enhancement layer decoding section 2303, and second enhancement layer decoding section 2304.

Next, the operation of decoding operation control section 2301 corresponding to the send mode information $Mode_{pre}$, $Mode_{cur}$, and $Mode_{next}$ will be described in detail.

(Pattern 1)

When the send mode information $Mode_{pre}$, $Mode_{cur}$, and $Mode_{next}$ satisfy the following equation (5), decoding operation control section 2301 uses the values of $Mode_{pre}$ and $Mode_{next}$ for the current frame, and performs fade-out processing with the transmission bit rate indicated by $Mode_{pre}$ as the upper limit and the transmission bit rate indicated by $Mode_{next}$ as the lower limit.

[Equation 5]

$$\begin{cases} Mode_{cur} > Mode_{next} \\ Mode_{cur} > Mode_{pre} \\ Mode_{pre} > Mode_{next} \end{cases} \quad (5)$$

At this time, decoding operation control section 2301 controls control switches 2305 to 2307 in accordance with the transmission bit rate indicated by $Mode_{pre}$. Specifically, when $Mode_{pre}$ is bitrate2, decoding operation control section 2301 sets control switches 2305 and 2306 to ON, sets control switch 2307 to OFF, outputs the base layer information source code to base layer decoding section 2302, and outputs the first enhancement layer information source code to first enhancement layer decoding section 2303. When $Mode_{pre}$ is bitrate3, decoding operation control section 2301 sets control switch 2305 to ON, sets control switches 2306 and 2307 to OFF, and outputs the base layer information source code to base layer decoding section 2302.

In addition, at this time, decoding operation control section 2301 controls gain adjustment sections 2308 to 2310 in accordance with the transmission bit rates indicated by $Mode_{pre}$ and $Mode_{next}$. Specifically, when $Mode_{pre}$ is bitrate2 and $Mode_{next}$ is bitrate3, decoding operation control section 2301 sets gain adjustment section 2309 to fade-out, and sets gain adjustment sections 2308 and 2310 to OFF. When $Mode_{pre}$ is bitrate2 and $Mode_{next}$ is bitrate0, decoding operation control section 2301 sets gain adjustment sections 2308 and 2309 to fade-out, and sets gain adjustment section 2310 to OFF. When $Mode_{pre}$ is bitrate3 and $Mode_{next}$ is bitrate0, decoding operation control section 2301 sets gain adjustment section 2308 to fade-out, and sets gain adjustment sections 2309 and 2310 to OFF.

(Pattern 2)

When the send mode information $Mode_{pre}$, $Mode_{cur}$, and $Mode_{next}$ satisfy the following equation (6), decoding operation control section 2301 normally decodes the current frame using the transmission bit rate indicated by $Mode_{pre}$ (=$Mode_{next}$).

[Equation 6]

$$\begin{cases} Mode_{cur} > Mode_{next} \\ Mode_{cur} > Mode_{pre} \\ Mode_{pre} = Mode_{next} \end{cases} \quad (6)$$

At this time, decoding operation control section 2301 controls control switches 2305 to 2307 in accordance with the transmission bit rate indicated by $Mode_{pre}$. Specifically, when $Mode_{pre}$ is bitrate2, decoding operation control section 2301 sets control switches 2305 and 2306 to ON, sets control switch 2307 to OFF, outputs the base layer information source code to base layer decoding section 2302, and outputs the first enhancement layer information source code to first enhancement layer decoding section 2303. When $Mode_{pre}$ is bitrate3, decoding operation control section 2301 sets control switch 2305 to ON, sets control switches 2306 and 2307 to OFF, and outputs the base layer information source code to base layer decoding section 2302.

In addition, at this time, decoding operation control section 2301 sets all gain adjustment sections 2308 to 2310 to OFF.

(Pattern 3)

When the send mode information $Mode_{pre}$, $Mode_{cur}$, and $Mode_{next}$ satisfy the following equation (7), decoding operation control section 2301 uses the values of $Mode_{pre}$ and $Mode_{next}$ for the current frame, and performs fade-in processing with the transmission bit rate indicated by $Mode_{pre}$ as the lower limit and the transmission bit rate indicated by $Mode_{next}$ as the upper limit.

[Equation 7]

$$\begin{cases} Mode_{cur} > Mode_{next} \\ Mode_{cur} > Mode_{pre} \\ Mode_{pre} < Mode_{next} \end{cases} \quad (7)$$

At this time, decoding operation control section 2301 controls control switches 2305 to 2307 in accordance with the transmission bit rate indicated by $Mode_{next}$. Specifically, when $Mode_{next}$ is bitrate2, decoding operation control section 2301 sets control switches 2305 and 2306 to ON, sets control switch 2307 to OFF, outputs the base layer information source code to base layer decoding section 2302, and outputs the first enhancement layer information source code to first enhancement layer decoding section 2303. When $Mode_{next}$ is bitrate3, decoding operation control section 2301 sets control switch 2305 to ON, sets control switches 2306 and 2307 to OFF, and outputs the base layer information source code to base layer decoding section 2302.

In addition, at this time, decoding operation control section 2301 controls gain adjustment sections 2308 to 2310 in accordance with the transmission bit rates indicated by $Mode_{pre}$ and $Mode_{next}$. Specifically, when $Mode_{pre}$ is bitrate3 and $Mode_{next}$ is bitrate2, decoding operation control section 2301 sets gain adjustment section 2309 to fade-in, and sets gain adjustment sections 2308 and 2310 to OFF. When $Mode_{pre}$ is bitrate0 and $Mode_{next}$ is bitrate2, decoding operation control section 2301 sets gain adjustment sections 2308 and 2309 to fade-in, and sets gain adjustment section 2310 to OFF. When $Mode_{pre}$ is bitrate0 and $Mode_{next}$ is bitrate3, decoding operation control section 2301 sets gain adjustment section 2308 to fade-in, and sets gain adjustment sections 2309 and 2310 to OFF.

(Pattern 4)

When the send mode information $Mode_{pre}$, $Mode_{cur}$, and $Mode_{next}$ satisfy the following equation (8), decoding operation control section 2301 uses the values of $Mode_{cur}$ and $Mode_{next}$ for the current frame, and performs fade-out processing with the transmission bit rate indicated by $Mode_{cur}$ as the upper limit and the transmission bit rate indicated by $Mode_{next}$ as the lower limit.

[Equation 8]

$$\begin{cases} \text{Mode}_{cur} > \text{Mode}_{next} \\ \text{Mode}_{cur} \leq \text{Mode}_{pre} \end{cases} \quad (8)$$

At this time, decoding operation control section 2301 controls control switches 2305 to 2307 in accordance with the transmission bit rate indicated by $\text{Mode}_{cur}$. Specifically, when $\text{Mode}_{cur}$ is bitrate1, decoding operation control section 2301 sets all control switches 2305 to 2307 to ON, outputs the base layer information source code to base layer decoding section 2302, outputs the first enhancement layer information source code to first enhancement layer decoding section 2303, outputs the second enhancement layer information source code to second enhancement layer decoding section 2304 when $\text{Mode}_{cur}$ is bitrate2, decoding operation control section 2301 sets control switches 2305 and 2306 to ON, sets control switch 2307 to OFF, outputs the base layer information source code to base layer decoding section 2302, and outputs the first enhancement layer information source code to first enhancement layer decoding section 2303. When $\text{Mode}_{cur}$ is bitrate3, decoding operation control section 2301 sets control switch 2305 to ON, sets the control switches 2306 and 2307 to OFF, and outputs the base layer information source code to base layer decoding section 2302.

In addition, at this time, decoding operation control section 2301 controls gain adjustment sections 2305 to 2307 in accordance with the transmission bit rates indicated by $\text{Mode}_{cur}$ and $\text{Mode}_{next}$. Specifically, when $\text{Mode}_{cur}$ is bitrate1 and $\text{Mode}_{next}$ is bitrate2, decoding operation control section 2301 sets gain adjustment section 2310 to fade-out, and sets gain adjustment sections 2308 and 2309 to OFF. When $\text{Mode}_{cur}$ is bitrate1 and $\text{Mode}_{next}$ is bitrate3, decoding operation control section 2301 sets gain adjustment sections 2309 and 2310 to fade-out, and sets gain adjustment section 2308 to OFF. When $\text{Mode}_{cur}$ is bitrate1 and $\text{Mode}_{next}$ is bitrate0, decoding operation control section 2301 sets all gain adjustment sections 2308 to 2310 to fade-out. When $\text{Mode}_{cur}$ is bitrate2 and $\text{Mode}_{next}$ is bitrate3, decoding operation control section 2301 sets gain adjustment section 2309 to fade-out, and sets gain adjustment sections 2308 and 2310 to OFF. When $\text{Mode}_{cur}$ is bitrate2 and $\text{Mode}_{next}$ is bitrate0, decoding operation control section 2301 sets gain adjustment sections 2308 and 2309 to fade-out, and sets gain adjustment section 2310 to OFF. When $\text{Mode}_{cur}$ is bitrate3 and $\text{Mode}_{next}$ is bitrate0, decoding operation control section 2301 sets gain adjustment section 2308 to fade-out, and sets gain adjustment sections 2309 and 2310 to OFF.

(Pattern 5)

When the send mode information $\text{Mode}_{pre}$, $\text{Mode}_{cur}$, and $\text{Mode}_{next}$ satisfy the following equation (9), decoding operation control section 2301 uses the values of $\text{Mode}_{pre}$ and $\text{Mode}_{cur}$ for the current frame, and performs fade-in processing with the transmission bit rate indicated by $\text{Mode}_{pre}$ as the lower limit and the transmission bit rate indicated by $\text{Mode}_{cur}$ as the upper limit.

[Equation 9]

$$\begin{cases} \text{Mode}_{cur} \leq \text{Mode}_{next} \\ \text{Mode}_{cur} > \text{Mode}_{pre} \end{cases} \quad (9)$$

At this time, decoding operation control section 2301 controls control switches 2305 to 2307 in accordance with the transmission bit rate indicated by $\text{Mode}_{cur}$. Specifically, when $\text{Mode}_{cur}$ is bitrate1, decoding operation control section 2301 sets all control switches 2305 to 2307 to ON, outputs the base layer information source code to base layer decoding section 2302, outputs the first enhancement layer information source code to first enhancement layer decoding section 2303, and outputs the second enhancement layer information source code to second enhancement layer decoding section 2304. When $\text{Mode}_{cur}$ is bitrate2, decoding operation control section 2301 sets control switches 2305 and 2306 to ON, sets control switch 2307 to OFF, outputs the base layer information source code to base layer decoding section 2302, and outputs the first enhancement layer information source code to first enhancement layer decoding section 2303. When $\text{Mode}_{cur}$ is bitrate3, decoding operation control section 2301 sets control switch 2305 to ON, sets the control switches 2306 and 2307 to OFF, and outputs the base layer information source code to base layer decoding section 2302.

In addition, at this time, decoding operation control section 2301 controls gain adjustment sections 2308 to 2310 in accordance with the transmission bit rates indicated by $\text{Mode}_{pre}$ and $\text{Mode}_{cur}$. Specifically, when $\text{Mode}_{pre}$ is bitrate2 and $\text{Mode}_{cur}$ is bitrate1, decoding operation control section 2301 sets gain adjustment section 2310 to fade-in, and sets gain adjustment sections 2308 and 2309 to OFF. When $\text{Mode}_{pre}$ is bitrate3 and $\text{Mode}_{cur}$ is bitrate1, decoding operation control section 2301 sets gain adjustment sections 2309 and 2310 to fade-in, and sets gain adjustment section 2308 to OFF. When $\text{Mode}_{pre}$ is bitrate0 and $\text{Mode}_{cur}$ is bitrate1, decoding operation control section 2301 sets all gain adjustment sections 2308 and 2310 to fade-in. When $\text{Mode}_{pre}$ is bitrate3 and $\text{Mode}_{cur}$ is bitrate2, decoding operation control section 2301 sets gain adjustment section 2309 to fade-in, and sets gain adjustment sections 2308 and 2310 to OFF. When $\text{Mode}_{pre}$ is bitrate0 and $\text{Mode}_{cur}$ is bitrate2, decoding operation control section 2301 sets gain adjustment sections 2308 and 2309 to fade-in, and sets gain adjustment section 2310 to OFF. When $\text{Mode}_{pre}$ is bitrate0 and $\text{Mode}_{cur}$ is bitrate3, decoding operation control section 2301 sets gain adjustment section 2308 to fade-in, and sets gain adjustment sections 2309 and 2310 to OFF.

(Pattern 6)

When the send mode information $\text{Mode}_{pre}$, $\text{Mode}_{cur}$, and $\text{Mode}_{next}$ do not satisfy any of the equations (5) to (9) of patterns 1 to 5, decoding operation control section 2301 normally decodes the current frame using the transmission bit rate indicated by $\text{Mode}_{cur}$.

At this time, decoding operation control section 2301 controls control switches 2305 to 2307 in accordance with the transmission bit rate indicated by $\text{Mode}_{cur}$. Specifically, when $\text{Mode}_{cur}$ is bitrate1, decoding operation control section 2301 sets all control switches 2305 to 2307 to ON, outputs the base layer information source code to base layer decoding section 2302, outputs the first enhancement layer information source code to first enhancement layer decoding section 2303, and outputs the second enhancement layer information source code to second enhancement layer decoding section 2304. When $\text{Mode}_{cur}$ is bitrate2, decoding operation control section 2301 sets control switches 2305 and 2306 to ON, sets control switch 2307 to OFF, outputs the base layer information source code to base layer decoding section 2302, and outputs the first enhancement layer information source code to first enhancement layer decoding section 2303. When $\text{Mode}_{cur}$ is bitrate3, decoding operation control section 2301 sets control switch 2305 to ON, sets the control switches 2306 and 2307 to OFF, and outputs the base layer information source code to base layer decoding section 2302.

In addition, at this time, decoding operation control section 2301 sets all gain adjustment sections 2308 to 2310 to OFF.

The above describes the method for controlling control switches 2305 to 2307 and gain adjustment sections 2308 to 2311 and the method for determining the information source code output to the decoding section of each layer, based on decoding operation control section 2301.

Next, decoding operation control section 2301 assigns the send mode information $Mode_{cur}$ for the current frame in the memory that stores the send mode information $Mode_{pre}$ for the previous frame, thereby updating the value.

When control switch 2305 is ON, base layer decoding section 2302 decodes the base layer information source code output from decoding operation control section 2301 using a CELP type speech decoding method, and outputs the decoded signal obtained from decoding (hereinafter "base layer decoded signal") to gain adjustment section 2308. When control switch 2305 is OFF, base layer decoding section 2302 does not perform any operation.

When control switch 2306 is ON, first enhancement layer decoding section 2303 decodes the first enhancement layer information source code output from decoding operation control section 2301 using a CELP type speech decoding method, and outputs the decoded signal obtained from decoding (hereinafter "first enhancement layer decoded signal") to gain adjustment section 2309. When control switch 2306 is OFF, first enhancement layer decoding section 2303 does not perform any operation.

When control switch 2307 is ON, second enhancement layer decoding section 2304 decodes the second enhancement layer information source code output from decoding operation control section 2301 using a CELP type speech decoding method, and outputs the decoded signal obtained from decoding (hereinafter "second enhancement layer decoded signal") to gain adjustment section 2310. When control switch 2307 is OFF, second enhancement layer decoding section 2304 does not perform any operation.

The internal configurations of base layer decoding section 2302, first enhancement layer decoding section 2303, and second enhancement layer decoding section 2304 are the same as that of the above base layer decoding section 208 only with a different information source code type input and signal type output, and detailed descriptions thereof will be omitted.

The base layer decoded signal is input from base layer decoding section 2302 to gain adjustment section 2308. In addition, the fade-out, fade-in, and OFF statuses of gain adjustment section 2308 are controlled by decoding operation control section 2301.

When controlled in an OFF state by decoding operation control section 2301, gain adjustment section 2308 outputs the base layer decoded signal obtained from base layer decoding section 2302 as is to addition section 2312. When controlled in a fade-out state by decoding operation control section 2301, gain adjustment section 2308 performs attenuation processing against the base layer decoded signal obtained from base layer decoding section 2302 in accordance with the following equation (10), and outputs the obtained signal to addition section 2312.

[Equation 10]

$$Xbase'_i = \frac{(N_s - 1 - i)}{N_s - 1} \cdot Xbase_i \quad (i = 0, \ldots, N_s - 1) \tag{10}$$

Here, $N_s$ is a value determined by N samples of a single frame, $Xbase'_i$ is the base layer decoded signal, and $Xbase''_i$ is the decoded signal after attenuation.

When controlled in a fade-in state by decoding operation control section 2301, gain adjustment section 2308 amplifies the base layer decoded signal obtained from base layer decoding section 2302 in accordance with the following equation (11), and outputs the obtained signal to addition section 2312.

[Equation 11]

$$Xbase''_i = \frac{i}{N_s - 1} \cdot Xbase_i \quad (i = 0, \ldots, N_s - 1) \tag{11}$$

Here, similar to the above equation (10), $N_s$ is a value determined by N samples of a single frame, $Xbase_i$ is the base layer decoded signal, and $Xbase''_i$ is the decoded signal after amplification.

Gain adjustment section 2309 has the same configuration as that of gain adjustment section 2308 except the input signal in gain adjustment section 2308 is replaced with the first enhancement layer decoded signal and addition section 2312 is replaced with addition section 2311, and a detailed description thereof will be omitted. In addition, gain adjustment section 2310 has the same configuration as that of gain adjustment section 2308 except the input signal in gain adjustment section 2308 is replaced with the second enhancement layer decoded signal and addition section 2312 is replaced with addition section 2311, and a detailed description thereof will be omitted.

When control switches 2306 and 2307 are ON, addition section 2311 adds the second enhancement layer decoded signal output from second enhancement layer decoding section 2304 and the first enhancement layer decoded signal output from first enhancement layer decoding section 2303, and outputs the signal after the addition to addition section 2312. When control switch 2307 is OFF and control switch 2306 is ON, addition section 2311 outputs the first enhancement layer decoded signal output from first enhancement layer decoding section 2303 to addition section 2312. When control switches 2306 and 2307 are OFF, addition section 2311 does not perform any operation.

When control switches 2305 and 2306 are ON, addition section 2312 adds the base layer decoded signal output from base layer decoding section 2302 and the output signal of addition section 2311, and outputs the signal after the addition as the output signal. When control switch 2305 is ON and control switch 2306 is OFF, addition section 2312 outputs the base layer decoded signal output from base layer decoding section 2302 as the output signal. When control switches 2305 and 2306 are OFF, addition section 2312 does not perform any operation.

This concludes the description of the internal configuration of signal decoding apparatus 2003 of FIG. 20.

With such a configuration, according to the present embodiment, noise can be suppressed at the time of communication using a scalable coding/decoding method by increasing or decreasing the number of layers used during decoding.

Furthermore, while the present embodiment describes the case where noise that occurs at the time the number of layers (transmission bit rate) changes in a signal decoding apparatus is suppressed by detecting the switching of send mode information between consecutive frames and including that information in the coded information in a signal coding apparatus, the present invention is not limited thereto and can be similarly applied to cases where noise that occurs at the time the number of layers (transmission bit rate) changes in a signal decoding apparatus is suppressed by performing processing similar to that of a signal coding apparatus, even under conditions where the transmission bit rate is switched in the signal relay apparatus that exists in the transmission path.

In addition, the present embodiment describes the case where a signal decoding apparatus switches the number of layers utilized for decoding in accordance with the next frame, previous frame, and current frame send mode information included in the input coded information, under conditions where the send mode information of the next frame is obtained in advance. The present invention, however, is not limited thereto and can also be similarly applied to cases where a transmission error detection bit is included in the coded information enabling transmission error detection by a transmission error detection section provided in the signal decoding apparatus so as to change the number of layers utilized during decoding and decode coded information that has been delayed one frame (by storing the information in an internal buffer). For example, when coded information is transmitted with the send mode information of two frames prior as bitrate1, the send mode information of the previous frame as bitrate2, and the send mode information of the current frame as bitrate2, and the transmission error detection section in the signal decoding apparatus detects a transmission error in the information source code of the uppermost layer (first enhancement layer) of the current frame (bitrate2), the above (pattern 4) fade-out processing is performed against the coded information of the previous frame stored in the internal buffer, thereby suppressing the noise caused by a change in the number of layers.

Furthermore, while the present embodiment describes the case where a CELP type speech coding/decoding method is used as the coding method of the coding apparatus, the present invention is not limited thereto and can also be similarly applied to signals other than speech and audio signals such as static images and dynamic images.

In addition, the present invention is not limited in terms of layers, and can also be applied to cases where the difference between the input signal and output signal of the lower layer, i.e., the differential signal, is coded in the upper layer based on a hierarchical signal coding/decoding method configured with a plurality of layers.

Figure 23:
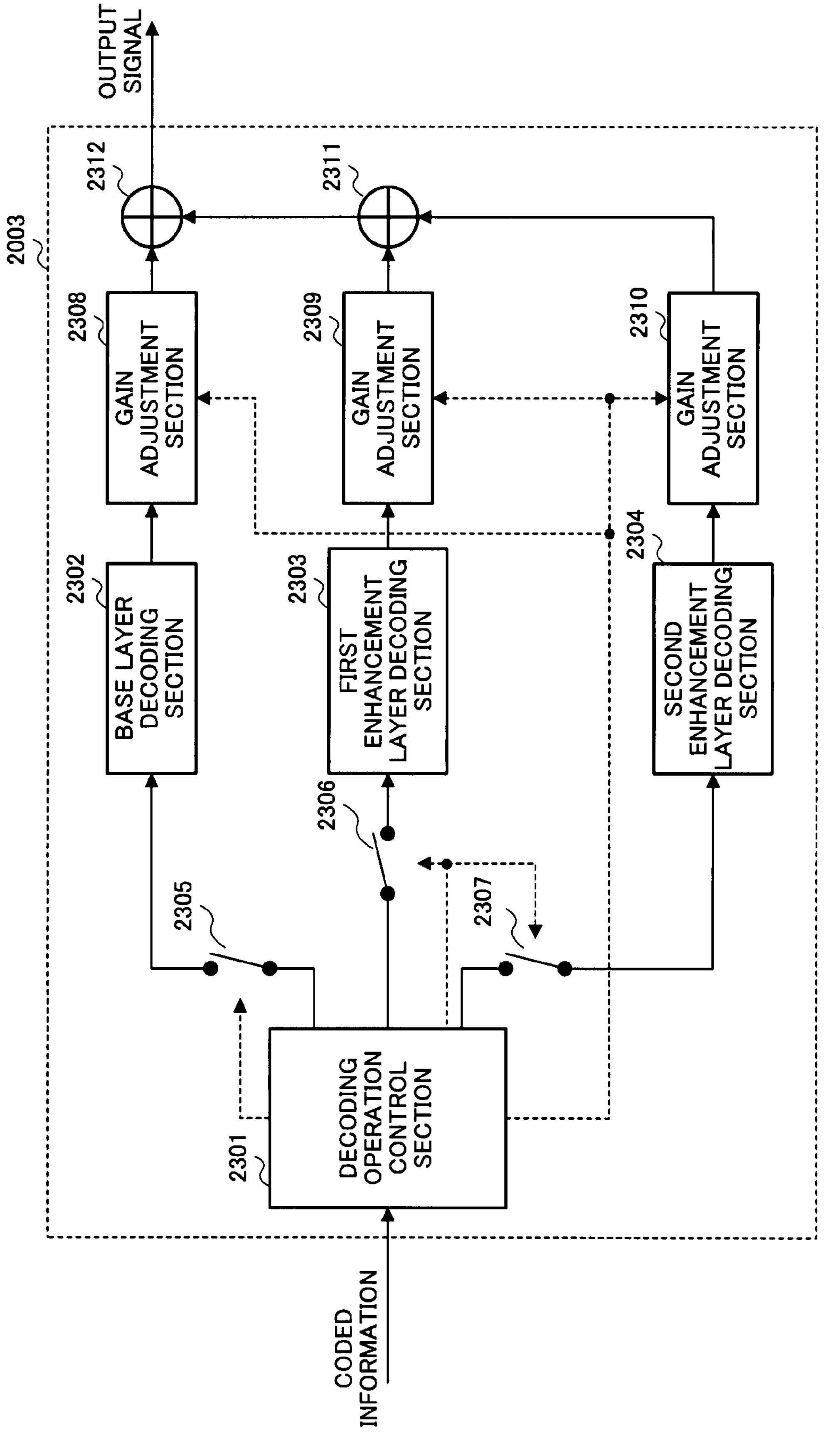
FIG. 23 is a block diagram showing the internal configuration of the signal decoding apparatus according to Embodiment 6 of the present invention.

In addition, the present invention can also be applied to cases where the configuration of the present embodiment shown in FIG. 23 records and writes on a machine-readable recording medium such as memory, disk, tape, CD, or DVD, achieving behavior and effects similar to those of the present embodiment.

Embodiment 7

While the above Embodiment 1 describes noise suppression processing for cases where, in a scalable coding/decoding method that has the same sampling frequency for signals handled on each layer, the number of layers (transmission bit rate) during signal decoding fluctuates, the present invention is not limited thereto and can also be similarly applied to a scalable coding/decoding method that has a different sampling frequency for signals handled on each layer (i.e., frequency scalable coding/decoding method).

Embodiment 7 of the present invention describes noise suppression processing for cases where, in a frequency scalable coding/decoding method, the number of layers (transmission bit rate) fluctuates during signal decoding.

The configuration of the overall system of the present embodiment is the same as that of FIG. 20 of Embodiment 6, and the behavior of signal coding apparatus 2001 signal is the same as that of Embodiment 6.

Figure 24:
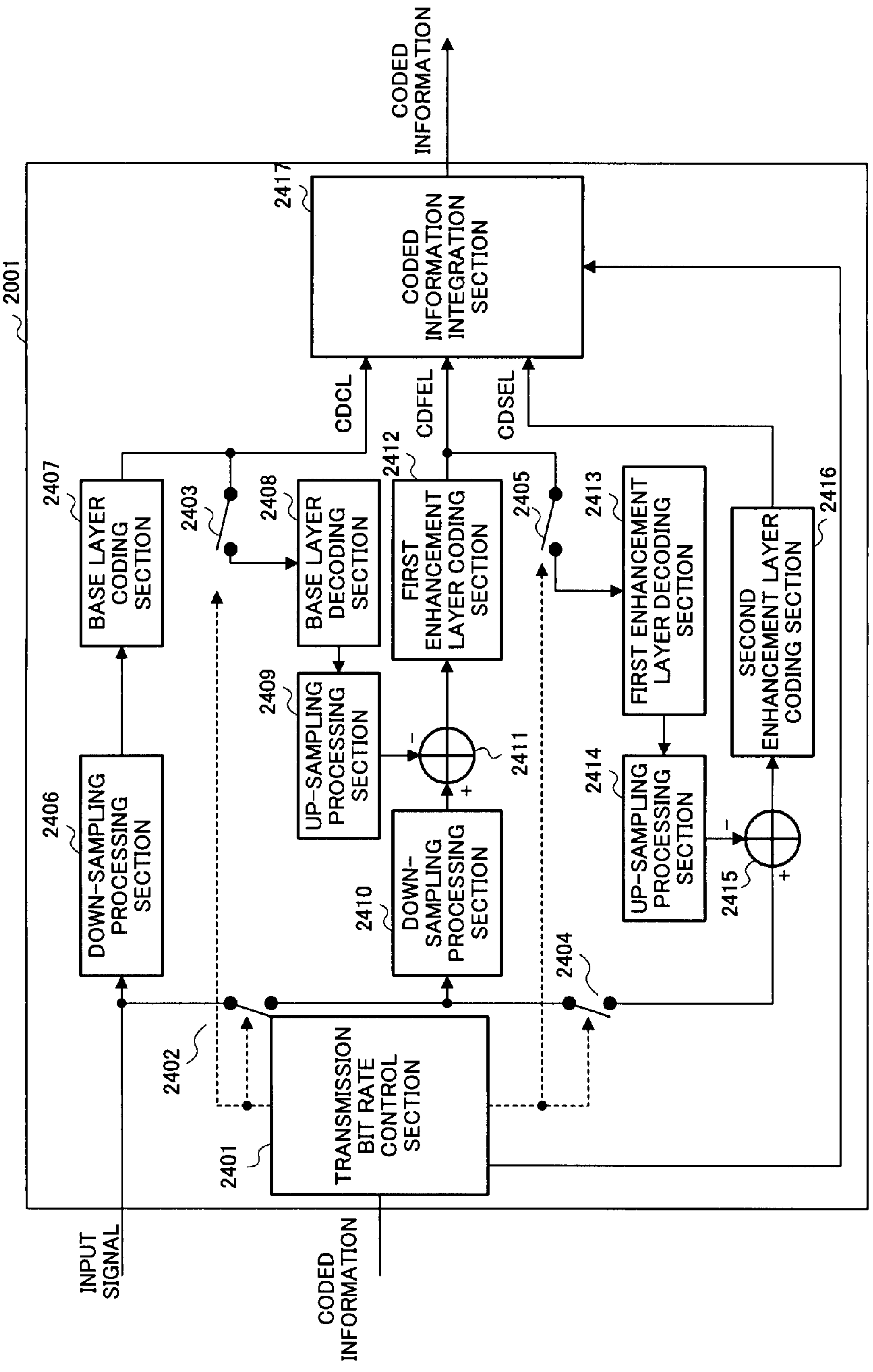
FIG. 24 is a block diagram showing the internal configuration of the signal coding apparatus according to Embodiment 7 of the present invention.

FIG. 24 is a block diagram showing the configuration of signal coding apparatus 2001 according to the present embodiment. Signal coding apparatus 2001 separates the input signals every N samples (where N is a natural number) and, given N samples in a single frame, codes the input signals on a frame-by-frame basis.

Signal coding apparatus 2001 mainly comprises transmission bit rate control section 2401, control switches 2402 to 2405, down-sampling processing sections 2406 and 2410, base layer coding section 2407, base layer decoding section 2408, up-sampling processing sections 2409 and 2414, addition sections 2411 and 2415, first enhancement layer coding section 2412, first enhancement layer decoding section 2413, second enhancement layer coding section 2416, and coded information integration section 2417.

Send mode information is input to transmission bit rate control section 2401. Here, the send mode information indicates the transmission bit rate when input signals are coded and transmitted; one transmission bit rate is selected from two or more predetermined transmission bit rates as the send mode information. Furthermore, in the present embodiment, the send mode information may assume the values of the predetermined four transmission bit rates bitrate0, bitrate1, bitrate2, and bitrate3 (where bitrate3<bitrate2<bitrate1). Note, however, that bitrate0 refers to cases where an input signal is not input to coding apparatus 2001. In addition, in the present embodiment, the send mode information for the next frame (hereinafter $Mode_{next}$) is simultaneously input in addition to the send mode information for the current frame (hereinafter $Mode_{cur}$).

Transmission bit rate control section 2401 controls the ON/OFF settings of control switches 2402 to 2405 in accordance with the send mode information $Mode_{cur}$ for the input current frame. Specifically, when the send mode information $Mode_{cur}$ is bitrate1, transmission bit rate control section 2401 sets all control switches 2402 to 2405 to ON. When the send mode information $Mode_{cur}$ is bitrate2, transmission bit rate control section 2401 sets control switches 2402 and 2403 to ON, and sets control switches 2404 and 2405 to OFF. When the send mode information $Mode_{cur}$ is bitrate3, transmission bit rate control section 2401 sets all control switches 2402 to 2405 to OFF. In addition, transmission bit rate control section 2401 outputs the send mode information $Mode_{cur}$ and $Mode_{next}$ to coded information integration section 2417. In this manner, transmission bit rate control section 2401 controls the ON/OFF settings of the control switches in accordance with the send mode information $Mode_{cur}$, thereby determining the combinations of coding sections used for input signal coding.

The input signal is input to control switch 2402 and down-sampling processing section 2406. The following refers to the sampling frequency of the input signal as the “input signal frequency”.

Down-sampling processing section 2406 decreases the sampling of and outputs the input signal to base layer coding section 2407. The following refers to the sampling frequency after the decrease of down-sampling processing section 2406 as the “base layer sampling frequency”.

Base layer coding section 2407 codes the output signal of down-sampling processing section 2406 using a CELP type speech coding method, and outputs the coded information obtained from coding (hereinafter “base layer information source code”) to coded information integration section 2417 and control switch 2403.

When control switch 2403 is ON, base layer decoding section 2408 decodes the base layer information source code output from base layer coding section 2407 using a CELP type speech decoding method, and outputs the decoded signal obtained from decoding (hereinafter "base layer, decoded signal") to up-sampling processing section 2409. When control switch 2403 is OFF, base layer decoding section 2408 does not perform any operation.

When control switch 2403 is ON, up-sampling processing section 2409 increases the sampling of the base layer decoded signal output from base layer decoding section 2408 to the first enhancement layer frequency, and outputs the signal after the increase to addition section 2411. When control switch 2403 is OFF, up-sampling processing section 2409 does not perform any operation.

When control switches 2402 and 2403 are ON, down-sampling processing section 2410 decreases the sampling frequency of the input signal output via control switch 2402, and outputs the signal after decrease to addition section 2411. The following refers to the sampling frequency after the decrease of down-sampling processing section 2410 as the "first enhancement layer sampling frequency". When control switches 2402 and 2403 are OFF, down-sampling processing section 2410 does not perform any operation.

When control switches 2402 and 2403 are ON, addition section 2411 adds the signal that inverted the polarity of the output signal of up-sampling processing section 2409 to the signal output from down-sampling processing section 2410, and outputs the first differential signal which is the addition result to first enhancement layer coding section 2412. When control switches 2402 and 2403 are OFF, addition section 2411 does not perform any operation.

When control switches 2402 and 2403 are ON, first enhancement layer coding section 2412 codes the output signal of addition section 2411 using a CELP type speech coding method, and outputs the coded information obtained from coding (hereinafter "first enhancement layer information source code") to control switch 2405 and coded information integration section 2417. When control switches 2402 and 2403 are OFF, first enhancement layer coding section 2412 does not perform any operation.

When control switch 2405 is ON, first enhancement layer decoding section 2413 decodes the first enhancement layer information source code output from first enhancement layer coding section 2412 using a CELP type speech decoding method, and outputs the decoded signal obtained from decoding (hereinafter "first enhancement layer decoded signal") to up-sampling processing section 2414. When control switch 2405 is OFF, first enhancement layer decoding section 2413 does not perform any operation.

When control switch 2405 is ON, up-sampling processing section 2414 increases the sampling of the first enhancement layer decoded signal output from first enhancement layer decoding section 2413 to the input sampling frequency, and outputs the signal after the increase to addition section 2415. When control switch 2405 is OFF, up-sampling processing section 2414 does not perform any operation.

When control switches 2404 and 2405 are ON, addition section 2415 adds the signal that inverted the polarity of the output signal of up-sampling processing section 2414 to the input signal, and outputs the second differential signal which is the addition result to second enhancement layer coding section 2416. When control switches 2405 and 2405 are OFF, addition section 2415 does not perform any operation.

When control switches 2404 and 2405 are ON, second enhancement layer coding section 2416 codes the second differential signal output from addition section 2415 using a CELP type speech coding method, and outputs the coded information obtained from coding (hereinafter "second enhancement layer information source code") to coded information integration section 2417. When control switches 2404 and 2405 are OFF, second enhancement layer coding section 2416 does not perform any operation.

Coded information integration section 2417 integrates the information source code output from base layer coding section 2407, first enhancement layer coding section 2412, and second enhancement layer coding section 2416 with the send mode information $\text{Mode}_{cur}$ and $\text{Mode}_{next}$ output from transmission bit rate control section 2401, and outputs the result as coded information to transmission path 2002.

The internal configurations of base layer coding section 2407, base layer decoding section 2408, first enhancement layer coding section 2412, first enhancement layer decoding section 2413, and second enhancement layer coding section 2416 are the same as the above, and the detailed descriptions thereof will be omitted.

In addition, the data structure (bit stream) of the coded information output from signal coding apparatus 2001 is the same as that shown in FIG. 22, and a detailed description thereof will be omitted.

This concludes the description of the configuration of signal coding apparatus 2001 of FIG. 20 of the present embodiment.

Figure 25:
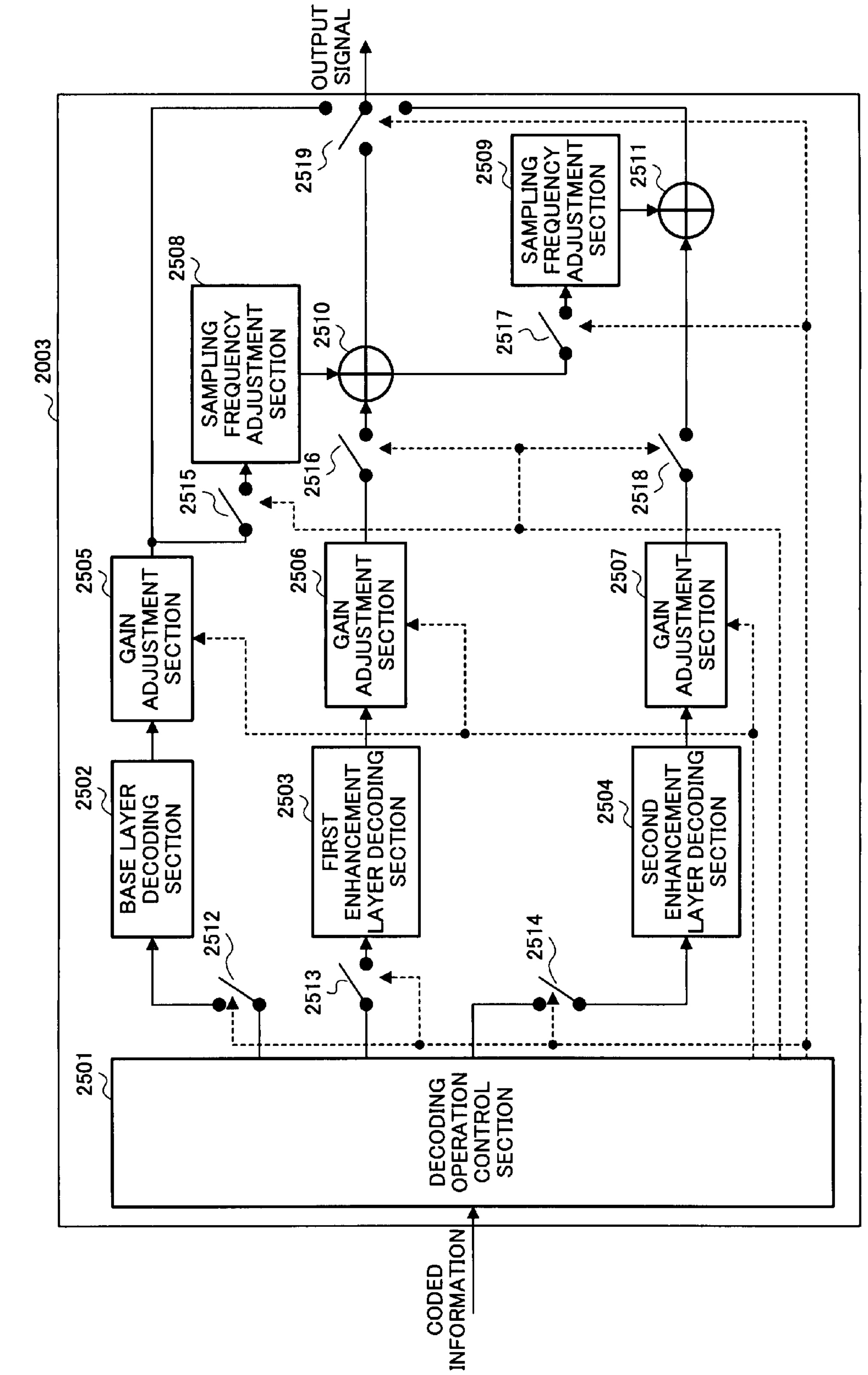
FIG. 25 is a block diagram showing the internal configuration of the signal decoding apparatus according to Embodiment 7 of the present invention.

Next, the configuration of signal decoding apparatus 2003 of FIG. 20 will be described using FIG. 25.

Signal decoding apparatus 2003 mainly comprises decoding operation control section 2501, base layer decoding section 2502, first enhancement layer decoding section 2503, second enhancement layer decoding section 2504, gain adjustment sections 2505 to 2507, sampling frequency adjustment sections 2508 and 2509, addition sections 2510 and 2511, and control switches 2512 to 2519.

Coded information is input to decoding operation control section 2501.

Decoding operation control section 2501 has an internal memory for storing the send mode information for the previous frame (initial value: bitrate0; hereinafter $\text{Mode}_{pre}$), separates the input coded information into send mode information $\text{Mode}_{cur}$ and $\text{Mode}_{next}$ and the information source code of each layer, controls gain adjustment sections 2505 to 2507 and control switches 2512 to 2519 in accordance with the send mode information $\text{Mode}_{pre}$, $\text{Mode}_{cur}$, and $\text{Mode}_{next}$, and outputs the information source code of each layer to base layer decoding section 2502, first enhancement layer decoding section 2503, and second enhancement layer decoding section 2504.

Next, the operation of decoding operation control section 2501 corresponding to the send mode information $\text{Mode}_{pre}$, $\text{Mode}_{cur}$, and $\text{Mode}_{next}$ will be described in detail.

(Pattern 1)

When the send mode information $\text{Mode}_{pre}$, $\text{Mode}_{cur}$, and $\text{Mode}_{next}$ satisfy the following equation (12), decoding operation control section 2501 uses the values of $\text{Mode}_{pre}$ and $\text{Mode}_{next}$ for the current frame, and performs fade-out processing with the transmission bit rate indicated by $\text{Mode}_{pre}$ as the upper limit and the transmission bit rate indicated by $\text{Mode}_{next}$ as the lower limit.

[Equation 12]

$$\begin{cases} \text{Mode}_{cur} > \text{Mode}_{next} \\ \text{Mode}_{cur} > \text{Mode}_{pre} \\ \text{Mode}_{pre} > \text{Mode}_{next} \end{cases} \quad \text{Equation (12)}$$

At this time, decoding operation control section 2501 controls control switches 2512 to 2519 in accordance with the transmission bit rate indicated by $Mode_{pre}$. Specifically, when $Mode_{pre}$ is bitrate2, decoding operation control section 2501 sets control switches 2512, 2513, 2515, and 2516 to ON, sets control switches 2514, 2517, and 2518 to OFF, sets control switch 2519 to ON on the addition section 2510 side, outputs the base layer information source code to base layer decoding section 2502, and outputs the first enhancement layer information source code to first enhancement layer decoding section 2503. When $Mode_{pre}$ is bitrate3, decoding operation control section 2501 sets control switch 2512 to ON, sets control switches 2513 to 2518 to OFF, sets control switch 2519 to ON on the gain adjustment section 2505 side, and outputs the base layer information source code to base layer decoding section 2502.

In addition, at this time, decoding operation control section 2501 controls gain adjustment sections 2505 to 2507 in accordance with the transmission bit rates indicated by $Mode_{pre}$ and $Mode_{next}$. Specifically, when $Mode_{pre}$ is bitrate2 and $Mode_{next}$ is bitrate3, decoding operation control section 2501 sets gain adjustment section 2506 to fade-out, and sets gain adjustment sections 2505 and 2507 to OFF. When $Mode_{pre}$ is bitrate2 and $Mode_{next}$ is bitrate0, decoding operation control section 2501 sets gain adjustment sections 2505 and 2506 to fade-out, and sets gain adjustment section 2507 to OFF. When $Mode_{pre}$ is bitrate3 and $Mode_{next}$ is bitrate0, decoding operation control section 2501 sets gain adjustment section 2505 to fade-out, and sets gain adjustment sections 2506 and 2507 to OFF.

(Pattern 2)

When the send mode information $Mode_{pre}$, $Mode_{cur}$, and $Mode_{next}$ satisfy the following equation (13), decoding operation control section 2501 normally decodes the current frame using the transmission bit rate indicated by $Mode_{pre}$ (=$Mode_{next}$).

[Equation 13]

$$\begin{cases} Mode_{cur} > Mode_{next} \\ Mode_{cur} > Mode_{pre} \\ Mode_{pre} = Mode_{next} \end{cases} \tag{13}$$

At this time, decoding operation control section 2501 controls control switches 2512 to 2519 in accordance with the transmission bit rate indicated by $Mode_{pre}$. Specifically, when $Mode_{pre}$ is bitrate2, decoding operation control section 2501 sets control switches 2512, 2513, 2515, and 2516 to ON, sets control switches 2514, 2517, and 2518 to OFF, sets control switch 2519 to ON on the addition section 2510 side, outputs the base layer information source code to base layer decoding section 2502, and outputs the first enhancement layer information source code to first enhancement layer decoding section 2503. When $Mode_{pre}$ is bitrate3, decoding operation control section 2501 sets control switch 2512 to ON, sets control switches 2512 to 2518 to OFF, sets control switch 2519 to ON on the gain adjustment section 2505 side, and outputs the base layer information source code to base layer decoding section 2502.

In addition, at this time, decoding operation control section 2501 sets all gain adjustment sections 2505 to 2507 to OFF.

(Pattern 3)

When the send mode information $Mode_{pre}$, $Mode_{cur}$, and $Mode_{next}$ satisfy the following equation (14), decoding operation control section 2501 uses the values of $Mode_{pre}$ and $Mode_{next}$ for the current frame, and performs fade-in processing with the transmission bit rate indicated by $Mode_{pre}$ as the lower limit and the transmission bit rate indicated by $Mode_{next}$ as the upper limit.

[Equation 14]

$$\begin{cases} Mode_{cur} > Mode_{next} \\ Mode_{cur} > Mode_{pre} \\ Mode_{pre} < Mode_{next} \end{cases} \tag{14}$$

At this time, decoding operation control section 2501 controls control switches 2512 to 2519 in accordance with the transmission bit rate indicated by $Mode_{next}$. Specifically, when $Mode_{next}$ is bitrate2, decoding operation control section 2501 sets control switches 2512, 2513, 2515, and 2516 to ON, sets control switches 2514, 2517, and 2518 to OFF, sets control switch 2519 to ON on the addition section 2510 side, outputs the base layer information source code to base layer decoding section 2502, and outputs the first enhancement layer information source code to first enhancement layer decoding section 2503. When $Mode_{next}$ is bitrate3, decoding operation control section 2512 sets control switch 2512 to ON, sets control switches 2513 to 2518 to OFF, sets control switch 2519 to ON on the gain adjustment section 2505 side, and outputs the base layer information source code to base layer decoding section 2502.

In addition, at this time, decoding operation control section 2501 controls gain adjustment sections 2505 to 2507 in accordance with the transmission bit rates indicated by $Mode_{pre}$ and $Mode_{next}$. Specifically, when $Mode_{pre}$ is bitrate3 and $Mode_{next}$ is bitrate2, decoding operation control section 2501 sets gain adjustment section 2506 to fade-in, and sets gain adjustment sections 2505 and 2507 to OFF. When $Mode_{pre}$ is bitrate0 and $Mode_{next}$ is bitrate2, decoding operation control section 2501 sets gain adjustment sections 2505 and 2506 to fade-in, and sets gain adjustment section 2507 to OFF. When $Mode_{pre}$ is bitrate0 and $Mode_{next}$ is bitrate3, decoding operation control section 2501 sets gain adjustment section 2505 to fade-in, and sets gain adjustment sections 2506 and 2507 to OFF.

(Pattern 4)

When the send mode information $Mode_{pre}$, $Mode_{cur}$, and $Mode_{next}$ satisfy the following equation (15), decoding operation control section 2501 uses the values of $Mode_{cur}$ and $Mode_{next}$ for the current frame, and performs fade-out processing with the transmission bit rate indicated by $Mode_{cur}$ as the upper limit and the transmission bit rate indicated by $Mode_{next}$ as the lower limit.

[Equation 15]

$$\begin{cases} Mode_{cur} > Mode_{next} \\ Mode_{cur} \le Mode_{pre} \end{cases} \tag{15}$$

At this time, decoding operation control section 2501 controls control switches 2512 to 2519 in accordance with the transmission bit rate indicated by $Mode_{cur}$. Specifically, when $Mode_{cur}$ is bitrate1, decoding operation control section 2501 sets all control switches 2512 to 2518 to ON, sets control switch 2519 to ON on the addition section 2511 side, outputs the base layer information source code to base layer decoding section 2502, outputs the first enhancement layer information source code to first enhancement layer decoding section 2503, and outputs the second enhancement layer information source code to second enhancement layer decoding section 2504. When $Mode_{cur}$ is bitrate2, decoding operation control section 2512 sets control switches 2512, 2513, 2515, and 2516 to ON, sets control switches 2514, 2517, and 2518 to OFF, sets control switch 2519 to ON on the addition section 2510 side, outputs the base layer information source code to base layer decoding section 2502, and outputs the first enhancement layer information source code to first enhancement layer decoding section 2503. When $Mode_{cur}$ is bitrate3, decoding operation control section 2501 sets control switch 2512 to ON, sets control switches 2513 to 2518 to OFF, sets control switch 2519 to ON on the gain adjustment section 2505 side, and outputs the base layer information source code to base layer decoding section 2502.

In addition, at this time, decoding operation control section 2501 controls gain adjustment sections 2505 to 2507 in accordance with the transmission bit rates indicated by $Mode_{cur}$ and $Mode_{next}$. Specifically, when $Mode_{cur}$ is bitrate1 and $Mode_{next}$ is bitrate2, decoding operation control section 2501 sets gain adjustment section 2507 to fade-out, and sets gain adjustment sections 2505 and 2506 to OFF. When $Mode_{cur}$ is bitrate1 and $Mode_{next}$ is bitrate3, decoding operation control section 2501 sets gain adjustment sections 2506 and 2507 to fade-out, and sets gain adjustment section 2505 to OFF. When $Mode_{cur}$ is bitrate1 and $Mode_{next}$ is bitrate0, decoding operation control section 2501 sets all gain adjustment sections 2505 to 2507 to fade-out. When $Mode_{cur}$ is bitrate2 and $Mode_{next}$ is bitrate3, decoding operation control section 2501 sets gain adjustment section 2506 to fade-out, and sets gain adjustment sections 2505 and 2507 to OFF. When $Mode_{cur}$ is bitrate2 and $Mode_{next}$ is bitrate0, decoding operation control section 2501 sets gain adjustment sections 2505 and 2506 to fade-out, and sets gain adjustment section 2507 to OFF. When $Mode_{cur}$ is bitrate3 and $Mode_{next}$ is bitrate0, decoding operation control section 2501 sets gain adjustment section 2505 to fade-out, and sets gain adjustment sections 2506 and 2507 to OFF.

(Pattern 5)

When the send mode information $Mode_{pre}$, $Mode_{cur}$, and $Mode_{next}$ satisfy the following equation (16), decoding operation control section 2501 uses the values of $Mode_{pre}$ and $Mode_{cur}$ for the current frame, and performs fade-in processing with the transmission bit rate indicated by $Mode_{pre}$ as the lower limit and the transmission bit rate indicated by $Mode_{cur}$ as the upper limit.

[Equation 16]

$$\begin{cases} Mode_{cur} \leq Mode_{next} \\ Mode_{cur} > Mode_{pre} \end{cases} \quad (16)$$

At this time, decoding operation control section 2501 controls control switches 2512 to 2519 in accordance with the transmission bit rate indicated by $Mode_{cur}$. Specifically, when $Mode_{cur}$ is bitrate1, decoding operation control section 2501 sets all control switches 2512 to 2518 to ON, sets control switch 2519 to ON on the addition section 2511 side, outputs the base layer information source code to base layer decoding section 2502, outputs the first enhancement layer information source code to first enhancement layer decoding section 2503, and outputs the second enhancement layer information source code to second enhancement layer decoding section 2504. When $Mode_{cur}$ is bitrate2, decoding operation control section 2501 sets control switches 2512, 2513, 2515, and 2516 to ON, sets control switches 2514, 2517, and 2518 to OFF, sets control switch 2519 to ON on the addition section 2510 side, outputs the base layer information source code to base layer decoding section 2502, and outputs the first enhancement layer information source code to first enhancement layer decoding section 2503. When $Mode_{cur}$ is bitrate3, decoding operation control section 2501 sets control switch 2512 to ON, sets control switches 2513 to 2518 to OFF, sets control switch 2519 to ON on the gain adjustment section 2505 side, and outputs the base layer information source code to base layer decoding section 2502.

In addition, at this time, decoding operation control section 2501 controls gain adjustment sections 2505 to 2507 in accordance with the transmission bit rates indicated by $Mode_{pre}$ and $Mode_{cur}$. Specifically, when $Mode_{pre}$ is bitrate2 and $Mode_{cur}$ is bitrate1, decoding operation control section 2501 sets gain adjustment section 2507 to fade-in, and sets gain adjustment sections 2505 and 2506 to OFF. When $Mode_{pre}$ is bitrate3 and $Mode_{cur}$ is bitrate1, decoding operation control section 2501 sets gain adjustment sections 2506 and 2507 to fade-in, and sets gain adjustment section 2505 to OFF. When $Mode_{pre}$ is bitrate0 and $Mode_{cur}$ is bitrate1, decoding operation control section 2501 sets all gain adjustment sections 2505 and 2507 to fade-in. When $Mode_{pre}$ is bitrate3 and $Mode_{cur}$ is bitrate2, decoding operation control section 2501 sets gain adjustment section 2506 to fade-in, and sets gain adjustment sections 2505 and 2507 to OFF. When $Mode_{pre}$ is bitrate0 and $Mode_{cur}$ is bitrate2, decoding operation control section 2501 sets gain adjustment sections 2505 and 2506 to fade-in, and sets gain adjustment section 2507 to OFF. When $Mode_{pre}$ is bitrate0 and $Mode_{cur}$ is bitrate3, decoding operation control section 2501 sets gain adjustment section 2505 to fade-in, and sets gain adjustment sections 2506 and 2507 to OFF.

(Pattern 6)

When the send mode information $Mode_{pre}$, $Mode_{cur}$, and $Mode_{next}$ do not satisfy any of the equations (12) to (16) of patterns 1 to 5, decoding operation control section 2501 normally decodes the current frame using the transmission bit rate indicated by $Mode_{cur}$.

At this time, decoding operation control section 2501 controls control switches 2512 to 2319 in accordance with the transmission bit rate indicated by $Mode_{cur}$. Specifically, when $Mode_{cur}$ is bitrate1, decoding operation control section 2501 sets all control switches 2512 to 2518 to ON, sets control switch 2519 to ON on the addition section 2511 side, outputs the base layer information source code to base layer decoding section 2502, outputs the first enhancement layer information source code to first enhancement layer decoding section 2503, and outputs the second enhancement layer information source code to second enhancement layer decoding section 2504. When $Mode_{cur}$ is bitrate2, decoding operation control section 2501 sets control switches 2512, 2513, 2515, and 2516 to ON, sets control switches 2514, 2517, and 2518 to OFF, sets control switch 2519 to ON on the addition section 2510 side, outputs the base layer information source code to base layer decoding section 2502, and outputs the first enhancement layer information source code to first enhancement layer decoding section 2503. When $Mode_{cur}$ is bitrate3, decoding operation control section 2501 sets control switch 2512 to ON, sets control switches 2513 to 2518 to OFF, sets control switch 2519 to ON on the gain adjustment section 2505 side, and outputs the base layer information source code to base layer decoding section 2502.

In addition, at this time, decoding operation control section 2501 sets all gain adjustment sections 2505 to 2507 to OFF.

The above describes the method for controlling control switches 2512 to 2519 and gain adjustment sections 2505 to 2507 and the method for determining the information source code output to the decoding section of each layer, based on decoding operation control section 2501.

Next, decoding operation control section 2501 assigns the send mode information $Mode_{cur}$ for the current frame in the memory that stores the send mode information $Mode_{pre}$ for the previous frame, thereby updating the value.

When control switch 2512 is ON, base layer decoding section 2502 decodes the base layer information source code output from decoding operation control section 2501, and outputs the result as the base layer decoded signal to gain adjustment section 2505. When control switch 2512 is OFF, base layer decoding section 2502 does not perform any operation.

When control switch 2513 is ON, first enhancement layer decoding section 2503 decodes the first enhancement layer information source code output from decoding operation control section 2501, and outputs the result as the first enhancement layer decoded signal to gain adjustment section 2506. When control switch 2513 is OFF, second enhancement layer decoding section 2503 does not perform any operation.

When control switch 2514 is ON, second enhancement layer decoding section 2504 decodes the first enhancement layer information source code output from decoding operation control section 2501, and outputs the result as the first enhancement layer decoded signal to gain adjustment section 2507. When control switch 2514 is OFF, second enhancement layer decoding section 2504 does not perform any operation.

In addition, the internal configurations of base layer decoding section 2502, first enhancement layer decoding section 2503, and second enhancement layer decoding section 2504 are the same as that described above, and detailed descriptions thereof will be omitted.

The base layer decoded signal is input from base layer decoding section 2502 to gain adjustment section 2505. In addition, the fade-out, fade-in, and OFF statuses of gain adjustment section 2505 are controlled by decoding operation control section 2501.

When controlled in an OFF state by decoding operation control section 2501, gain adjustment section 2505 outputs the base layer decoded signal obtained from base layer decoding section 2502 as is to control switches 2515 and 2519. When controlled in a fade-out state by decoding operation control section 2501, gain adjustment section 2505 performs attenuation processing against the base layer decoded signal obtained from base layer decoding section 2502 in accordance with the following equation (17), and outputs the obtained signal to control switches 2515 and 2519.

[Equation 17]

$$Xbase'_i = \frac{(N_s - 1 - i)}{N_s - 1} \cdot Xbase_i \quad (i = 0, \ldots, N_s - 1) \tag{17}$$

Here, $N_s$ is a value determined by N samples of a single frame, $Xbase_i$ is the base layer decoded signal, and $Xbase'_i$ is the decoded signal after attenuation.

When controlled in a fade-in state by decoding operation control section 2501, gain adjustment section 2505 amplifies the base layer decoded signal obtained from base layer decoding section 2502 in accordance with the following equation (18), and outputs the obtained signal to control switches 2515 and 2519.

[Equation 18]

$$Xbase''_i = \frac{i}{N_s - 1} \cdot Xbase_i \quad (i = 0, \ldots, N_s - 1) \tag{18}$$

Here, similar to the above equation (17), $N_s$ is a value determined by N samples of a single frame, $Xbase_i$ is the base layer decoded signal, and $Xbase''_i$ is the decoded signal after amplification.

Gain adjustment section 2506 has the same configuration as that of gain adjustment section 2505 except the input signal in gain adjustment section 2515 is replaced with the first enhancement layer decoded signal and control switches 2515 and 2519 are replaced with control switch 2516, and a detailed description thereof will be omitted. In addition, gain adjustment section 2507 has the same configuration as that of gain adjustment section 2505 except the input signal in gain adjustment section 2515 is replaced with the second enhancement layer decoded signal and control switches 2515 and 2519 are replaced with control switch 2518, and a detailed description thereof will be omitted.

When control switch 2515 is ON, sampling frequency adjustment section 2508 increases the sampling of the base layer decoded signal output from gain adjustment section 2505 to the first enhancement layer sampling frequency, and outputs the signal after the increase to addition section 2510. When control switch 2515 is OFF, sampling frequency adjustment section 2508 does not perform any operation.

When control switches 2515 and 2516 are ON, addition section 2510 adds the first enhancement layer decoded signal output from gain adjustment section 2506 to the signal output from sampling frequency adjustment section 2508, and outputs the result to control switches 2517 and 2519. When control switches 2515 and 2516 are OFF, addition section 2510 does not perform any operation.

When control switch 2517 is ON, sampling frequency adjustment section 2509 increases the sampling of the signal output from addition signal 2510 to the input sampling frequency, and outputs the signal after the increase to addition section 2511. When control switch 2517 is OFF, sampling frequency adjustment section 2509 does not perform any operation.

When control switches 2517 and 2518 are ON, addition section 2511 adds the second enhancement layer decoded signal output from gain adjustment section 2507 to the signal output from sampling frequency adjustment section 2509, and outputs the result to control switch 2519. When control switches 2517 and 2518 are OFF, addition section 2511 does not perform any operation.

This concludes the description of the configuration of signal decoding apparatus 2002 of FIG. 20 of the present embodiment.

In this manner, according to the present embodiment, noise that occurs as a result of a decrease or increase in the number of layers used during decoding can be suppressed even for a scalable coding/decoding method where the sampling frequency of the signal handled by each layer is different (i.e., a frequency scalable coding/decoding method).

Furthermore, the present embodiment describes the case where noise that occurs when the number of layers (transmission bit rate) changes in a signal decoding apparatus is suppressed by detecting the switching of the transmission mode between consecutive frames and including this information in the coded information in the signal coding apparatus. The present invention, however, is not limited thereto and can also be similarly applied to cases where the noise that occurs when the number of layers (transmission bit rate) changes in a signal decoding apparatus is suppressed by performing processing similar to the processing of a signal coding apparatus under conditions where the transmission bit rate is switched in a signal relay apparatus that exists in the transmission path.

Embodiment 8

In the above Embodiment 6 and Embodiment 7, send mode information for the current frame and send mode information for the next frame are required as information input to signal coding apparatus 2001. Note, however, that in cases where the send mode information of the next frame cannot be input in advance in the system, unpredictable switching of the transmission bit rate due to transmission errors, etc, is also quite conceivable.

The present invention can also be similarly applied to cases where the send mode information for the next frame cannot be obtained in a signal coding apparatus or a signal relay apparatus that exists in the transmission path. Thus, Embodiment 8 of the present invention describes the case where the noise that occurs when the number of layers (transmission bit rate) changes during signal decoding is suppressed under conditions such as the above.

The configuration of the overall system of the present embodiment is the same as that of FIG. 20 of Embodiment 6, and the behavior of signal coding apparatus 2001 is the same as that of Embodiment 6.

The configuration of signal coding apparatus 2001 of FIG. 20 is the same as that of the signal coding apparatus of Embodiment 6, and a detailed description will be omitted. Note, however, that the send mode information input to signal coding apparatus 2001 refers to the send mode information $Mode_{cur}$ for the current frame only.

In addition, the data structure of the coded information output from signal coding apparatus 2001 to transmission path 2002 in the present embodiment is shown in FIG. 26.

Figure 26A:
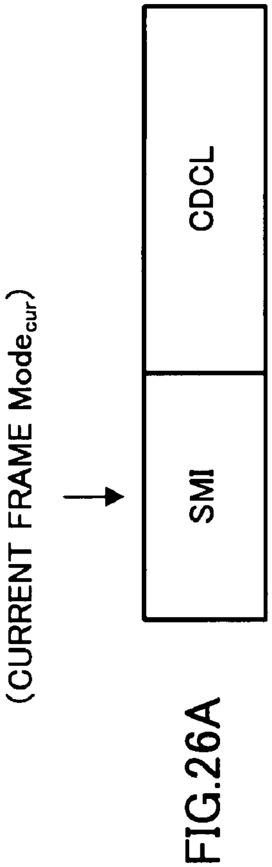
FIG. 26 is a block diagram showing the structure of the data transmitted from the signal coding apparatus according to Embodiment 8 of the present invention.

When the send mode information $Mode_{cur}$ is bitrate3, the coded information comprises the send mode information $Mode_{cur}$ and the base layer information source code, as shown in FIG. 26A.

Figure 26B:
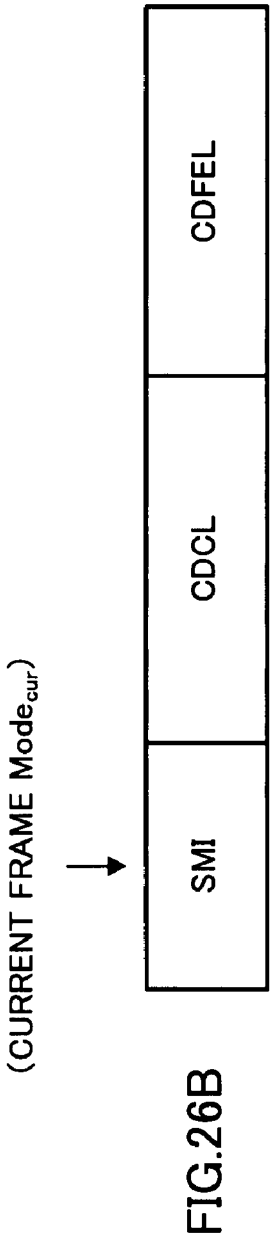

When the send mode information $Mode_{cur}$ is bitrate2, the coded information comprises the send mode information $Mode_{cur}$, the base layer information source code, and the first enhancement layer information source code as shown in FIG. 26B.

Figure 26C:
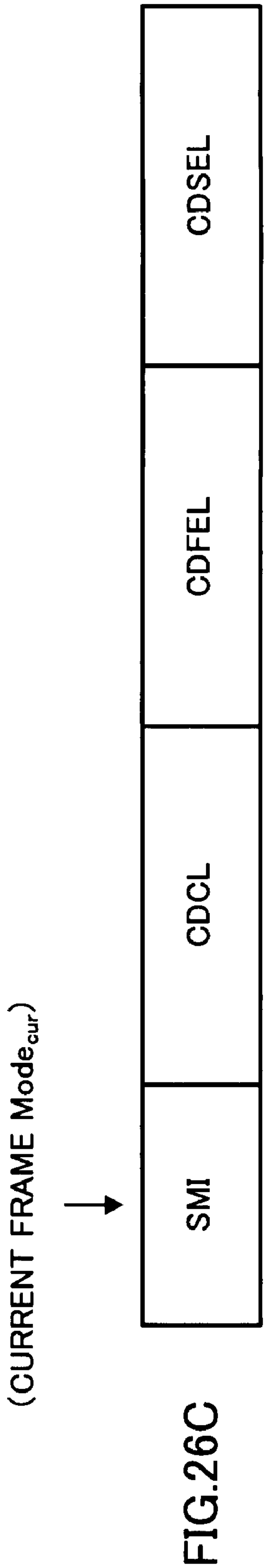

When the send mode information $Mode_{cur}$ is bitrate1, the coded information comprises the send mode information $Mode_{cur}$, the base layer information source code, the first enhancement layer information source code, and the second enhancement layer information source code as shown in FIG. 26C.

Figure 27:
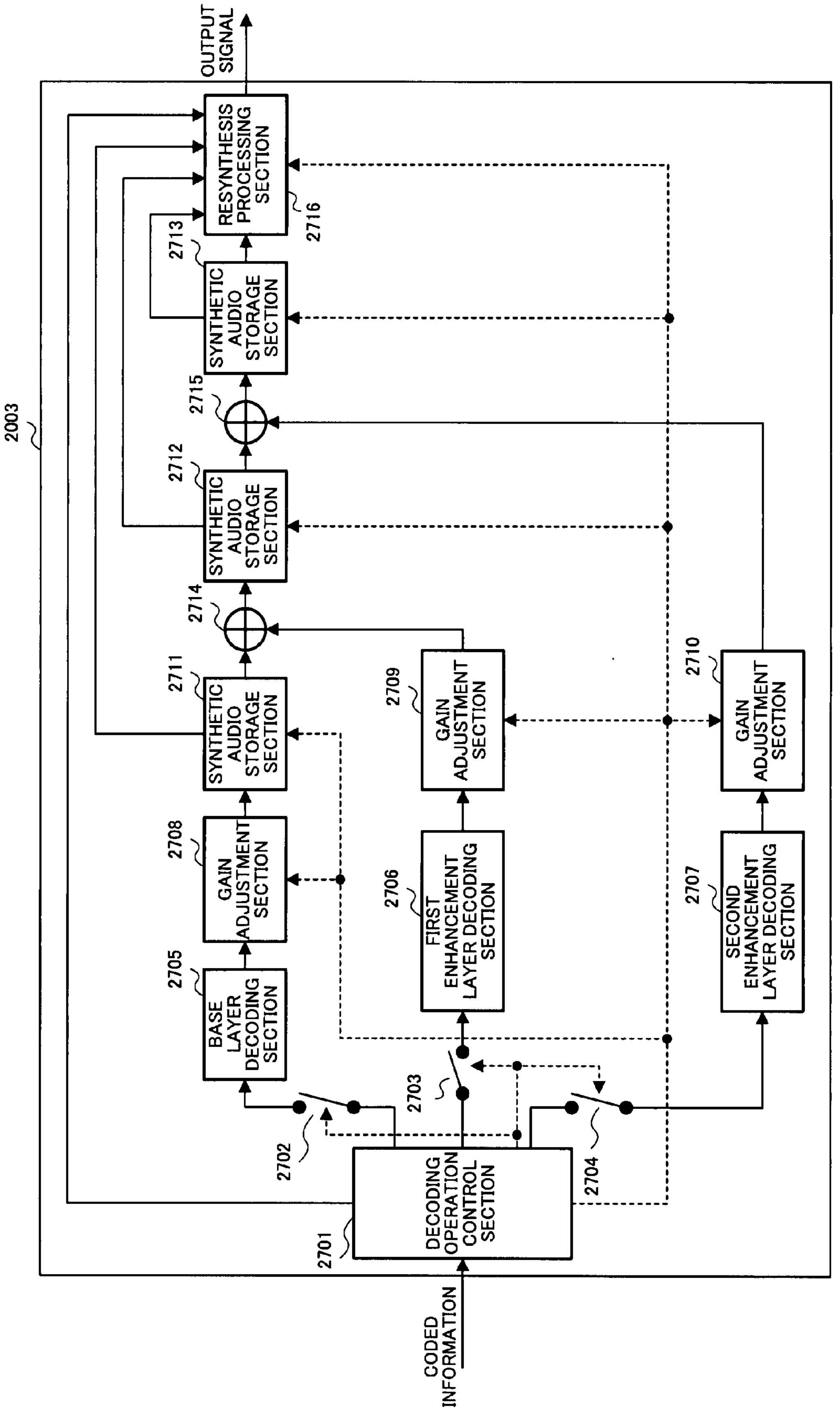
FIG. 27 is a block diagram showing the internal configuration of the signal decoding apparatus according to Embodiment 8 of the present invention.

Next, the configuration of signal decoding apparatus 2003 of FIG. 20 will be described using the block diagram of FIG. 27.

Signal decoding apparatus 2003 mainly comprises decoding operation control section 2701, control switches 2702 to 2704, base layer decoding section 2705, first enhancement layer decoding section 2706, second enhancement layer decoding section 2707, gain adjustment sections 2708 to 2710, synthetic audio storage sections 2711 to 2713, addition sections 2714 and 2715, and resynthesis processing section 2716.

Coded information is input to decoding operation control section 2701.

Decoding operation control section 2701 has an internal memory for storing the send mode information for the previous frame (initial value: bitrate0; hereinafter $Mode_{pre}$), separates the input coded information into send mode information $Mode_{cur}$ and the information source code of each layer, controls gain adjustment sections 2708 to 2710, control switches 2702 to 2704, synthetic audio storage sections 2711 to 2713, and resynthesis processing section 2716 in accordance with the send mode information $Mode_{pre}$ and $Mode_{cur}$, and outputs the information source code of each layer to base layer decoding section 2705, first enhancement layer decoding section 2706, and second enhancement layer decoding section 2707.

Next, the operation of decoding operation control section 2701 corresponding to the send mode information $Mode_{pre}$ and $Mode_{cur}$ will be described in detail. Decoding operation control section 2701 controls/determines gain adjustment sections 2708 to 2710, control switches 2702 to 2704, synthetic audio storage sections 2711 to 2713, resynthesis processing section 2716, and the output information source code in accordance with the following rules.

(Pattern 1)

When the send mode information $Mode_{pre}$ and $Mode_{cur}$ satisfy the following equation (19), decoding operation control section 2701 uses the values of $Mode_{pre}$ and $Mode_{cur}$ for the current frame, and performs fade-in processing with the transmission bit rate indicated by $Mode_{pre}$ as the lower limit and the transmission bit rate indicated by $Mode_{cur}$ as the upper limit.

[Equation 19]

$$Mode_{cur} > Mode_{pre} \qquad (19)$$

At this time, decoding operation control section 2701 controls control switches 2702 to 2704 in accordance with the transmission bit rate indicated by $Mode_{cur}$. Specifically, when $Mode_{cur}$ is bitrate1, decoding operation control section 2701 sets all control switches 2702 to 2704 to ON, outputs the base layer information source code to base layer decoding section 2705, outputs the first enhancement layer information source code to first enhancement layer decoding section 2706, and outputs the second enhancement layer information source code to second enhancement layer decoding section 2707. When $Mode_{cur}$ is bitrate2, decoding operation control section 2701 sets control switches 2702 and 2703 to ON, sets control switch 2704 to OFF, outputs the base layer information source code to base layer decoding section 2705, and outputs the first enhancement layer information source code to first enhancement layer decoding section 2706. When $Mode_{cur}$ is bitrate3, decoding operation control section 2701 sets control switch 2702 to ON, sets control switches 2703 and 2704 to OFF, and outputs the base layer information source code to base layer decoding section 2705.

In addition, at this time, decoding operation control section 2701 controls gain adjustment sections 2708 to 2710 in accordance with the transmission bit rates indicated by $Mode_{pre}$ and $Mode_{cur}$. Specifically, when $Mode_{cur}$ is bitrate1 and $Mode_{pre}$ is bitrate2, decoding operation control section 2701 sets gain adjustment section 2710 to fade-in, and sets gain adjustment sections 2708 and 2709 to OFF. When $Mode_{cur}$ is bitrate1 and $Mode_{pre}$ is bitrate3, decoding operation control section 2701 sets gain adjustment sections 2709 and 2710 to fade-in, and sets gain adjustment section 2708 to OFF. When $Mode_{cur}$ is bitrate1 and $Mode_{pre}$ is bitrate0, decoding operation control section 2701 sets all gain adjustment sections 2708 to 2710 to fade-in. When $Mode_{cur}$ is bitrate2 and $Mode_{pre}$ is bitrate3, decoding operation control section 2701 sets gain adjustment section 2709 to fade-in, and sets gain adjustment sections 2708 and 2710 to OFF. When $Mode_{cur}$ is bitrate2 and $Mode_{pre}$ is bitrate0, decoding operation control section 2701 sets gain adjustment sections 2708 and 2709 to fade-in, and sets gain adjustment section 2710 to OFF. When $Mode_{cur}$ is bitrate3 and $Mode_{pre}$ is bitrate0, decoding operation control section 2701 sets gain adjustment section 2708 to fade-in, and sets gain adjustment sections 2709 and 2710 to OFF.

In addition, at this time, decoding operation control section 2701 sets all synthetic audio storage sections 2711 to 2713 and resynthesis processing section 2716 to OFF.

(Pattern 2)

When the send mode information $Mode_{pre}$ and $Mode_{cur}$ satisfy the following equation (20), decoding operation control section 2701 performs resynthesis processing against the current frame using the values of $Mode_{pre}$ and $Mode_{cur}$.

[Equation 20]

$$Mode_{cur} < Mode_{pre} \qquad (20)$$

At this time, decoding operation control section 2701 controls control switches 2702 to 2704 in accordance with the transmission bit rate indicated by $Mode_{cur}$. Specifically, when $Mode_{cur}$ is bitrate1, decoding operation control section 2701 sets all control switches 2702 to 2704 to ON, outputs the base layer information source code to base layer decoding section 2705, outputs the first enhancement layer information source code to first enhancement layer decoding section 2706, and outputs the second enhancement layer information source code to second enhancement layer decoding section 2707. When $Mode_{cur}$ is bitrate2, decoding operation control section 2701 sets control switches 2702 and 2703 to ON, sets control switch 2704 to OFF, outputs the base layer information source code to base layer decoding section 2705, and outputs the first enhancement layer information source code to first enhancement layer decoding section 2706. When $Mode_{cur}$ is bitrate3, decoding operation control section 2701 sets control switch 2702 to ON, sets control switches 2703 and 2704 to OFF, and outputs the base layer information source code to base layer decoding section 2705.

In addition, at this time, decoding operation control section 2701 sets all gain adjustment sections 2708 to 2710 to OFF.

In addition, at this time, decoding operation control section 2701 controls (the ON/OFF state of) synthetic audio storage sections 2711 to 2713 and (the first enhancement layer resynthesis state/base layer resynthesis state 1/base layer resynthesis state 2 of) resynthesis processing section 2716 in accordance with the transmission bit rates indicated by $Mode_{pre}$ and $Mode_{cur}$. Specifically, when $Mode_{cur}$ is bitrate2 and $Mode_{pre}$ is bitrate1, decoding operation control section 2701 sets synthetic audio storage sections 2712 and 2713 to ON, sets synthetic audio storage section 2711 to OFF, and sets resynthesis processing section 2716 to the first enhancement layer resynthesis state. When $Mode_{cur}$ is bitrate3 and $Mode_{pre}$ is bitrate1, decoding operation control section 2701 sets synthetic audio storage sections 2711 and 2713 to ON, sets synthetic audio storage section 2712 to OFF, and sets resynthesis processing section 2716 to the base layer resynthesis state 1. When $Mode_{cur}$ is bitrate3 and $Mode_{pre}$ is bitrate2, decoding operation control section 2701 sets synthetic audio storage sections 2711 and 2712 to ON, sets synthetic audio storage section 2713 to OFF, and sets resynthesis processing section 2716 to the base layer resynthesis state 2.

(Pattern 3)

When the send mode information $Mode_{pre}$ and $Mode_{cur}$ satisfy the following equation (21), decoding operation control section 2701 normally decodes the current frame using the value of $Mode_{cur}$.

[Equation 21]

$$Mode_{cur} = Mode_{pre} \qquad (21)$$

At this time, decoding operation control section 2701 controls control switches 2702 to 2704 in accordance with the transmission bit rate indicated by $Mode_{cur}$. Specifically, when $Mode_{cur}$ is bitrate1, decoding operation control section 2701 sets all control switches 2702 to 2704 to ON, outputs the base layer information source code to base layer decoding section 2705, outputs the first enhancement layer information source code to first enhancement layer decoding section 2706, and outputs the second enhancement layer information source code to second enhancement layer decoding section 2707. When $Mode_{cur}$ is bitrate2, decoding operation control section 2701 sets control switches 2702 and 2703 to ON, sets control switch 2704 to OFF, outputs the base layer information source code to base layer decoding section 2705, and outputs the first enhancement layer information source code to first enhancement layer decoding section 2706. When $Mode_{cur}$ is bitrate3, decoding operation control section 2701 sets control switch 2702 to ON, sets control switches 2703 and 2704 to OFF, and outputs the base layer information source code to base layer decoding section 2705.

In addition, at this time, decoding operation control section 2701 sets all gain adjustment sections 2708 to 2710 to OFF.

In addition, at this time, decoding operation control section 2701 sets all synthetic audio storage sections 2711 to 2713 and resynthesis processing section 2716 to OFF.

When control switch 2702 is ON, base layer decoding section 2705 decodes the base layer information source code output from decoding operation control section 2701, and outputs the result as the base layer decoded signal to gain adjustment section 2708. When control switch 2702 is OFF, base layer decoding section 2705 does not perform any operation.

When control switch 2703 is ON, first enhancement layer decoding section 2706 decodes the first enhancement layer information source code output from decoding operation control section 2701, and outputs the result as the first enhancement layer decoded signal to gain adjustment section 2709. When control switch 2703 is OFF, first enhancement layer decoding section 2706 does not perform any operation.

When control switch 2704 is ON, second enhancement layer decoding section 2707 decodes the first enhancement layer information source code output from decoding operation control section 2701, and outputs the result as the first enhancement layer decoded signal to gain adjustment section 2710. When control switch 2704 is OFF, second enhancement layer decoding section 2707 does not perform any operation.

In addition, the internal configurations of base layer decoding section 2705, first enhancement layer decoding section 2706, and second enhancement layer decoding section 2707 are the same as that described above, and detailed descriptions thereof will be omitted.

The base layer decoded signal is input from base layer decoding section 2705 to gain adjustment section 2708. In addition, the fade-in and OFF statuses of gain adjustment section 2708 are controlled by decoding operation control section 2701.

When controlled in an OFF state by decoding operation control section 2701, gain adjustment section 2708 outputs the base layer decoded signal obtained from base layer decoding section 2705 as is to synthetic audio storage section 2711. When controlled in a fade-in state by decoding operation control section 2701, gain adjustment section 2708 amplifies the base layer decoded signal obtained from base layer decoding section 2705 in accordance with the following equation (22), and outputs the obtained signal to synthetic audio storage section 2711.

[Equation 22]

$$Xbase''_i = \frac{i}{N_s - 1} \cdot Xbase_i \quad (i = 0, \ldots, N_s - 1) \tag{22}$$

Here, $N_S$ is a value determined by N samples of a single frame, $Xbase_i$ is the base layer decoded signal, and $Xbase''_i$ is the decoded signal after amplification.

Gain adjustment section 2709 has the same configuration as that of gain adjustment section 2708 except the input signal in gain adjustment section 2708 is replaced with the first enhancement layer decoded signal and synthetic audio storage section 2711 is replaced with addition section 2714, and a detailed description thereof will be omitted. In addition, gain adjustment section 2710 has the same configuration as that of gain adjustment section 2708 except the input signal in gain adjustment section 2708 is replaced with the second enhancement layer decoded signal and synthetic audio storage section 2711 is replaced with the addition section 2715, and a detailed description thereof will be omitted.

Synthetic audio storage section 2711 has an internal buffer that internally stores the decoded signal at the time of previous frame processing, and its ON/OFF status is controlled by decoding operation control section 2701. When in either an ON or OFF state, synthetic audio storage section 2711 inputs the signal output from gain adjustment section 2708 and outputs this signal to addition section 2714. When controlled in an ON state by decoding operation control section 2701, synthetic audio storage section 2711 outputs the signal output from gain adjustment section 2708 at the time of processing the previous frame stored in the internal buffer to resynthesis processing section 2716. Next, when in either an ON or OFF state, synthetic audio storage section 2711 stores the signal output from gain adjustment section 2708 in the internal buffer each time a frame is processed. Here, when controlled in an ON state by decoding operation control section 2701, synthetic audio storage section 2711 first outputs the signal at the time of processing the previous frame stored in the internal buffer to resynthesis processing section 2716, and then stores the signal of the current frame in the internal buffer, thereby enabling appropriate output of the signal of the previous frame to resynthesis processing section 2716.

When both control switches 2702 and 2703 are ON, the addition section 2714 adds the signal output from synthetic audio storage section 2711 to the signal output from gain adjustment section 2709, and outputs the result to synthetic audio storage section 2712. When control switch 2702 is ON and control switch 2703 is OFF, addition section 2714 outputs the signal output from synthetic audio storage section 2711 as is to synthetic audio storage section 2712. When both control switches 2702 and 2703 are OFF, addition section 2714 does not perform any operation.

Synthetic audio storage section 2712 has an internal buffer that internally stores the decoded signal at the time of previous frame processing, and its ON/OFF status is controlled by decoding operation control section 2701. When in either an ON or OFF state, synthetic audio storage section 2712 inputs the signal output from addition section 2714 and outputs this signal to addition section 2715. Only when controlled in an ON state by decoding operation control section 2701, synthetic audio storage section 2712 outputs the signal output from addition section 2714 at the time of processing the previous frame stored in the internal buffer to resynthesis processing section 2716. Next, when in either an ON or OFF state, synthetic audio storage section 2712 stores the signal output from addition section 2714 in the buffer each time a frame is processed. Here, when controlled in an ON state by decoding operation control section 2701, synthetic audio storage section 2712 first outputs the signal at the time of processing the previous frame stored in the internal buffer to resynthesis processing section 2716, and then stores the signal of the current frame in the internal buffer, thereby enabling appropriate output of the signal of the previous frame to resynthesis processing section 2716.

When all control switches 2702 to 2704 are ON, addition section 2715 adds the signal output from synthetic audio storage section 2712 to the signal output from gain adjustment section 2710, and outputs the result to synthetic audio storage section 2713. When control switch 2704 is OFF, addition section 2715 outputs the signal output from synthetic audio storage section 2712 as is to synthetic audio storage section 2713. When all control switches 2702 to 2704 are OFF, addition section 2715 does not perform any operation.

Synthetic audio storage section 2713 has an internal buffer that internally stores the decoded signal at the time of previous frame processing, and its ON/OFF status is controlled by decoding operation control section 2701. When in either an ON or OFF state, synthetic audio storage section 2713 inputs the signal output from addition section 2715 and outputs this signal to resynthesis processing section 2716. Only when controlled in an ON state by decoding operation control section 2701, synthetic audio storage section 2713 outputs the signal output from addition section 2715 at the time of processing the previous frame stored in the internal buffer to resynthesis processing section 2716. Next, when in either an ON or OFF state, synthetic audio storage section 2713 stores the signal output from addition section 2715 in the buffer each time a frame is processed. Here, when controlled in an ON state by decoding operation control section 2701, synthetic audio storage section 2713 first outputs the signal at the time of processing the previous frame stored in the internal buffer to resynthesis processing section 2716, and then stores the signal of the current frame in the internal buffer, thereby enabling appropriate output of the signal of the previous frame to resynthesis processing section 2716.

Resynthesis processing section 2716 is controlled in a base layer resynthesis state 1, base layer resynthesis state 2, or first enhancement layer resynthesis state by decoding operation control section 2701. The following describes in detail the operation of resynthesis processing section 2716 when controlled in each state.

(First Enhancement Layer Resynthesis State)

When controlled in the first enhancement layer resynthesis state by decoding operation control section 2701, resynthesis processing section 2716 inputs the decoded signal of the current frame output from synthetic audio storage section 2713, the synthetic audio (first synthetic audio) of the previous frame output from synthetic audio storage section 2712, and the synthetic audio (second synthetic audio) of the previous frame output from synthetic audio storage section 2713, and resynthesizes the decoded signal of the current frame. Specifically, resynthesis processing section 2716 first performs the linear predictive analysis $N_p$ degree against the decoding signal of the current frame output from synthetic audio storage section 2713 using the methods described in each speech information processing related document ["Linear Prediction of Speech" by J. D. Markel, (Corona Corporation), etc.], and calculates the linear predictive coefficient (LPC coefficient) αi (i=0 to $N_p$). At this time, $N_p$ samples from the end of the first synthetic audio output from synthetic audio storage section 2712 are utilized for the samples from the start of the decoded signal of the current frame to the $N_p-1$th sample. Next, resynthesis processing section 2716 calculates the linear prediction error signal $Z_i$ (i=0 to $N_p$) for the decoded signal Si (i=0 to $N_p$) of the current frame output from synthetic audio storage section 2713 using the calculated linear predictive coefficient as shown in equation (23). At this time as well, $N_p$th samples from the end of the first synthetic audio output from synthetic audio storage section 2712 are utilized for the samples from the start of the decoded signal of the current frame to the $N_p-1$th sample. N in equation (23) is the number of samples in a single frame.

[Equation 23]

$$Z_i = S_i - \sum_{j=0}^{N_p} \alpha_j S_{i-j} \quad (i = 0, \ldots , N) \tag{23}$$

Next, resynthesis processing section 2716 resynthesizes the decoded signal using the calculated linear prediction error signal as shown in equation (24). At this time, $N_p$th samples from the end of the second synthetic audio output from synthetic audio storage section 2713 are utilized for the samples from the start of the linear prediction error signal to the $N_p-1$th sample.

[Equation 24]

$$Y_i = Z_i + \sum_{j=0}^{N_p} \alpha_j Y_{i-j} \quad (i = 0, \ldots , N) \tag{24}$$

Next, resynthesis processing section 2716 outputs the signal obtained as the result of equation (24) as the output signal.

(Base Layer Resynthesis State 1)

When controlled in the base layer resynthesis state 1 by decoding operation control section 2701, resynthesis processing section 2716 inputs the decoded signal of the current frame output from synthetic audio storage section 2713, the synthetic audio (first synthetic audio) of the previous frame output from synthetic audio storage section 2711, and the synthetic audio (second synthetic audio) of the previous frame output from synthetic audio storage section 2713, and resynthesizes the decoded signal of the current frame. Specifically, resynthesis processing section 2716 performs the linear predictive analysis Ns degree against the decoded signal of the current frame output from synthetic audio storage section 2713 based on a known method, and calculates the linear predictive coefficient (LPC coefficient) $\alpha_i$ (i=0 to $N_p$). At this time, $N_p$th samples from the end of the first synthetic audio output from synthetic audio storage section 2711 are utilized for the samples from the start of the decoded signal of the current frame to the $N_p-1$th sample. Next, resynthesis processing section 2716 calculates the linear prediction error signal for the decoded signal of the current frame output from synthetic audio storage section 2713 using the calculated linear predictive coefficient as shown in equation (23). At this time as well, $N_p$th samples from the end of the first synthetic audio output from synthetic audio storage section 2711 are utilized for the samples from the start of the decoded signal of the current frame to the $N_p-1$th sample. Next, resynthesis processing section 2716 resynthesizes the decoded signal using the calculated linear prediction error signal as shown in equation (24). At this time, $N_p$th samples from the end of the second synthetic audio output from synthetic audio storage section 2713 are utilized for the samples from the start of the linear prediction error signal to the $N_p-1$th sample.

Next, resynthesis processing section 2716 outputs the signal obtained as the result of equation (24) as the output signal.

(Base Layer Resynthesis State 2)

When controlled in the base layer resynthesis state 2 by decoding operation control section 2701, resynthesis processing section 2716 inputs the decoded signal of the current frame output from synthetic audio storage section 2713, the synthetic audio (first synthetic audio) of the previous frame output from synthetic audio storage section 2711, and the synthetic audio (second synthetic audio) of the previous frame output from synthetic audio storage section 2712, and resynthesizes the decoded signal of the current frame. Specifically, resynthesis processing section 2716 performs the linear predictive analysis Ns degree against the decoded signal of the current frame output from synthetic audio storage section 2713 based on a known method, and calculates the linear predictive coefficient (LPC coefficient) $\alpha_i$ (i=0 to $N_p$). At this time, $N_p$th samples from the end of the first synthetic audio output from synthetic audio storage section 2711 are utilized for the samples from the start of the decoded signal of the current frame to the $N_p-1$th sample. Next, resynthesis processing section 2716 calculates the linear prediction error signal for the decoded signal of the current frame output from synthetic audio storage section 2713 using the calculated linear predictive coefficient as shown in equation (23). At this time as well, $N_p$th samples from the end of the first synthetic audio output from synthetic audio storage section 2711 are utilized for the samples from the start of the decoded signal of the current frame to the $N_p-1$th sample. Next, resynthesis processing section 2716 resynthesizes the decoded signal using the calculated linear prediction error signal as shown in equation (24). At this time, $N_p$th samples from the end of the second synthetic audio output from synthetic audio storage section 2712 are utilized for the samples from the start of the linear prediction error signal to the $N_p-1$th sample.

Next, resynthesis processing section 2716 outputs the signal obtained as the result of equation (24) as the output signal.

This concludes the description of the internal configuration of signal decoding apparatus 2003 of the present embodiment.

In this manner, according to the present embodiment, in a signal coding apparatus or signal relay apparatus that exists in a transmission path, the noise that occurs as a result of an increase or decrease in the number of layers used during decoding can be suppressed even in cases where the send mode information for the next frame cannot be obtained. In particular, in the case where the number of layers utilized during decoding decreases, the noise can be suppressed even under unforeseen circumstances such as a transmission error or sudden decrease in the number of layers by storing the decoded signal of each layer of the previous frame and utilizing the decoded signals of the previous frame to resynthesize the decoded signals of the frame wherein the number of layers was decreased.

In addition, while the present embodiment describes the case where, transmission errors during transmission, etc., are detected up to the moment of input to the signal decoding apparatus and the signal decoding apparatus decodes coded information after the send mode information was already changed, the invention is not limited thereto and can also be similarly applied to cases where a transmission error detection bit and the like are included in the coded information, transmission errors are detected by a transmission error detection section provided in the signal decoding apparatus and, as a result, the number of layers utilized during decoding is changed. For example, when coded information is transmitted with the send mode information of the previous frame as bitrate1 and the send mode information of the current frame as bitrate1, and the transmission error detection section in the signal decoding apparatus detects a transmission error in the information source code of the uppermost layer (second enhancement layer), the noise that occurs as a result of a change in the number of layers can be suppressed by performing resynthesis processing such as that described above under "(first enhancement layer resynthesis state)".

The present application is based on Japanese Patent Application No. 2004-220867, filed on Jul. 28, 2004, and Japanese Patent Application No. 2005-004540, filed on Jan. 11, 2005, the entire content of which is expressly incorporated herein by reference.

INDUSTRIAL APPLICABILITY

The present invention is ideal for use in a communication apparatus of a packet communication system or a mobile communication system.

The invention claimed is:

1. A relay apparatus comprising:

a receiving section that receives coded information constructed in a plurality of layers by scalable coding;

an addition processing section that, when coded additional information is input, assigns layers of an appropriate information volume based on a type of the coded additional information input and integrates the received coded information with said coded additional information using the appropriate information volume; and a transmission section that transmits the integrated information generated by the addition processing section, wherein said addition processing section replaces the coded information of nth and later layers (where n is a natural number) from a top layer with the coded additional information.

2. The relay apparatus according to claim 1, further comprising a coding section that codes the additional information to produce said coded additional information.

3. The relay apparatus according to claim 1, wherein said addition processing section adjusts the number of the layers for replacing information, according to urgency of the coded additional information.

4. The relay apparatus according to claim 1, wherein, when a transmission bit rate of the coded additional information is higher than a transmission bit rate of the received coded information, said addition processing section divides said coded additional information into a plurality of frames and adds said plurality of frames to the received coded information.

5. The relay apparatus according to claim 1, wherein said addition processing section adjusts the number of the layers where said received coded information is replaced with said coded additional information, according to priority information indicating which one of the coded additional information and the received coded information is prioritized.

6. The relay apparatus according to claim 1, wherein said addition processing section adjusts the number of the layers where the received coded information is replaced with said coded additional information, based on additional mode information indicating a bit rate when the coded additional information is coded.

7. A signal decoding apparatus that decodes coded information constructed in a plurality of layers, the apparatus comprising:

an additional information detecting section that detects coded additional information for integrating with one or more layers of received coded information, wherein the nth and later layers (where n is a natural number) from a top layer of the received coded information have been replaced with the coded additional information;

a plurality of first decoding sections that each decode a different layer of the received coded information;

an addition section that adds the decoded different layers of the received coded information and generates a first decoded signal; and a second decoding section that, when the coded additional information is detected, decodes the coded additional information and generates a second decoded signal.

8. The signal decoding apparatus according to claim 7, wherein:

said additional information detecting section detects whether the coded additional information is added to a plurality of frames; and said second decoding section performs, when the additional information detecting section detects that the coded additional information is added to the plurality of frames, decoding after all of the coded additional information is input.

* * * * *